(12) United States Patent
Borghi et al.

(10) Patent No.: US 12,151,567 B2
(45) Date of Patent: *Nov. 26, 2024

(54) ELECTRIC VEHICLE BATTERY FRAME ASSEMBLY

(71) Applicant: Nikola Corporation, Phoenix, AZ (US)

(72) Inventors: Cory Borghi, Phoenix, AZ (US); Saeid Emami, Phoenix, AZ (US); Umran Ashraf, La Mesa, CA (US); Philipp Konold, Ulm (DE); Matthias Morath, Ulm (DE); Cihan Dere, Ulm (DE); Christian Krug, Ulm (DE)

(73) Assignee: Nikola Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,589

(22) Filed: Jan. 8, 2024

(65) Prior Publication Data

US 2024/0140210 A1 May 2, 2024

Related U.S. Application Data

(63) Continuation of application No. 17/804,524, filed on May 27, 2022, now Pat. No. 12,024,034, which is a
(Continued)

(51) Int. Cl.
*B60K 1/04* (2019.01)
*B60L 50/60* (2019.01)

(52) U.S. Cl.
CPC .................................. *B60L 50/66* (2019.02)

(58) Field of Classification Search
CPC . B60L 50/66; B60K 1/04; B60K 1/02; H01M 50/249
See application file for complete search history.

(56) References Cited

U.S. PATENT DOCUMENTS

| 4,365,681 A | 12/1982 | Singh |
| 6,085,854 A | 7/2000 | Nishikawa |
(Continued)

FOREIGN PATENT DOCUMENTS

| CN | 105438262 | 3/2016 |
| CN | 112327162 | 2/2021 |
(Continued)

OTHER PUBLICATIONS

International Search report and written Opinion dated Sep. 9, 2021 in PCT/US2021/032687.
(Continued)

*Primary Examiner* — Jason D Shanske
*Assistant Examiner* — James J Triggs
(74) *Attorney, Agent, or Firm* — Snell & Wilmer L.L.P.

(57) ABSTRACT

The present disclosure provides an electric vehicle comprising a chassis, a front axle and a rear axle spaced apart and coupled to the chassis, and a battery frame assembly coupled to the chassis between the front axle and the rear axle. The battery frame assembly comprises a plurality of transversely extending members and a plurality of longitudinally extending members, wherein the plurality of transversely extending members and the plurality of longitudinally extending members define a matrix of battery pack receptacles configured to receive at least one battery pack. The battery frame assembly is configured to deflect torsionally in response to torsional deflection of the front axle relative to the rear axle.

20 Claims, 29 Drawing Sheets

Related U.S. Application Data continuation of application No. 17/466,326, filed on Sep. 3, 2021, now Pat. No. 11,970,066, which is a continuation of application No. 17/321,724, filed on May 17, 2021, now Pat. No. 11,124,076.

(60) Provisional application No. 63/119,070, filed on Nov. 30, 2020.

(56) References Cited

U.S. PATENT DOCUMENTS

| | | |
|---|---|---|
| 6,402,229 B1 | 6/2002 | Suganuma |
| 6,668,957 B2 | 12/2003 | King |
| 6,843,524 B2 | 1/2005 | Kitagawa |
| 7,393,016 B2 | 7/2008 | Mitsui et al. |
| 7,641,012 B2 | 1/2010 | Burns |
| 7,883,113 B2 | 2/2011 | Yatsuda |
| 8,540,259 B1 | 9/2013 | Young et al. |
| 9,061,712 B2 | 6/2015 | Patberg et al. |
| 9,630,502 B2 | 4/2017 | Chen et al. |
| 10,493,837 B1 | 12/2019 | Angelo et al. |
| 11,043,714 B2 | 6/2021 | Sloan et al. |
| 11,124,076 B1 * | 9/2021 | Borghi .................. B62D 21/09 |
| 11,279,243 B1 | 3/2022 | Ashraf et al. |
| 2010/0025132 A1 | 2/2010 | Hill et al. |
| 2010/0291418 A1 | 11/2010 | Zhou et al. |
| 2012/0313439 A1 | 12/2012 | Yamaguchi et al. |
| 2013/0270028 A1 | 10/2013 | Young et al. |
| 2018/0069425 A1 | 3/2018 | Mastrandrea |
| 2018/0108891 A1 | 4/2018 | Fees et al. |
| 2019/0123542 A1 | 4/2019 | Kambham et al. |
| 2019/0255928 A1 | 8/2019 | Erlacher |
| 2019/0334261 A1 | 10/2019 | Fees et al. |
| 2020/0153219 A1 | 5/2020 | Baseri et al. |
| 2020/0238808 A1 | 7/2020 | Hung et al. |
| 2020/0239076 A1 | 7/2020 | Milton et al. |
| 2021/0151726 A1 | 5/2021 | Hinterberger et al. |
| 2021/0249638 A1 | 8/2021 | Grace et al. |
| 2022/0169125 A1 | 6/2022 | Borghi et al. |
| 2022/0169126 A1 | 6/2022 | Borghi et al. |
| 2022/0169127 A1 | 6/2022 | Ashraf et al. |
| 2022/0289046 A1 | 9/2022 | Borghi et al. |
| 2022/0355679 A1 | 11/2022 | Ashraf et al. |
| 2022/0407307 A1 | 12/2022 | Putnam et al. |

FOREIGN PATENT DOCUMENTS

| | | |
|---|---|---|
| DE | 102017007490 | 2/2019 |
| EP | 4031389 | 11/2022 |
| FR | 2985690 | 7/2013 |
| WO | 2020074105 | 4/2020 |
| WO | 2022115126 | 6/2022 |
| WO | 2022115134 | 6/2022 |

OTHER PUBLICATIONS

Notice of Allowance dated Aug. 4, 2021 in U.S. Appl. No. 17/321,724.
International Search Report and Written Opinion dated Jan. 20, 2022 in PCT/US2021/046172.
Non-Final Office Action dated Oct. 18, 2022 in U.S. Appl. No. 17/466,326.
Final Office Action dated Jun. 7, 2023 in U.S. Appl. No. 17/466,326.
Notice of Allowance dated Oct. 4, 2023 in U.S. Appl. No. 17/466,326.
Notice of Allowance dated Feb. 28, 2024 in U.S. Appl. No. 17/466,326.
Non-Final Office Action dated Dec. 21, 2021 in U.S. Appl. No. 17/403,179.
Notice of Allowance dated Feb. 23, 2022 in U.S. Appl. No. 17/403,179.
Supplementary European Search Report dated Oct. 10, 2022 in U Application No. 2189378.8.
Restriction Requirement dated Feb. 23, 2023 in U.S. Appl. No. 17/804,524.
Non-Final Office Action dated Apr. 18, 2023 in U.S. Appl. No. 17/804,524.
Final Office Action dated Aug. 11, 2023 in U.S. Appl. No. 17/804,524.
Notice of Allowance dated Dec. 21, 2023 in U.S. Appl. No. 17/804,524.
International Search Report and Written Opinion dated Mar. 29, 2023 in PCT/US2022/50138.
Canada Intellectual Property Office, Office Action dated May 9, 2023 in CA Serial No. 3152697.
Non-Final Office Action dated Mar. 27, 2023 in U.S. Appl. No. 17/536,687.
Notice of Allowance dated May 11, 2023 in U.S. Appl. No. 17/536,687.
Non-Final Office Action dated Mar. 15, 2023 in U.S. Appl. No. 17/456,875.
Notice of Allowance dated Oct. 18, 2023 in US Applicaton No. U.S. Appl. No. 17/466,326.

* cited by examiner

ELECTRIC VEHICLE BATTERY FRAME ASSEMBLY

CROSS-REFERENCE TO RELATED APPLICATIONS

This application is a continuation of U.S. Ser. No. 17/804,524 filed May 27, 2022, now U.S. Patent Application Publication No. 2022-0289046 entitled "ELECTRIC VEHICLE BATTERY FRAME ASSEMBLY." U.S. Ser. No. 17/804,524 is a continuation of U.S. Ser. No. 17/466,326 filed Sep. 3, 2021, now U.S. Patent Application Publication No. 2022-0169126 entitled "ELECTRIC VEHICLE BATTERY FRAME ASSEMBLY." U.S. Ser. No. 17/466,326 is a continuation of U.S. Ser. No. 17/321,724 filed May 17, 2021, now U.S. Pat. No. 11,124,076 entitled "ELECTRIC VEHICLE BATTERY FRAME ASSEMBLY." U.S. Ser. No. 17/321,724 claims priority to and the benefit of U.S. Provisional Application No. 63/119,070 filed Nov. 30, 2020 entitled "ELECTRIC VEHICLE BATTERY FRAME ASSEMBLY." The entirety of each of the foregoing applications are herein incorporated by reference, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to battery frame assemblies, and more particularly, to chassis mounted battery frame assemblies for electric vehicles.

BACKGROUND

Battery electric vehicles (BEVs) utilize multiple onboard batteries to generate an electric current configured to power one or more electric motors that are configured to drive the vehicle's wheels. These individual batteries, known as battery cells, may be grouped together in low-level assemblies known as modules, which in turn may be grouped together in high-level assemblies known as packs. One challenge faced by electric vehicle manufacturers is the ability to package battery packs in the vehicle structure in a manner consistent with the vehicle's spatial and weight constraints, while also ensuring that static and dynamic performance of the vehicle chassis is not hindered. This is especially true in the case of heavy-duty commercial BEVs given the considerable battery requirements and magnitude of forces experienced by these vehicles during operation. Accordingly, new battery frame assemblies for electric vehicles remain desirable.

SUMMARY

In an exemplary embodiment, an electric vehicle comprises a chassis comprising a first side member and a second side member, and a battery frame assembly coupled to the first side member and the second side member. The battery frame assembly comprises a first bracket plate coupled to the first side member; a second bracket plate coupled to the second side member; a third bracket plate coupled to the first side member and positioned rearward of the first bracket plate; and a fourth bracket plate coupled to the second side member and positioned rearward of the second bracket plate. The first bracket plate, the second bracket plate, the third bracket plate, the fourth bracket plate, the first side member, and the second side member define a row of battery pack receptacles. Each battery pack receptacle of the row of battery pack receptacles comprises a similar geometry to permit selective installation or removal of a battery pack in any battery pack receptacle of the row of battery pack receptacles.

In another exemplary embodiment, an electric vehicle comprises a chassis comprising a first side member and a second side member, and a battery frame assembly coupled to the first side member and the second side member and defining a plurality of battery pack receptacles configured to receive a battery pack. The battery frame assembly is coupled to the first side member and the second side member such that a majority of the battery pack is positioned below the first side member or the second side member when the battery pack is installed in the electric vehicle.

In another exemplary embodiment, an electric vehicle comprises a chassis comprising a first side member and a second side member, and a battery frame assembly coupled to the first side member and the second side member and defining a plurality of battery pack receptacles configured to receive a battery pack. Each battery pack receptacle of the plurality of battery pack receptacles includes an upper opening configured to allow the battery pack to be lowered into or lifted out of the battery frame assembly to install or remove the battery pack.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

Figure 1:
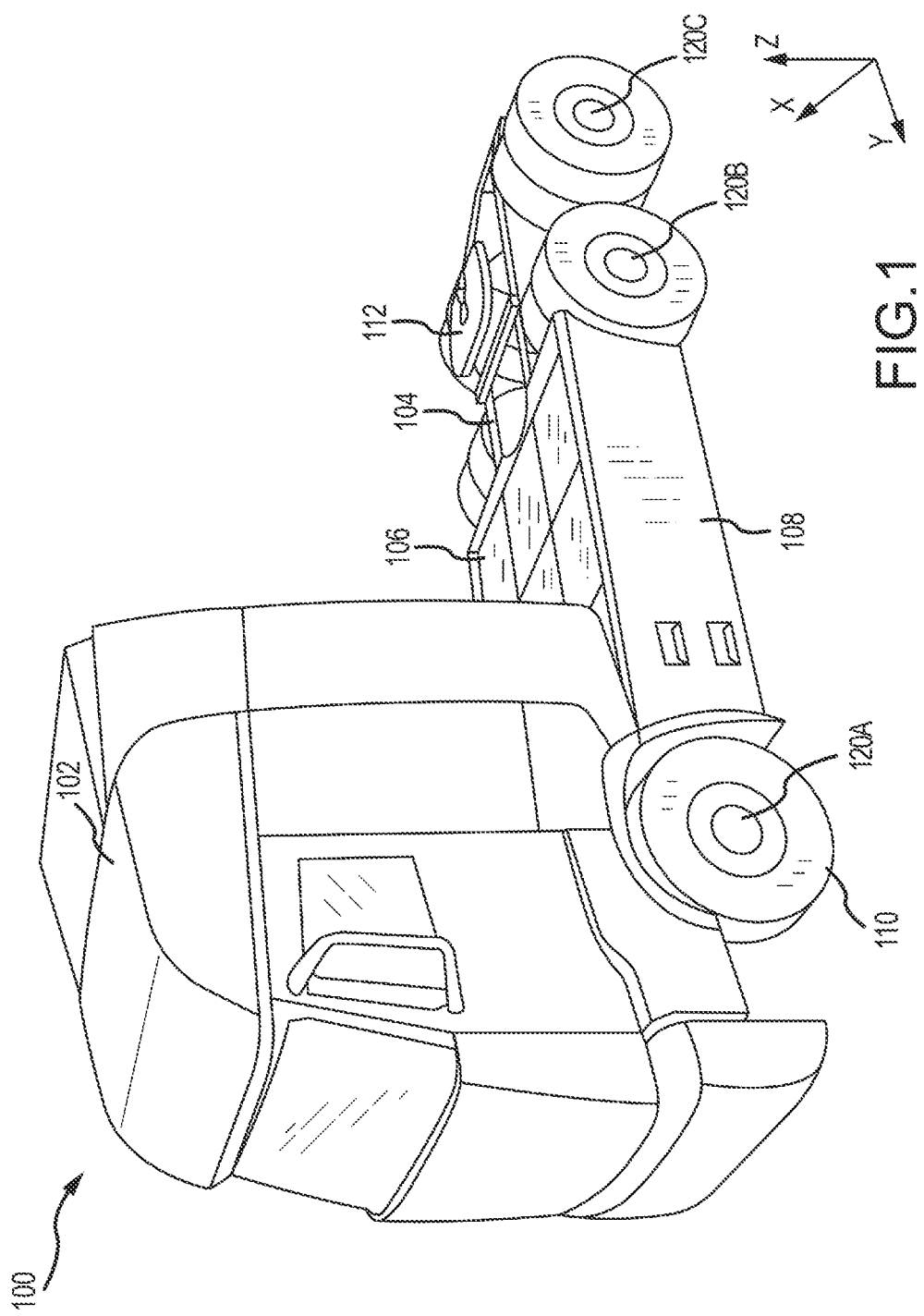
FIG. 1 illustrates a perspective view of a battery electric commercial vehicle including a battery frame assembly, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with medium and heavy-duty BEVs, hybrid vehicles, fuel cell electric vehicles, compressed natural gas (CNG) vehicles, hythane (mix of hydrogen and natural gas) vehicles, and/or the like. However, various aspects of the disclosed embodiments may be adapted for performance in a variety of other systems. As such, numerous applications of the present disclosure may be realized.

Medium- and heavy-duty commercial vehicles are large contributors to greenhouse gas emissions both domestically and internationally. For example, while forming only about five percent of vehicles on roads in the United States in 2018, the United States Environmental Protection Agency estimates that such vehicles accounted for approximately 25% of total emissions in the transportation sector. As a result, there has been a recent push to reduce greenhouse gas emissions from medium- and heavy-duty commercial vehicles, in part, through the electrification of these vehicles. As a result, traditional problems related to the packaging of internal combustion engines have been replaced with problems related to the packaging and protection of battery assemblies (or other energy storage systems such as hydrogen tanks or supercapacitors) and related electronics.

Among the problems presented by the packaging of battery assemblies on medium- and heavy-duty commercial vehicles is the ability to manage stresses experienced by the battery assembly and chassis as the vehicle accelerates, decelerates, turns, travels on uneven terrain, etc. For example, among other stresses, a heavy-duty vehicle chassis may experience: vertical stresses associated with loads caused by the cab, drivetrain, suspension, electronics, and other components; longitudinal stresses associated with acceleration and deceleration of the vehicle; lateral stresses resulting from cornering of the vehicle; and torsion stresses based on independent wheel movement as the vehicle travels on uneven roads. In some applications, it may be favorable to allow some degree of flexibility of the chassis to allow the chassis to absorb and/or dissipate stresses while preventing structural failure of chassis components. For example, in class 8 commercial trucks, there may be some degree of lateral, longitudinal, and torsional bending in the chassis to absorb and/or dissipate stresses through elastic deformation and to maintain tire contact with the ground surface as the vehicle is driven. In some instances, the vehicle chassis side members may experience upwards of approximately 2.5 degrees of rotation about the vehicle's longitudinal axis. The addition of battery assemblies to the chassis may increase the stiffness of the chassis in areas in which the battery packs are located, which may lead to stress concentration and fatigue of chassis components.

On the other hand, excessive chassis movement may adversely impact battery assemblies attached to the chassis. For example, excessive movement or force concentration on the battery packs may adversely impact battery performance, damage module and pack structures, lead to accidental disengagement of inputs or outputs to the battery packs, and in some cases, result in unintended electrical discharge and/or vehicle fires. As a result, benefits associated with flexibility of the chassis structure must be weighed against potential damage to the battery pack assembly structure. Too much flexibility in the chassis structure can lead to excessive deflection, buckling, and fatigue of chassis components. Accordingly, battery pack assemblies capable of complimenting desired flexibility of the chassis structure while eliminating excessive movement of the packs themselves may be desirable.

In addition to combating the above-stated mechanical challenges, it may also be desirable to tailor battery system specifications to align with intended operating conditions of the vehicle. For example, in the context of commercial heavy-duty vehicles, necessary battery capacity, power output, and other variables may change depending on the application required to be carried out by the vehicle. In some circumstances it may be useful to reduce overall vehicle battery capacity to reduce vehicle weight, power, and range, while in other circumstances it may be useful to increase overall vehicle battery capacity to increase vehicle power and range. Moreover, different hauls may utilize different size payloads, and battery weight can be a limiting factor in maximizing payload. As a result, increased modularity of the battery assembly may further be desired.

Finally, high voltage battery systems of modern BEVs pose unique risks not necessarily posed by traditional petroleum fuel-based vehicles. Collisions with the high voltage battery assemblies may lead to unintended electrical discharge and/or battery fires which can pose a safety risk for passengers and first responders. As a result, battery frame assemblies capable of absorbing and/or dissipating a portion of the energy of an impact and systems capable of detecting impacts or impending impacts at or near the high voltage battery systems may further be desired.

Accordingly, with reference to FIG. 1, an electric vehicle 100 is illustrated from a top perspective view, in accordance with various embodiments. As illustrated in FIG. 1, electric vehicle 100 is a heavy-duty BEV. Electric vehicle 100 is a tractor unit which may tow a trailer unit configured to hold and transport cargo. Electric vehicle 100 may comprise a class 8, class 7, class 6, or any other weight classification of tractor-trailer combination. As described herein, electric vehicle 100 extends in a longitudinal direction along the Y-axis from a rear of electric vehicle 100 to a front of electric vehicle 100. Electric vehicle 100 extends in a transverse direction along the X-axis from a driver side of electric vehicle 100 to a passenger side of electric vehicle 100. Finally, electric vehicle 100 extends in a vertical direction along the Z-axis from a ground surface on which electric vehicle 100 drives to a top of electric vehicle 100.

Electric vehicle 100 comprises a cab 102 supported by a chassis 104. Cab 102 may be configured to shelter one or more vehicle operators or passengers from the external environment. In various embodiments, cab 102 comprises a door configured to allow ingress and egress into and from cab 102, one or more seats, a windshield, and numerous accessories configured to improve comfort for the operator and/or passenger(s). As illustrated in FIG. 1, electric vehicle 100 comprises a cab-over or cab forward style tractor unit but is not limited in this regard and may comprise any style of tractor unit including a conventional or American cab style tractor unit.

Chassis 104, otherwise known as the vehicle frame, is configured to support various components and systems of electric vehicle 100 including cab 102. As will be discussed in further detail in view of FIG. 3, chassis 104 may comprise a ladder-like structure with various mounting points for electric vehicle 100's suspension, powertrain, energy storage systems (ESS) (for example, batteries or fuel cells), and other systems. As will be discussed in detail below, chassis 104 supports and is coupled to a battery frame assembly 106 which may be configured to house one or more battery packs configured to drive electric vehicle 100 and operate electric components and systems of electric vehicle 100. Battery frame assembly 106 may be covered by one or more side covers 108 configured to provide corrosion-resistance and improved aerodynamics along the sides of battery frame assembly 106. Electric vehicle 100 further comprises wheels 110 comprising one or more tires coupled to one or more axles 120 and configured to roll along a driving surface. In various embodiments, electric vehicle 100 comprises a pair of single wheels 110 coupled to a front axle 120A and a pair of dual wheels 110 coupled to two rear axles (first rear axle 120B and second rear axle 120C). One or more of the axles may be driven. For example, in various embodiments, electric vehicle 100 may comprise a 6×2 configuration with a single driven axle; however, electric vehicle 100 is not limited in this regard and may comprise a 4×2, 6×4, 6×6, or other suitable configuration. Battery frame assembly 106 may be positioned between front axle 120A and first rear axle 120B. A trailer unit (not shown) may be coupled to electric vehicle 100 via a fifth-wheel coupling 112.

Figure 2:
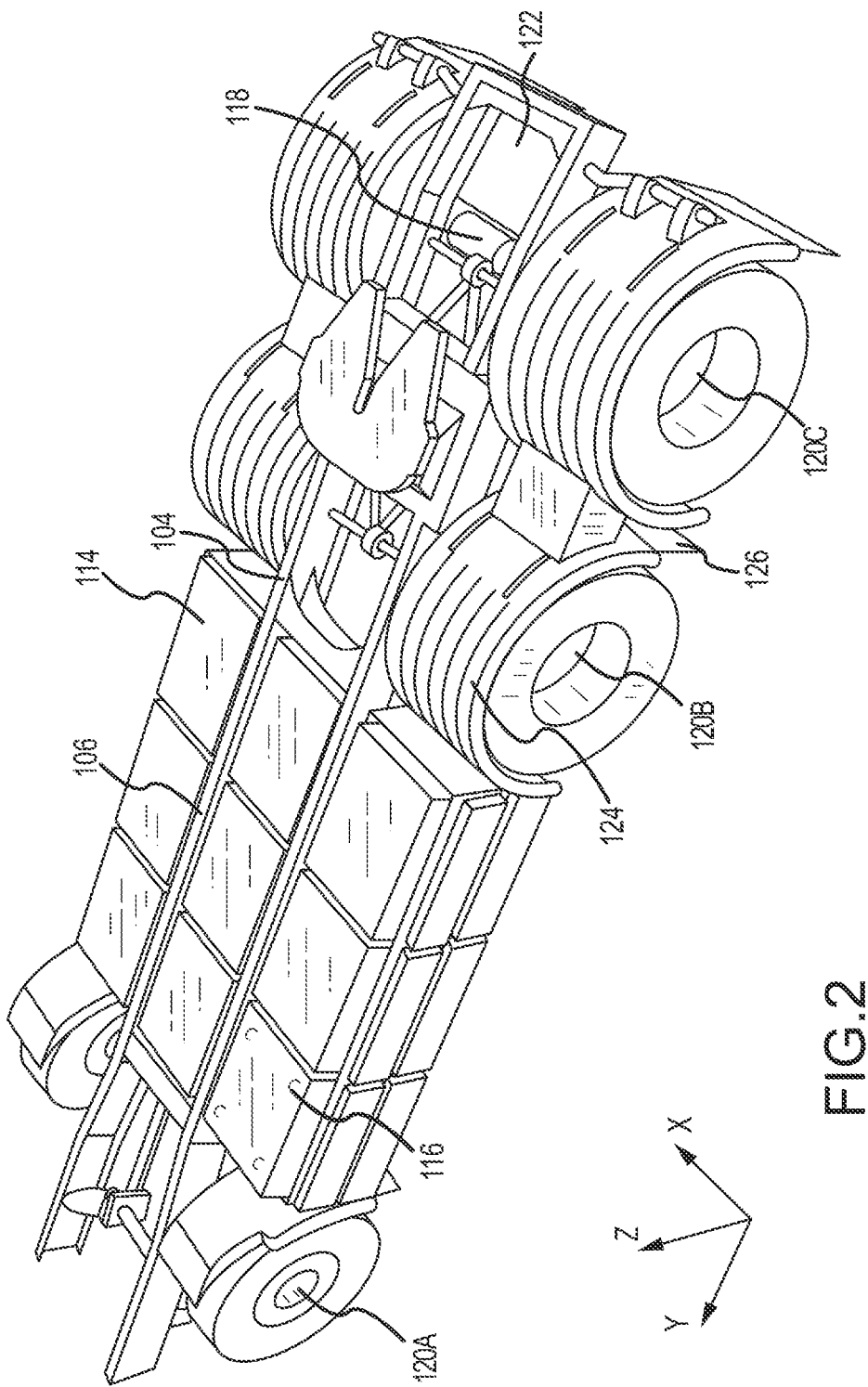
FIG. 2 illustrates a perspective view of a battery electric commercial vehicle with a cab removed, in accordance with various embodiments.

With reference to FIG. 2, electric vehicle 100 is illustrated with cab 102 removed, in accordance with various embodiments. As previously discussed, electric vehicle 100 comprises chassis 104 and battery frame assembly 106 coupled to chassis 104. Battery frame assembly 106 may accommodate one or more battery packs 114. In various embodiments, battery packs 114 contain one or more modules, each of which contains one or more battery cells. The battery cells, battery modules, and battery packs may be coupled in series and/or parallel to increase voltage and/or current depending on vehicle operation requirements. For example, in various embodiments, each battery pack 114 may operate at a voltage of between approximately 500 and 800V and a capacity of between approximately 100 and 130 Ah, however, the specifications of the battery packs are not limited in this regard and may operate at higher or lower voltages and/or capacities. Battery packs 114 may be modular in nature, meaning the battery packs 114 may function individually or in combination to achieve desired energy output. Moreover, one or more battery packs 114 may be removed to limit weight occupied by battery packs 114 depending on operational and payload needs. Finally, the modular nature of battery packs 114 may ensure uniform stiffness while permitting some degree of flexibility of battery frame assembly 106 to compliment the flexibility desired for chassis 104. Each battery pack 114 may weigh between approximately 300 and 700 kg (660 and 1,540 lbs) when fully assembled and therefore may be equipped with one or more pack mounting elements 116. In various embodiments, pack mounting elements 116 may comprise D-rings or other components capable of supporting the weight of battery pack 114 as it is assembled with and/or secured to battery frame assembly 106. While illustrated in FIG. 2 as comprising four pack mounting elements 116 on each corner of one battery pack 114, pack mounting elements 116 are not limited in this regard and any suitable number, type, or placement of pack mounting elements may be used. Moreover, while illustrated as comprising a cuboid geometry, battery packs 114 are not limited in this regard and may comprise any suitable pack geometry.

Battery packs 114 may be configured to power one or more electric motors to drive electric vehicle 100. For example, one or more of front axle 120A, first rear axle 120B, and second rear axle 120C of electric vehicle 100 may comprise an electric axle, or e-axle, which may include one or more electric motors, one or more gearboxes, and a differential configured to drive the wheels of electric vehicle 100. In various embodiments, direct current from battery packs 114 may be converted to alternating current in one or more inverters 122 and directed to the one or more electric motors in each e-axle. However, in various embodiments, an electric motor may comprise an alternating current or direct current motor coupled to each individual wheel. Each e-axle may comprise a solid axle configuration or a split axle configuration. Numerous embodiments are contemplated in this regard. Electric vehicle 100 may further comprise one or more suspension systems 118 (for example, leaf spring, equalizer beam, torsion bar, or air spring suspension systems), one or more fenders 124, and one or more mud guards 126 among other components which will not be described in detail for sake of brevity.

Battery Frame Assembly Structure and Mechanics

Figure 3:
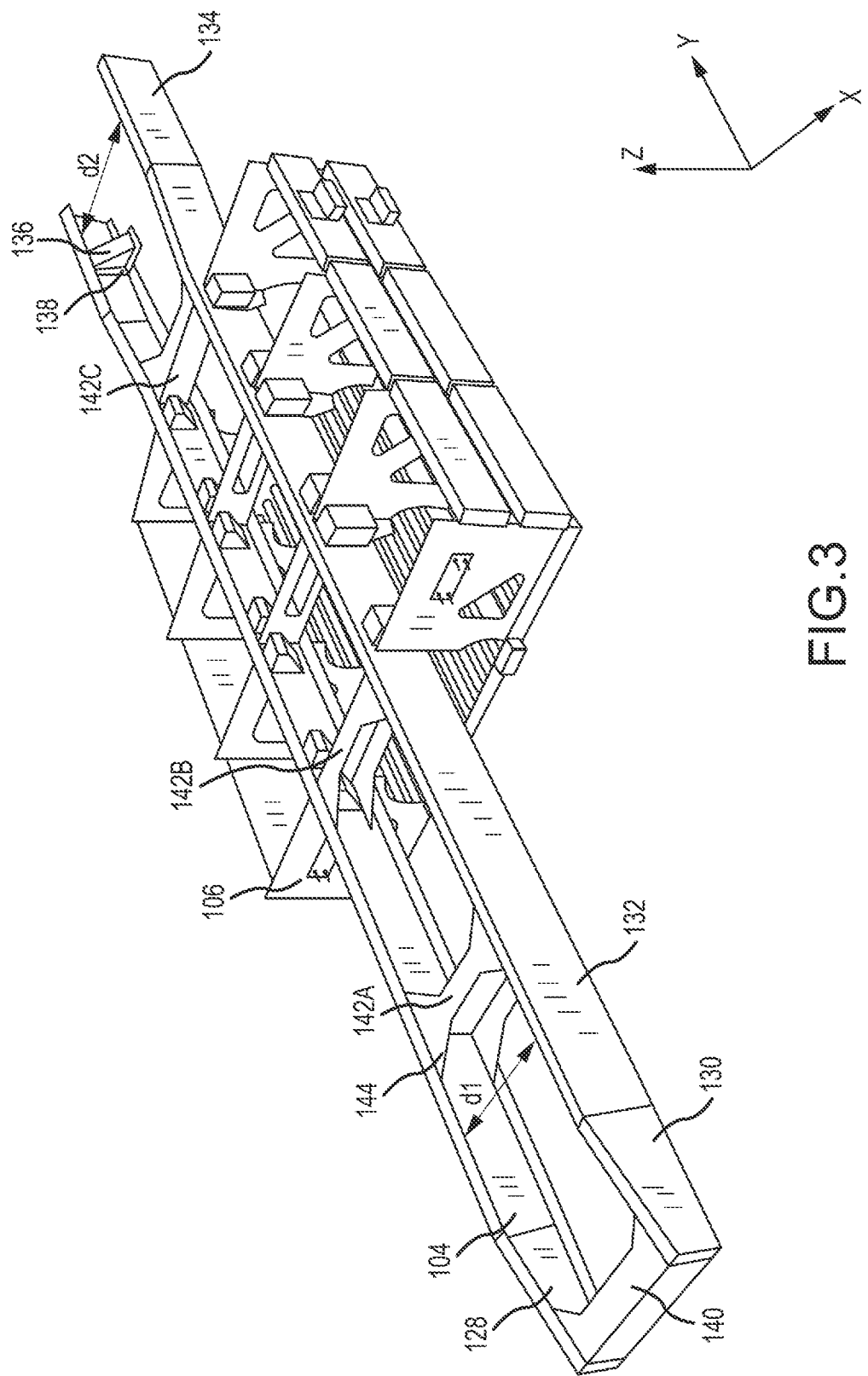
FIG. 3 illustrates a perspective view of a battery frame assembly mounted to a chassis, in accordance with various embodiments.

Referring now to FIG. 3, battery frame assembly 106 is illustrated coupled to chassis 104 with battery packs 114 and remaining elements of electric vehicle 100 removed, in accordance with various embodiments. Chassis 104 and battery frame assembly 106 and components thereof may comprise any suitable high strength material capable of withstanding weight of electric vehicle 100 systems and components (for example, cab, suspension, batteries) yet flexible enough to permit minor elastic deformation of chassis 104 and battery frame assembly 106 as electric vehicle 100 travels and experiences stresses associated with normal operation. For example, in various embodiments, chassis 104 and battery frame assembly 106 may comprise a carbon steel, mild steel, cast iron, carbon fiber composite, magnesium alloy, aluminum alloy, titanium, nickel-based alloy, or any other suitable material or combinations thereof. Moreover, subcomponents of chassis 104 and battery frame assembly 106 may be formed via any suitable fabrication technique including cutting, folding, welding, machining, punching, stamping, shearing, casting, additive manufacturing, or a combination thereof. Finally, subcomponents of chassis 104 and battery frame assembly 106 may be coupled together utilizing any suitable technique including welding (using arc or gas welding), soldering, brazing, fastening (using rivets, screws, or nuts and bolts), press fitting, or by way of an adhesive.

Chassis 104 comprises a ladder frame chassis comprising a pair of longitudinally extending side members interconnected by multiple transversely extending crossmembers. In various embodiments, chassis 104 comprises a first side member 128 and a second side member 130 opposite first side member 128. First side member 128 and second side member 130 may each comprise C-channels extending substantially parallel and extending across an entire or substantial portion (for example, 80%) of the longitudinal length of electric vehicle 100. Each side member may be mirrored about a longitudinal centerline of electric vehicle 100 such that upper and lower flanges of each side member extend transversely toward the other side member in a direction away from a web of each side member. While illustrated as comprising C-channels, first side member 128 and second side member 130 are not limited in this regard and may comprise members having any suitable cross-sectional geometry including S-beams, W-beams, H-beams, I-beams, L-beams, or the like.

In various embodiments, first side member 128 and second side member 130 each comprise a first section 132 and a second section 134. First section 132 may be proximate a rear of electric vehicle 100 while second section 134 may be proximate a front of electric vehicle 100. A first distance "d1" may define a transverse distance between first side member 128 and second side member 130 at first section 132 wherein the first distance may be measured orthogonally between a web of first side member 128 and a web of second side member 130. Similarly, a second distance "d2" may define a transverse distance between first side member 128 and second side member 130 at second section 134 wherein the second distance may be measured orthogonally between the web of first side member 128 and the web of second side member 130. First distance d1 may be between approximately 0.6 and 1.0 m (1.9 and 3.3 ft), between approximately 0.7 and 0.9 m (2.3 and 2.9 ft), or more preferably approximately 0.8 m (2.6 ft). Second distance d2 may be between approximately 0.8 and 1.2 m (2.6 and 3.9 ft), between approximately 0.9 and 1.1 m (2.9 and 3.6 ft), or more preferably approximately 1.0 m (3.3 ft). However, in various embodiments, first distance d1 may be equal to second distance d2 throughout an entire longitudinal length of first section 132 and second section 134. Moreover, first side member 128 and second side member 130 may comprise any suitable longitudinal length.

With continued reference to FIG. 3, chassis 104 further comprises one or more angles 136 and angle plates 138 configured to mount various vehicle components to chassis 104. As labeled in FIG. 3, angle 136 and angle plate 138 may be configured to mount one or more shock absorbers to chassis 104; however, chassis 104 is not limited in this regard and may comprise numerous angles and angle plates along its length configured to mount any desired component. Angle 136 and angle plate 138 may be integral components or may comprise separate components coupled together via fasteners. Moreover, in various embodiments, chassis 104 may be coupled directly to components of electric vehicle 100 (i.e., without the assistance of mounting plates or other mounting components). For example, vehicle components may be coupled directly to an upper flange, lower flange, and/or web of first side member 128 and/or second side member 130. As such, first side member 128 and second side member 130 may each comprise a plurality of apertures configured to receive a corresponding number of fasteners to allow vehicle components and/or mounting plates to be coupled to chassis 104.

Chassis 104 further comprises one or more crossmembers configured to couple together first side member 128 and second side member 130 substantially parallel to each other. The one or more crossmembers may be configured to resist compression and tension stresses in the transverse direction in addition to resisting torsion stresses. In various embodiments, chassis 104 may comprise an end crossmember 140 and one or more intermediate crossmembers 142. As illustrated in FIG. 3, chassis 104 comprises a single end crossmember 140 and three intermediate crossmembers 142A, 142B, 142C; however, chassis 104 is not limited in this regard and may comprise any suitable number of transversely extending crossmembers. First intermediate crossmember 142A may be spaced apart from end crossmember 140 in a direction toward a front of electric vehicle 100. Similarly, second intermediate crossmember 142B may be spaced apart from first intermediate crossmember 142A in a direction toward a front of electric vehicle 100. In various embodiments, end crossmember 140, first intermediate crossmember 142A, and second intermediate crossmember 142B are spaced equidistantly; however, these components are not limited in this regard, and may be spaced unequally. Third intermediate crossmember 142C may be spaced apart from second intermediate crossmember 142B in a direction toward a front of electric vehicle 100. The distance between third intermediate crossmember 142C and second intermediate crossmember 142B may be greater than the distance between second intermediate crossmember 142B and first intermediate crossmember 142A and greater than the distance between first intermediate crossmember 142A and end crossmember 140. Second intermediate crossmember 142B and third intermediate crossmember 142C may be substantially flush with rear and front ends of battery frame assembly 106, respectively. In various embodiments, the spacing and structure of end crossmember 140, the three intermediate crossmembers 142A-C, and battery frame assembly 106 may be configured such that chassis 104 is configured with a substantially uniform stiffness/flexibility, and strength along an entire longitudinal length of chassis 104.

End crossmember 140, first intermediate crossmember 142A, second intermediate crossmember 142B, and third intermediate crossmember 142C may each comprise C-channels comprising an upper and lower flange spaced apart by a web which together define a channel. The flanges associated with each crossmember may generally be spaced apart in a vertical direction (along Z-axis) and extend from the web in a longitudinal direction (along Y-axis). End crossmember 140 and third intermediate crossmember 142C may be configured such that the flanges of these crossmembers extend away from the webs of the crossmembers in a direction toward the front of electric vehicle 100, while first intermediate crossmember 142A and second intermediate crossmember 142B may be configured such that the flanges of these crossmembers extend away from the webs of the crossmembers in a direction toward the rear of electric vehicle 100. End crossmember 140 and the three intermediate crossmembers 142A-C may be coupled to first side member 128 and second side member 130 via one or more crossmember mounting plates 144 via one or more fasteners or other coupling mechanism. Alternatively, the crossmembers may be formed integrally with first side member 128 and/or second side member 130.

Figure 4:
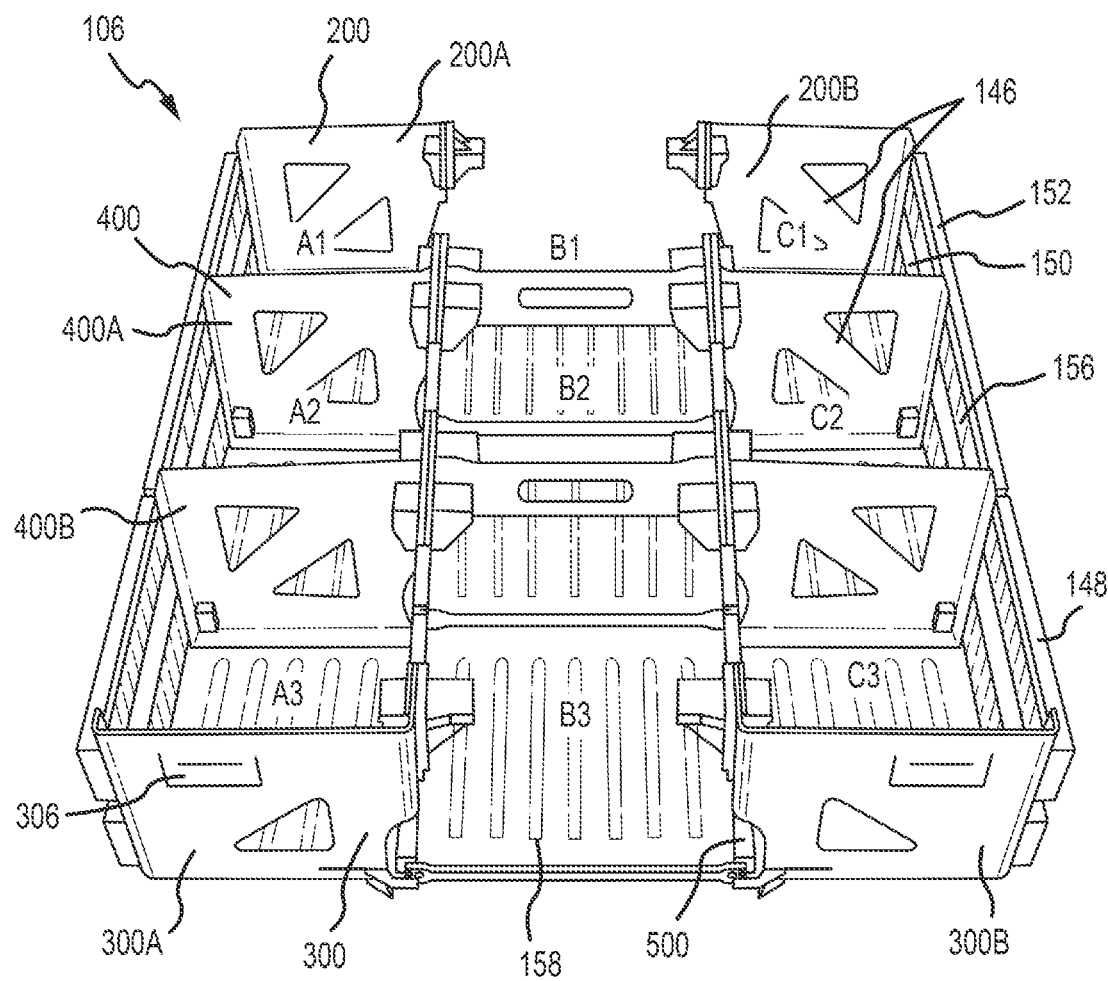
FIG. 4 illustrates a front perspective view of a battery frame assembly, in accordance with various embodiments.
Figure 5:
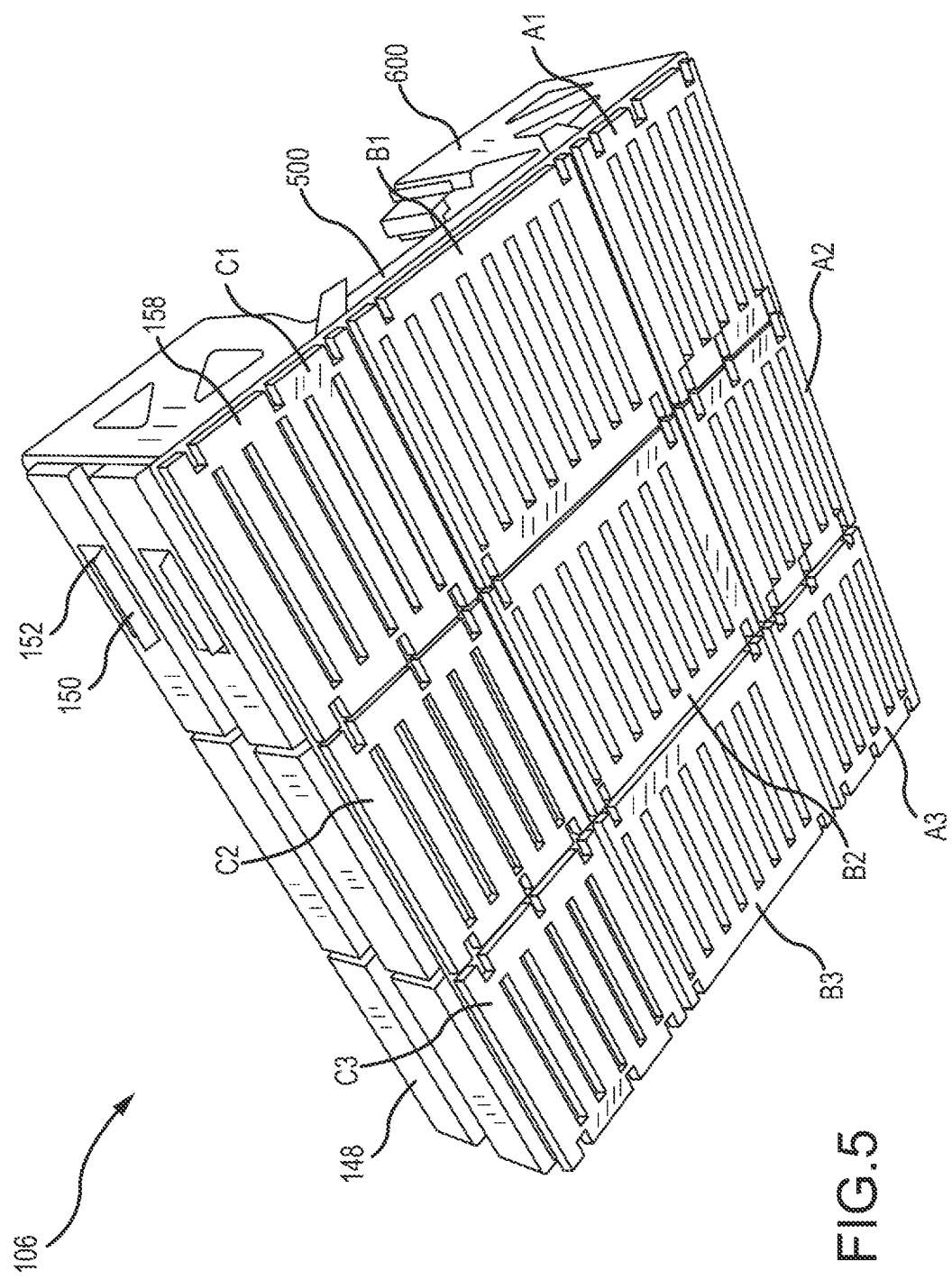
FIG. 5 illustrates a bottom perspective view of a battery frame assembly, in accordance with various embodiments.

With reference now to FIGS. 2, 3, and 4, battery frame assembly 106 is illustrated detached from chassis 104, in accordance with various embodiments. FIG. 4 illustrates battery frame assembly 106 from a top perspective view, while FIG. 5 illustrates battery frame assembly 106 from a bottom perspective view. As briefly discussed above, battery frame assembly 106 comprises a modular battery assembly design configured to contain multiple discrete battery packs 114 in a manner which allows the battery frame assembly 106 to compliment the desired mechanics of chassis 104 and which allows for customization of the number and orientation of battery packs 114 based on operational needs of electric vehicle 100.

In general, battery frame assembly 106 may comprise a matrix-like structure with one or more longitudinally extending members and one or more transversely extending members. The longitudinally and transversely extending members may together define one or more battery pack receptacles 146 configured to contain and secure a corresponding number of battery packs 114. While illustrated herein as accommodating cuboid-shaped battery packs 114, battery pack receptacles 146 may accommodate battery packs 114 of any desired geometry. In various embodiments, battery frame assembly 106 comprises nine battery pack receptacles 146 denoted in FIG. 4 as A1-C3. In the illustrated embodiment, battery frame assembly 106 comprises a 3×3 matrix structure in which battery frame assembly 106 comprises three adjacent rows (1-3) and three adjacent columns (A-C) of battery pack receptacles to form a substantially square-shaped battery frame assembly 106. While illustrated and discussed herein as comprising three rows and three columns of battery pack receptacles 146, battery frame assembly 106 is not limited in this regard and may comprise any desired number of rows and columns of battery pack receptacles 146. For example, in various embodiments, battery frame assembly 106 comprises a 2×2 matrix, 4×4 matrix, 5×5 matrix, and so forth. Moreover, in various embodiments, the number of rows and columns may be unequal. For example, in various embodiments, battery frame assembly 106 comprises a 2×3 matrix, 3×2 matrix, 3×4 matrix, 4×3 matrix, 4×5 matrix, 5×4 matrix, etc., wherein the first number refers to the number of rows and the second number refers to the number of columns. Any suitable number of rows and columns is contemplated herein. Moreover, while illustrated herein as comprising a single matrix of battery pack receptacles 146 along the Z-axis, it should be appreciated that battery frame assembly 106 may have multiple matrices of battery pack receptacles 146 stacked vertically in various embodiments, and the matrix of one level may differ from that of another level. Moreover, the number of battery pack receptacles 146 in a level of battery frame assembly 106 may be the same as, or may differ from, the number in another level; in a first example, a first (lower) layer may contain six battery pack receptacles 146 in a 2×3 configuration, and a second (upper) layer may contain two battery pack receptacles in a 2×1 configuration, with the upper layer disposed generally toward the front of electric vehicle 100; in a second example, a first (lower) layer may contain nine battery pack receptacles 146 in a 3×3 configuration, and a second (upper) layer may contain nine battery pack receptacles in a 3×3 configuration. It will be appreciated that a desired matrix configuration for battery frame assembly 106 may be selected based on various criteria, for example battery volume, battery weight, desired vehicle range, desired vehicle handling characteristics, service or maintenance considerations, swapping rather than charging of battery packs 114, and/or the like. Moreover, a battery pack 114 placed in a particular battery pack receptacle 146 may have similar characteristics to, or may have differing characteristics from, a battery pack 114 placed in a different battery pack receptacle 146 in battery frame assembly 106.

The one or more longitudinally extending members and one or more transversely extending members may be coupled to first side member 128 and second side member 130 to affix battery frame assembly 106 to chassis 104. More specifically, the longitudinally and transversely extending members may be coupled to webs on inboard and/or outboard sides of the first side member 128 and second side member 130 via fasteners or other suitable attachment method. Battery frame assembly 106 may be coupled to chassis 104 in such a manner that a topmost portion of battery frame assembly 106 is substantially flush with a topmost portion of first side member 128 and second side member 130 (in the vertical direction). In other words, battery frame assembly 106 may be coupled to first side member 128 and second side member 130 such that at least a portion of battery frame assembly 106 is suspended below first side member 128 and second side member 130. Battery frame assembly 106 may be configured such that the first column (A1-A3) of battery pack receptacles 146 is positioned outboard of first side member 128, the third column of battery pack receptacles 146 (C1-C3) is positioned outboard of the second side member 130, and the second column of battery pack receptacles 146 (B1-B3) is positioned inboard and between first side member 128 and second side member 130.

Battery frame assembly 106 may comprise one or more front bracket assemblies 200, one or more rear bracket assemblies 300, and one or more intermediate bracket assemblies 400. The one or more intermediate bracket assemblies 400 may be positioned rearward of the one or more front bracket assemblies 200 and the one or more rear bracket assemblies 300 may be positioned rearward of the one or more intermediate bracket assemblies 400. As illustrated in FIG. 4, battery frame assembly 106 comprises first and second front bracket assemblies 200A and 200B, first and second rear bracket assemblies 300A and 300B, and first and second intermediate bracket assemblies 400A and 400B; however, battery frame assembly 106 is not limited in this regard and may comprise a greater or lesser number of intermediate bracket assemblies in various embodiments.

Battery frame assembly 106 further comprises one or more impact plates 148 positioned on the outboard ends of battery frame assembly 106. The one or more impact plates 148 may be configured to shield battery packs 114 in battery frame assembly 106 from side impacts resulting from a vehicle collision or other event. In various embodiments, impact plates 148 may be configured to deform upon impact to reduce kinetic energy transfer to the battery packs 114. Impact plates 148 may comprise one or more ribs 156 configured to increase stiffness and strength in the transverse direction. In various embodiments, impact plates 148 may further comprise one or more recessed areas to reduce weight. Impact plates 148 may be positioned longitudinally and may separate and couple to front bracket assemblies 200, intermediate bracket assemblies 400, and rear bracket assemblies 300. In various embodiments, two or more impact plates 148 may be stacked and coupled together vertically to substantially correspond to a height of battery frame assembly 106. However, in various embodiments, impact plates 148 comprise single, integral components. The impact plates 148 positioned between the front bracket assemblies 200 and the intermediate bracket assemblies 400 may comprise one or more steps 150 and one or more openings 152 configured to permit an operator, field technician, or other individual to access upper portions of electric vehicle 100. While illustrated in FIG. 4 as comprising a pair of steps 150 on either side of battery frame assembly 106 between the front bracket assemblies 200 and the intermediate bracket assemblies 400, battery frame assembly 106 is not limited in this regard and may comprise one or more steps 150 and openings 152 on any or all impact plates 148.

In various embodiments, battery frame assembly 106 further comprises one or more skid plates 158. As illustrated in FIGS. 4 and 5, battery frame assembly 106 comprises nine substantially square-shaped plates which may correspond roughly to a shape of a bottom surface of the one or more battery packs 114. In various embodiments, the number of skid plates 158 may correspond to the number of battery packs 114 configured to be accommodated by battery frame assembly 106. However, in various embodiments, a single, integral skid plate 158 may span an entire width and length of battery frame assembly 106. In various embodiments, each skid plate 158 may extend across an entire row or column of battery pack receptacles 146. Moreover, while illustrated herein as comprising multiple separate components coupled to other components of battery frame assembly 106, skid plates 158 are not limited in this regard and may be formed together with other frame components (for example, transition members 502 and 504 discussed in relation to FIG. 11). Skid plates 158 may shield the battery packs 114 from rocks, sticks, uneven ground, and other debris while also supporting bottom surfaces of the battery packs 114.

Figure 6:
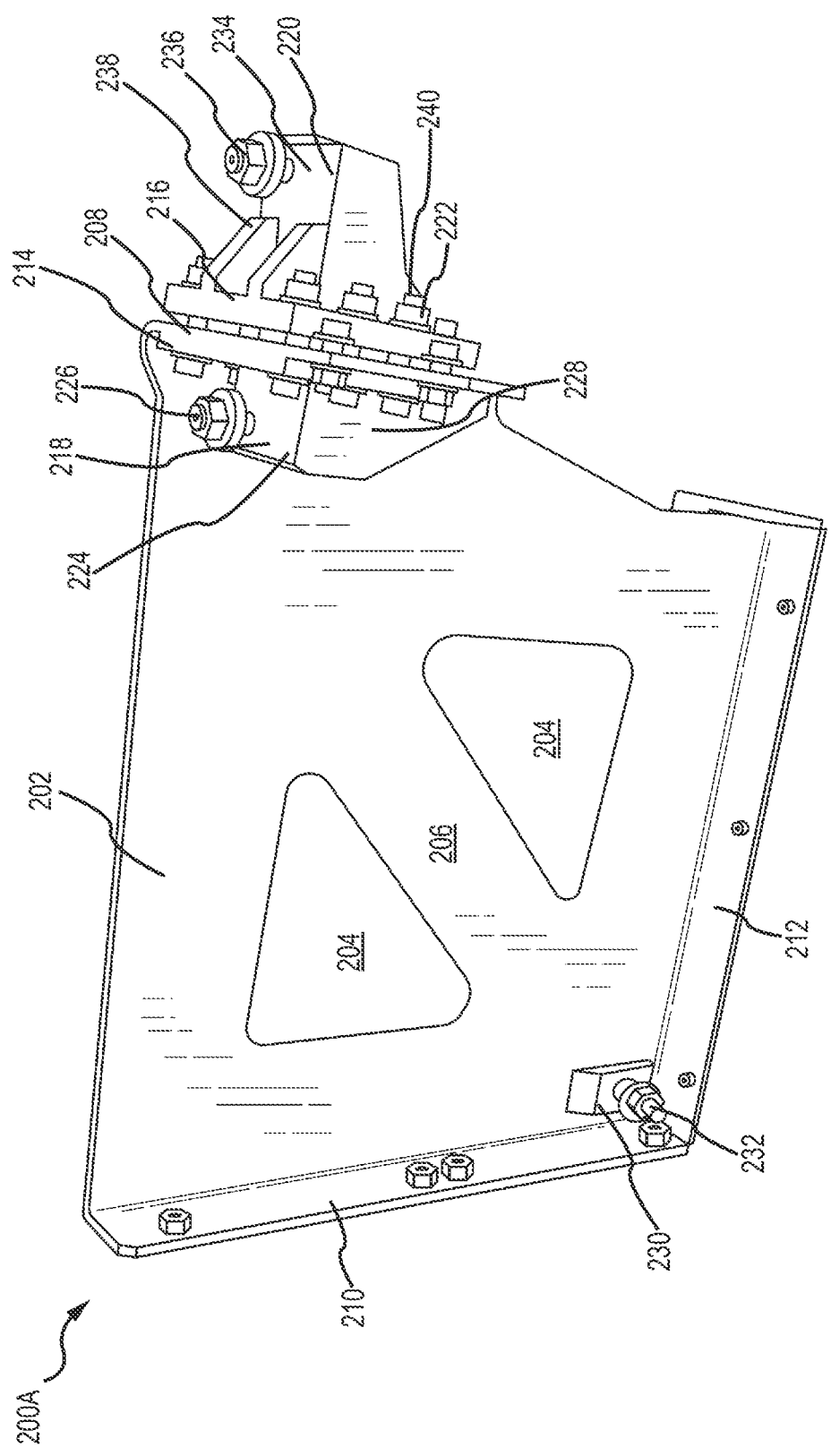
FIG. 6 illustrates a front bracket assembly of a battery frame assembly, in accordance with various embodiments.

With reference now to FIG. 6, first front bracket assembly 200A is illustrated from a rear perspective view, in accordance with various embodiments. First front bracket assembly 200A may be proximate a driver side of electric vehicle 100 while second front bracket assembly 200B may be proximate a passenger side of electric vehicle 100. Second front bracket assembly 200B may be a mirror image (about a Z-Y plane bisecting electric vehicle 100) of first front bracket assembly 200A; therefore, second front bracket assembly 200B will not be discussed in detail herein. First front bracket assembly 200A may comprise a bracket plate 202 which may comprise substantially flat front and rear surfaces and one or more flanges configured to couple first front bracket assembly 200A to other components of battery frame assembly 106. Bracket plate 202 further comprises one or more cutouts 204 separated by a bridge 206. Cutouts 204 may be configured to reduce weight of bracket plate 202 while bridge 206 may be configured to maintain adequate strength of bracket plate 202. More specifically, bridge 206 may be oriented in a diagonal direction between two battery mounts disposed at opposite corners of bracket plate 202. In such a way, bridge 206 may assist in resisting tensile and compression stresses resulting from shifting of the battery pack 114 coupled to bracket plate 202 as the chassis side members experience minor elastic torsional deformation. The front surface of bracket plate 202 may be generally oriented toward the front of electric vehicle 100 while the rear surface of bracket plate 202 may be generally oriented toward the rear of electric vehicle 100. First front bracket assembly 200A (and second front bracket assembly 200B) may be configured to: assist in securing at least one battery pack 114 to vehicle chassis 104, separate at least one battery pack 114 from a rear of the cab of electric vehicle 100, and resist tensile and compression stresses on battery frame assembly 106 in vertical and transverse directions.

First front bracket assembly 200A comprises an inboard flange 208, an outboard flange 210, and a bottom flange 212. Inboard flange 208, outboard flange 210, and bottom flange 212 may be formed integrally with bracket plate 202 or formed separately and coupled to bracket plate 202 thereafter. In various embodiments, inboard flange 208, outboard flange 210, and bottom flange 212 may extend rearward from bracket plate 202. Outboard flange 210 and bottom flange 212 may extend substantially along an entire height (along Z-axis) and width (along Y-axis) of bracket plate 202, respectively. In contrast, inboard flange 208 may only extend a portion of the height of bracket plate 202, for example, an upper half of bracket plate 202. In various embodiments, inboard flange 208 may extend further in the rearward direction than both outboard flange 210 and bottom flange 212. Outboard flange 210 and bottom flange 212 may extend a substantially equal distance in the rearward direction. Inboard flange 208, outboard flange 210, and bottom flange 212 may each form an angle with bracket plate 202 of between approximately 70 to 110 degrees, between approximately 80 to 100 degrees, or more preferably approximately 90 degrees. While illustrated as being devoid of an upper flange in FIG. 6, first front bracket assembly 200A is not limited in this regard and may comprise an upper flange similar to bottom flange 212 in addition to or instead of bottom flange 212.

With reference to FIGS. 3, 4, and 6, outboard flange 210 is coupled to the one or more impact plates 148 using one or more fasteners, welded joints, rivets, or the like. Outboard flange 210 may include one or more apertures configured to receive an equal number of fasteners to couple the one or more impact plates 148 to bracket plate 202. In various embodiments, outboard flange 210 includes four apertures (two for each impact plate); however, outboard flange 210 is not limited in this regard and may comprise more or fewer apertures. Similarly, bottom flange 212 is coupled to the one or more skid plates 158 using one or more fasteners, welded joints, rivets, or the like. Bottom flange 212 may include one or more apertures configured to receive an equal number of fasteners to couple the one or more skid plates 158 to bracket plate 202. In various embodiments, bottom flange 212 includes three apertures, however, bottom flange 212 is not limited in this regard and may comprise more or fewer apertures.

First front bracket assembly 200A further comprises an outboard compression plate 214 and an inboard compression plate 216. Outboard compression plate 214 and inboard compression plate 216 may be configured to couple an outboard battery mount assembly 218 and an inboard battery mount assembly 220, respectively, to first side member 128 of chassis 104. More specifically, outboard compression plate 214, inboard compression plate 216, and inboard flange 208 may each include a plurality of apertures configured to receive an equal number of fasteners 222. An outboard surface of inboard compression plate 216 may be configured to interface with an inboard surface of the web of first side member 128. An inboard surface of outboard compression plate 214 may be configured to interface with an outboard surface of inboard flange 208. An inboard surface of inboard flange 208 may be configured to interface with an outboard surface of the web of first side member 128. The one or more fasteners may couple together outboard compression plate 214, inboard flange 208, inboard compression plate 216, and first side member 128.

Outboard battery mount assembly 218 may be configured to assist in securing a first battery pack 114 in battery pack receptacle A1 and inboard battery mount assembly 220 may be configured to assist in securing a second battery pack 114 in battery pack receptacle B1. In various embodiments, outboard battery mount assembly 218 may be welded or fastened to the outboard surface of outboard compression plate 214. However, in various embodiments, outboard battery mount assembly 218 may be formed integrally with outboard compression plate 214. Similarly, inboard battery mount assembly 220 may be welded or fastened to the inboard surface of inboard compression plate 216. However, in various embodiments, inboard battery mount assembly 220 may be formed integrally with inboard compression plate 216.

Outboard battery mount assembly 218 comprises an outboard block 224, an outboard fastener 226, and one or more lower outboard stiffening ribs 228. Outboard fastener 226 extends through an aperture formed in outboard block 224 and into a battery pack 114 to secure the battery pack 114 to battery frame assembly 106. Lower outboard stiffening ribs 228 are coupled to and extend from a bottom surface of outboard block 224 and couple to an outboard surface of outboard compression plate 214. In various embodiments, outboard battery mount assembly 218 further comprises one or more upper outboard stiffening ribs (not illustrated) instead of or in addition to lower outboard stiffening ribs 228. The outboard stiffening ribs may be configured to resist tensile and compression stresses in vertical and transverse directions. Further, lower outboard stiffening ribs 228 may help guide the battery pack 114 into its mounted position by interfacing with one or more ribs present on the battery pack housing. A lower mount assembly 230 may be coupled to a lower, outboard corner of bracket plate 202 and be configured to couple another portion of the battery pack 114 to battery frame assembly 106. As such, lower mount assembly 230 comprises an aperture configured to receive a fastener 232.

Similarly, inboard battery mount assembly 220 comprises an inboard block 234, an inboard fastener 236, one or more upper inboard stiffening ribs 238, and one or more lower inboard stiffening ribs 240. Inboard fastener 236 extends through an aperture formed in inboard block 234 and into a battery pack 114 to secure the battery pack 114 to battery frame assembly 106. Lower inboard stiffening ribs 240 are coupled to and extend from a bottom surface of inboard block 234 and couple to an inboard surface of inboard compression plate 216. Upper inboard stiffening ribs 238 are coupled to and extend from a top surface of inboard block 234 and are coupled to the inboard surface of inboard compression plate 216. The inboard stiffening ribs may be configured to resist tensile and compression stresses in vertical and transverse directions. Further, lower inboard stiffening ribs 240 may help guide the battery pack 114 into its mounted position by interfacing with one or more ribs present on the battery pack housing. Inboard battery mount assembly 220 may be configured to couple a first portion of the battery pack 114 to battery frame assembly 106 while an inboard battery mount assembly 220 of second front bracket assembly 200B may be configured to couple a second portion of the battery pack 114 to battery frame assembly 106.

Figure 7:
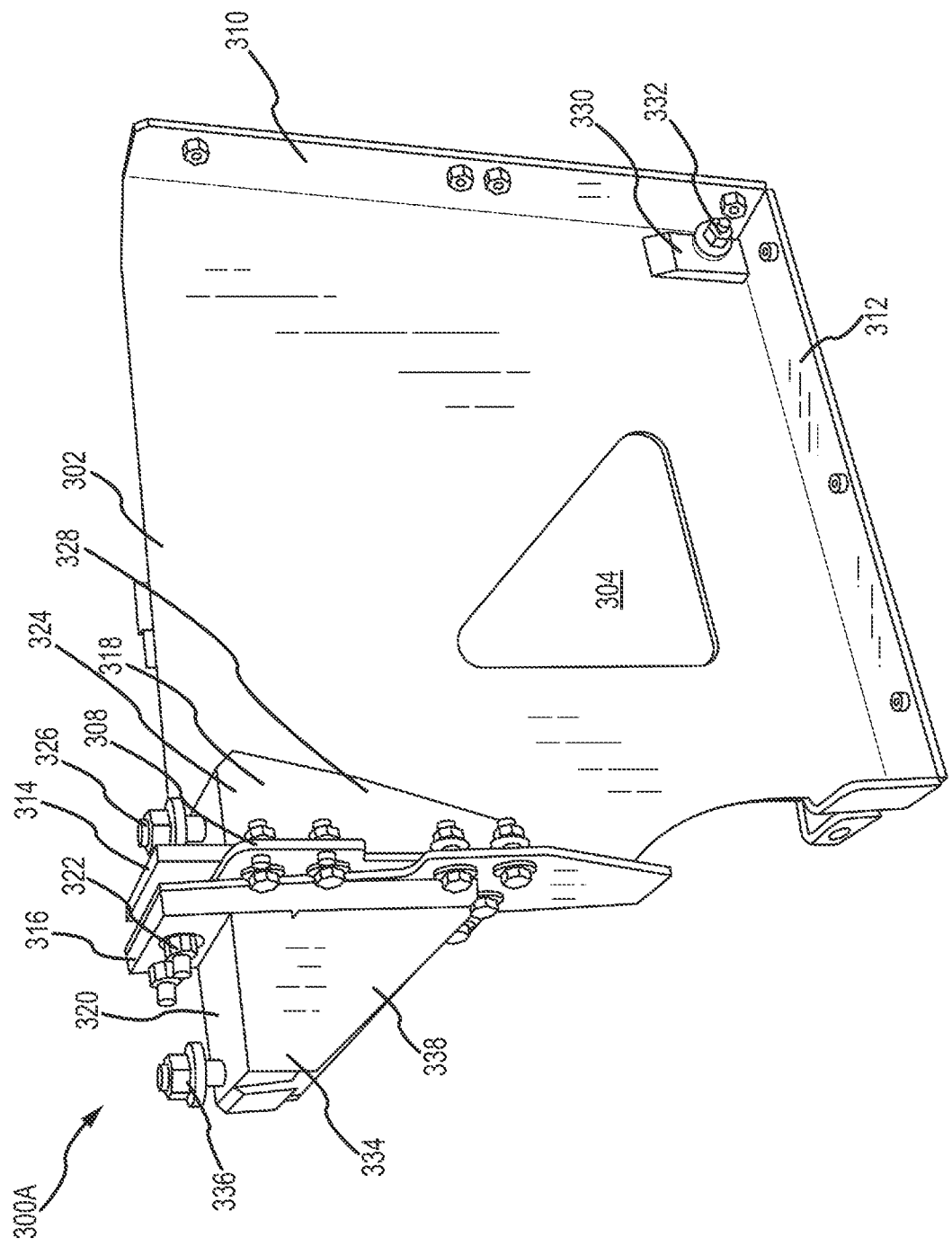
FIG. 7 illustrates a rear bracket assembly of a battery frame assembly, in accordance with various embodiments.

With reference now to FIG. 7, first rear bracket assembly 300A is illustrated from a front perspective view, in accordance with various embodiments. First rear bracket assembly 300A may be proximate a driver side of electric vehicle 100 while second rear bracket assembly 300B may be proximate a passenger side of electric vehicle 100. Second rear bracket assembly 300B may be a mirror image (about a Z-Y plane bisecting electric vehicle 100) of first rear bracket assembly 300A; therefore, second rear bracket assembly 300B will not be discussed in detail herein. Similar to first front bracket assembly 200A, first rear bracket assembly 300A may comprise a bracket plate 302 which may comprise substantially flat front and rear surfaces and one or more flanges configured to couple first rear bracket assembly 300A to other components of battery frame assembly 106. Bracket plate 302 further comprises one or more cutouts 304 which may be configured to reduce weight of bracket plate 302. The front surface of bracket plate 302 may be generally oriented toward the front of electric vehicle 100 while the rear surface of bracket plate 302 may be generally oriented toward the rear of electric vehicle 100. The rear surface of bracket plate 302 may include an area 306 in which a mudguard may be mounted to bracket plate 302 using one or more fasteners (with momentary reference to FIG. 4). First rear bracket assembly 300A (and second rear bracket assembly 300B) may be configured to: assist in securing at least one battery pack 114 to the electric vehicle 100 chassis, separate at least one battery pack 114 from rear wheels of electric vehicle 100, and resist tensile and compression stresses on battery frame assembly 106 in vertical and transverse directions.

First rear bracket assembly 300A comprises an inboard flange 308, an outboard flange 310, and a bottom flange 312. Inboard flange 308, outboard flange 310, and bottom flange 312 may be formed integrally with bracket plate 302 or formed separately and coupled to bracket plate 302 thereafter. In various embodiments, inboard flange 308, outboard flange 310, and bottom flange 312 may extend rearward from bracket plate 302. Outboard flange 310 and bottom flange 312 may extend substantially along an entire height (along Z-axis) and width (along Y-axis) of bracket plate 302, respectively. In contrast, inboard flange 308 may only extend a portion of the height of bracket plate 302, for example, an upper half of bracket plate 302. In various embodiments, inboard flange 308 may extend further in the rearward direction than both outboard flange 310 and bottom flange 312. Outboard flange 310 and bottom flange 312 may extend a substantially equal distance in the rearward direction. Inboard flange 308, outboard flange 310, and bottom flange 312 may each form an angle with bracket plate 302 of between approximately 70 to 110 degrees, between approximately 80 to 100 degrees, or more preferably approximately 90 degrees. While illustrated as being devoid of an upper flange in FIG. 7, first rear bracket assembly 300A is not limited in this regard and may comprise an upper flange similar to bottom flange 312 in addition to or instead of bottom flange 312.

With reference to FIGS. 3, 4, and 7, outboard flange 310 is coupled to the one or more impact plates 148 using one or more fasteners, welded joints, rivets, or the like. Outboard flange 310 may include one or more apertures configured to receive an equal number of fasteners to couple the one or more impact plates 148 to bracket plate 302. In various embodiments, outboard flange 310 includes four apertures (two for each impact plate 148); however, outboard flange 310 is not limited in this regard and may comprise more or fewer apertures. Similarly, bottom flange 312 is coupled to the one or more skid plates 158 using one or more fasteners, welded joints, rivets, or the like. Bottom flange 312 may include one or more apertures configured to receive an equal number of fasteners to couple the one or more skid plates 158 to bracket plate 302. In various embodiments, bottom flange 312 includes three apertures; however, bottom flange 312 is not limited in this regard and may comprise more or fewer apertures.

First rear bracket assembly 300A further comprises an outboard compression plate 314 and an inboard compression plate 316. Outboard compression plate 314 and inboard compression plate 316 may be configured to couple an outboard battery mount assembly 318 and an inboard battery mount assembly 320, respectively, to first side member 128 of chassis 104. More specifically, outboard compression plate 314, inboard compression plate 316, and inboard flange 308 may each include a plurality of apertures configured to receive an equal number of fasteners 322. An outboard surface of inboard compression plate 316 may be configured to interface with an inboard surface of the web of first side member 128. An inboard surface of outboard compression plate 314 may be configured to interface with an outboard surface of inboard flange 308. An inboard surface of inboard flange 308 may be configured to interface with an outboard surface of the web of first side member 128. The one or more fasteners may couple together outboard compression plate 314, inboard flange 308, inboard compression plate 316, and first side member 128.

Outboard battery mount assembly 318 may be configured to assist in securing a first battery pack 114 in battery pack receptacle A3 and inboard battery mount assembly 320 may be configured to assist in securing a second battery pack 114 in battery pack receptacle B3. In various embodiments, outboard battery mount assembly 318 may be welded or fastened to the outboard surface of outboard compression plate 314. However, in various embodiments, outboard battery mount assembly 318 may be formed integrally with outboard compression plate 314. Similarly, inboard battery mount assembly 320 may be welded or fastened to the inboard surface of inboard compression plate 316. However, in various embodiments, inboard battery mount assembly 320 may be formed integrally with inboard compression plate 316.

Outboard battery mount assembly 318 comprises an outboard block 324, an outboard fastener 326, and one or more lower outboard stiffening ribs 328. Outboard fastener 326 extends through an aperture formed in outboard block 324 and into a battery pack 114 to secure the battery pack 114 to battery frame assembly 106. Lower outboard stiffening ribs 328 are coupled to and extend from a bottom surface of outboard block 324 and couple to an outboard surface of outboard compression plate 314. In various embodiments, outboard battery mount assembly 318 further comprises one or more upper outboard stiffening ribs (not illustrated) instead of or in addition to lower outboard stiffening ribs 328. The outboard stiffening ribs may be configured to resist tensile and compression stresses in vertical and transverse directions. Further, lower outboard stiffening ribs 328 may help guide the battery pack 114 into its mounted position by interfacing with one or more ribs present on the battery pack housing. A lower mount assembly 330 may be coupled to a lower, outboard corner of bracket plate 302 and be configured to couple another portion of the battery pack 114 to battery frame assembly 106. As such, lower mount assembly 330 comprises an aperture configured to receive a fastener 332.

Similarly, inboard battery mount assembly 320 comprises an inboard block 334, an inboard fastener 336, and one or more lower inboard stiffening ribs 338. Inboard fastener 336 extends through an aperture formed in inboard block 334 and into a battery pack 114 to secure the battery pack 114 to battery frame assembly 106. Lower inboard stiffening ribs 338 are coupled to and extend from a bottom surface of inboard block 334 and couple to an inboard surface of inboard compression plate 316. In various embodiments, inboard battery mount assembly 320 further comprises one or more upper inboard stiffening ribs (not illustrated) instead of or in addition to lower inboard stiffening ribs 338. The inboard stiffening ribs may be configured to resist tensile and compression stresses in vertical and transverse directions. Further, lower inboard stiffening ribs 338 may help guide the battery pack 114 into its mounted position by interfacing with one or ribs present on the battery pack housing. Inboard battery mount assembly 320 may be configured to couple a first portion of the battery pack 114 to battery frame assembly 106 while an inboard battery mount assembly 320 of second rear bracket assembly 300B may be configured to couple a second portion of the battery pack 114 to battery frame assembly 106.

Figure 8:
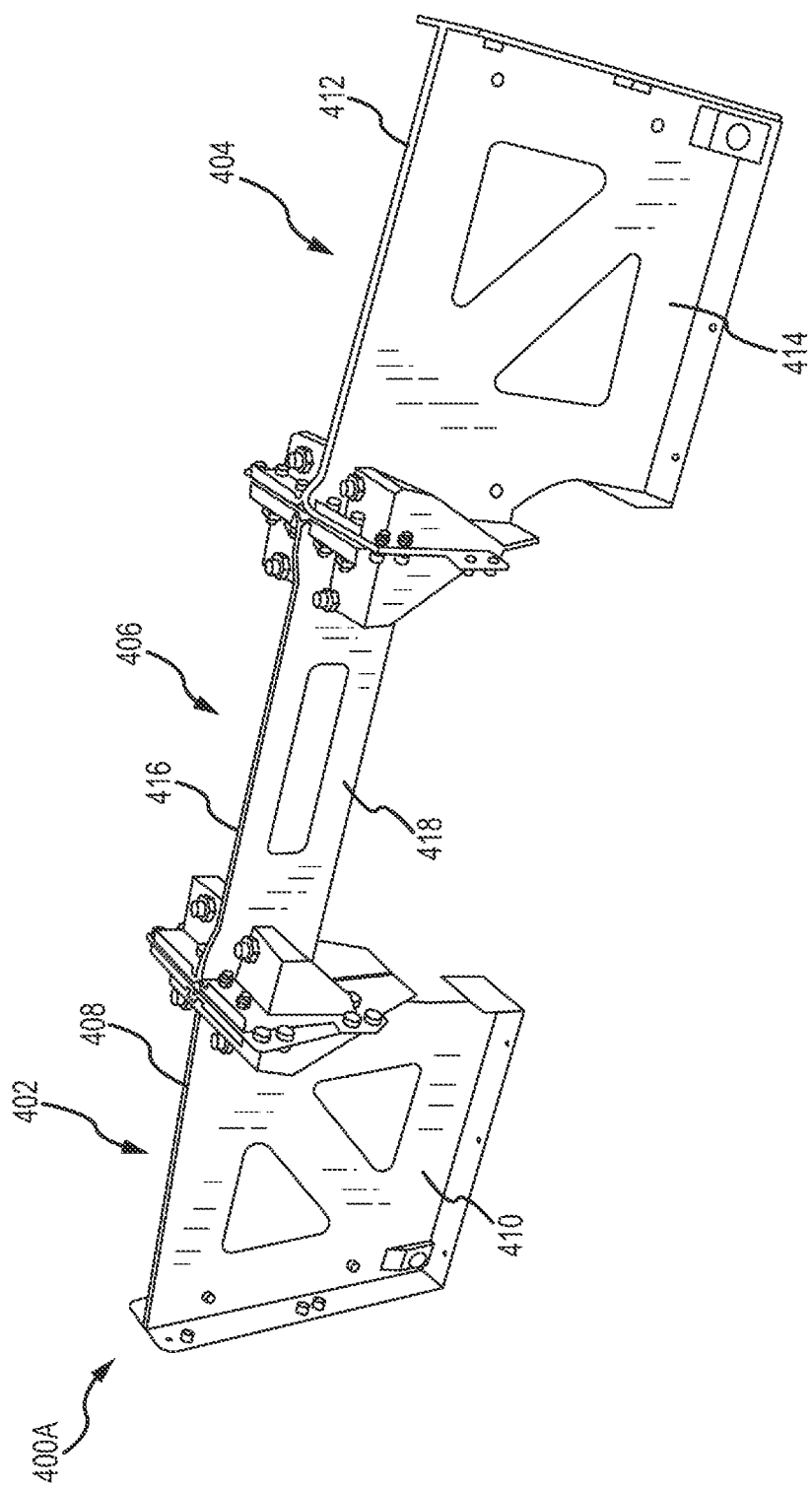
FIG. 8 illustrates an intermediate bracket assembly of a battery frame assembly, in accordance with various embodiments.

With reference now to FIG. 8, first intermediate bracket assembly 400A is illustrated from a rear perspective view, in accordance with various embodiments. First intermediate bracket assembly 400A may be positioned closer to the front of electric vehicle 100 while second intermediate bracket assembly 400B may be positioned closer to the rear of electric vehicle 100. Second intermediate bracket assembly 400B is identical to first intermediate bracket assembly 400A, so second intermediate bracket assembly 400B will not be discussed in detail herein. First intermediate bracket assembly 400A comprises a first outboard bracket assembly 402, a second outboard bracket assembly 404, and an interior bracket assembly 406. With momentary reference to FIG. 3, first outboard bracket assembly 402 may be located on the driver side of electric vehicle 100 and outboard of first side member 128 of chassis 104. Second outboard bracket assembly 404 may be located on a passenger side of electric vehicle 100 and outboard of second side member 130 of chassis 104. Interior bracket assembly 406 may be positioned between first side member 128 and second side member 130. With momentary reference to FIG. 4, first outboard bracket assembly 402 may be coupled to and support a rear portion of a battery pack 114 in battery pack receptacle A1 and may be coupled to and support a front portion of a battery pack 114 in battery pack receptacle A2. Second outboard bracket assembly 404 may be coupled to and support a rear portion of a battery pack 114 in battery pack receptacle C1 and may be coupled to and support a front portion of a battery pack 114 in battery pack receptacle C2. Finally, interior bracket assembly 406 may be coupled to and support a rear portion of a battery pack 114 in battery pack receptacle B1 and may be coupled to and support a rear portion of a battery pack 114 in battery pack receptacle B2.

Returning primarily to FIG. 8, first outboard bracket assembly 402 comprises a front outboard bracket subassembly 408 and a rear outboard bracket subassembly 410. Similarly, second outboard bracket assembly 404 comprises a front outboard bracket subassembly 412 and a rear outboard bracket subassembly 414. Interior bracket assembly 406 comprises a front interior bracket subassembly 416 and a rear interior bracket subassembly 418. First intermediate bracket assembly 400A may be symmetrical about an X-Z plane bisecting first intermediate bracket assembly 400A. Stated otherwise, front outboard bracket subassembly 408 may be a mirror image of rear outboard bracket subassembly 410, front outboard bracket subassembly 412 may be a mirror image of rear outboard bracket subassembly 414, and front interior bracket subassembly 416 may be a mirror image of rear interior bracket subassembly 418. In order to reduce part count, increase ease of manufacturing, reduce materials waste and/or achieve cost savings, front outboard bracket subassembly 408 is identical to rear outboard bracket subassembly 414. Stated otherwise, front outboard bracket subassembly 408 may be duplicated, rotated 180° about the X-axis, and translated along the Z and Y axes to form rear outboard bracket assembly 414. Similarly, front outboard bracket subassembly 412 is identical to rear outboard bracket subassembly 410. Stated otherwise, front outboard bracket subassembly 412 may be duplicated, rotated 180° about the X-axis, and translated along the Z and Y axes to form rear outboard bracket subassembly 410. Finally, front interior bracket subassembly 416 is identical to rear interior bracket subassembly 418. Stated otherwise, front interior bracket subassembly 416 may be rotated 180° about the X-axis and translated along the Y-axis to form rear interior bracket subassembly 418.

In various embodiments, a rear surface of front outboard bracket subassembly 408 may interface with a front surface of rear outboard bracket subassembly 410. Front outboard bracket subassembly 408 and rear outboard bracket subassembly 410 may be coupled together via one or more fasteners, welded joints, rivets, or the like to form first outboard bracket assembly 402. Similarly, a rear surface of front outboard bracket subassembly 412 may interface with a front surface of rear outboard bracket subassembly 414. Front outboard bracket subassembly 412 and rear outboard bracket subassembly 414 may be coupled together via one or more fasteners, welded joints, rivets, or the like to form second outboard bracket assembly 404. A rear surface of front interior bracket subassembly 416 may interface with a front surface of rear interior bracket subassembly 418. Front interior bracket subassembly 416 and rear interior bracket subassembly 418 may be coupled together via one or more fasteners, welded joints, rivets, or the like to form interior bracket assembly 406. Because rear outboard bracket subassembly 410 and front outboard bracket subassembly 412 are mirror images of front outboard bracket subassembly 408 and rear outboard bracket subassembly 414 is identical to front outboard bracket subassembly 408, the structure and function of the various outboard bracket subassemblies will be discussed herein in relation to front outboard bracket subassembly 408 only and not repeated for the remaining outboard bracket subassemblies. Moreover, because rear interior bracket subassembly 418 is identical to front interior bracket subassembly 416, the structure and function of the interior bracket subassemblies will be discussed herein in relation to front interior bracket subassembly 416 only and not repeated for rear interior bracket subassembly 418.

Figure 9:
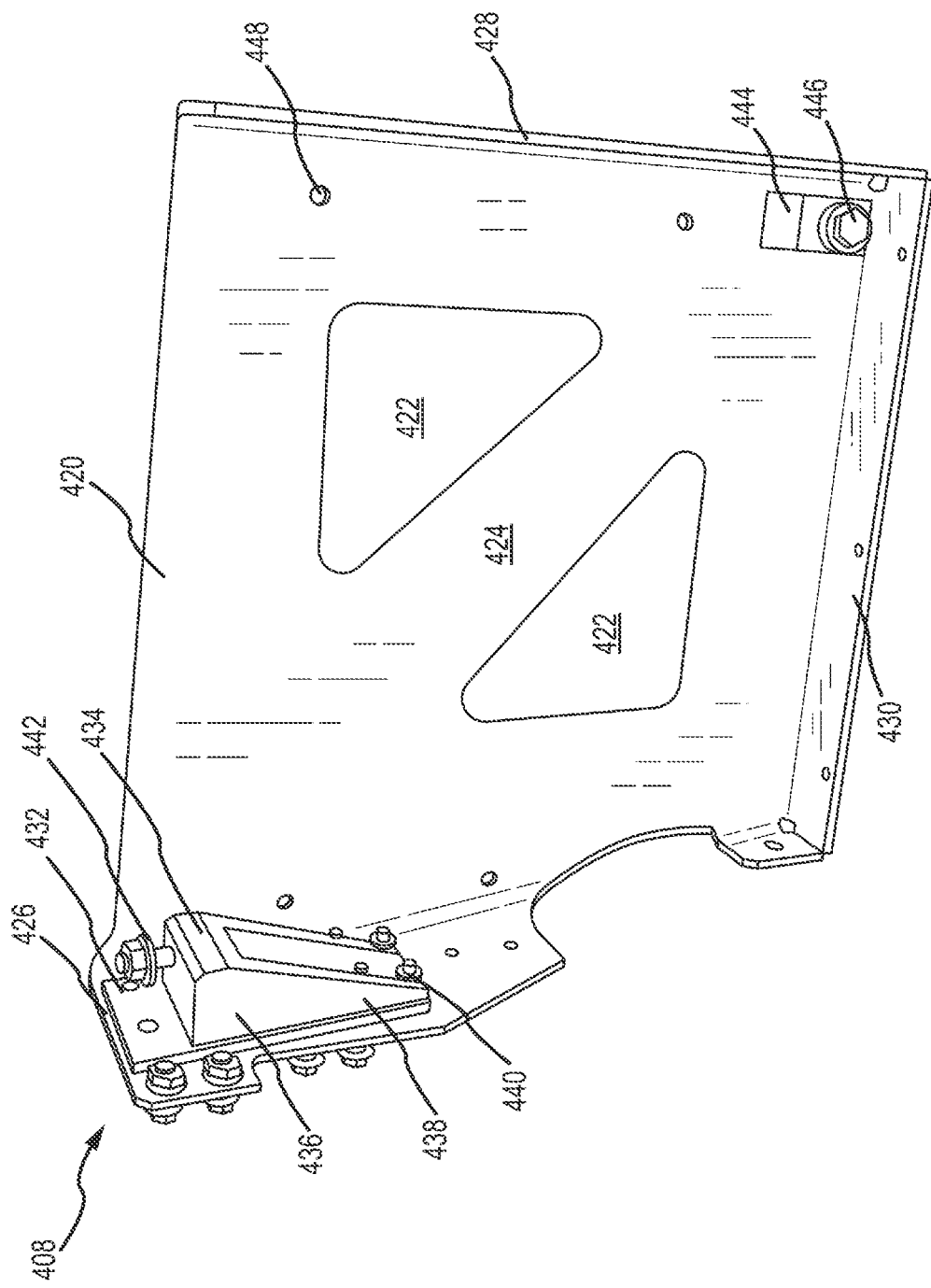
FIG. 9 illustrates a front outboard bracket subassembly of a battery frame assembly, in accordance with various embodiments.

Referring now to FIG. 9, front outboard bracket subassembly 408 is illustrated from a front perspective view, in accordance with various embodiments. Front outboard bracket subassembly 408 may be substantially similar to first front bracket assembly 200A described in relation to FIG. 6. More specifically, front outboard bracket subassembly 408 may be a mirror image of first front bracket assembly 200A but may otherwise include many of the same features as first front bracket assembly 200A in different orientations. In general, front outboard bracket subassembly 408 may contain all the same features as first front bracket assembly 200A aside from an inboard compression plate and an inboard battery mount assembly which may form a portion of front interior bracket subassembly 416 described in relation to FIG. 10.

Front outboard bracket subassembly 408 comprises a bracket plate 420 which may comprise substantially flat front and rear surfaces and one or more flanges configured to couple front outboard bracket subassembly 408 to other components of battery frame assembly 106. Bracket plate 420 further comprises one or more cutouts 422 separated by a bridge 424. Cutouts 422 may be configured to reduce weight of bracket plate 420 while bridge 424 may be configured to maintain adequate strength of bracket plate 420. More specifically, bridge 424 may be oriented in a diagonal direction between two battery mounts disposed at opposite corners of bracket plate 420. In such a way, bridge 424 may assist in resisting tensile and compression stresses resulting from shifting of the battery pack 114 coupled to bracket plate 420 as the chassis side members experience minor elastic torsional deformation. The front surface of bracket plate 420 may be generally oriented toward the front of electric vehicle 100 while the rear surface of bracket plate 420 may be generally oriented toward the rear of electric vehicle 100. Front outboard bracket subassembly 408 (and the remaining outboard bracket subassemblies) may be configured to: assist in securing at least one battery pack 114 to the electric vehicle 100 chassis, separate at least one battery pack 114 from at least one other battery pack 114, and resist tensile and compression stresses on battery frame assembly 106 in the vertical and transverse directions.

Front outboard bracket subassembly 408 comprises an inboard flange 426, an outboard flange 428, and a bottom flange 430. Inboard flange 426, outboard flange 428, and bottom flange 430 may be formed integrally with bracket plate 420 or formed separately and coupled to bracket plate 420 thereafter. In various embodiments, inboard flange 426, outboard flange 428, and bottom flange 430 may extend forward from bracket plate 420. Outboard flange 428 and bottom flange 430 may extend substantially along an entire height (along Z-axis) and width (along Y-axis) of bracket plate 420, respectively. In contrast, inboard flange 426 may only extend a portion of the height of bracket plate 420, for example, an upper half of bracket plate 420. In various embodiments, inboard flange 426 may extend further toward the front of electric vehicle 100 than both outboard flange 428 and bottom flange 430. Outboard flange 428 and bottom flange 430 may extend a substantially equal distance from the front surface of bracket plate 420. Inboard flange 426, outboard flange 428, and bottom flange 430 may each form an angle with bracket plate 420 of between approximately 70 to 110 degrees, between approximately 80 to 100 degrees, or more preferably approximately 90 degrees.

While illustrated as being devoid of an upper flange in FIG. 9, front outboard bracket subassembly 408 is not limited in this regard and may comprise an upper flange similar to bottom flange 430 in addition to or instead of bottom flange 430. Bracket plate 420 may further comprise one or more apertures 448 configured to receive an equal number of fasteners to couple bracket plate 420 to a bracket plate associated with rear outboard bracket subassembly 410 (with momentary reference to FIG. 8).

With reference to FIGS. 3, 4, and 9, outboard flange 428 is coupled to the one or more impact plates 148 using one or more fasteners, welded joints, rivets, or the like. Outboard flange 428 may include one or more apertures configured to receive an equal number of fasteners to couple the one or more impact plates 148 to bracket plate 420. In various embodiments, outboard flange 428 includes four apertures 448 (two for each impact plate 148), however, outboard flange 428 is not limited in this regard and may comprise more or fewer apertures 448. Similarly, bottom flange 430 is coupled to the one or more skid plates 158 using one or more fasteners, welded joints, rivets, or the like. Bottom flange 430 may include one or more apertures 448 configured to receive an equal number of fasteners to couple the one or more skid plates 158 to bracket plate 420. In various embodiments, bottom flange 430 includes three apertures 448, however, bottom flange 430 is not limited in this regard and may comprise more or fewer apertures.

Front outboard bracket subassembly 408 further comprises a compression plate 432 configured to couple a battery mount assembly 434 to first side member 128 of chassis 104. More specifically, compression plate 432 and inboard flange 426 may each include a plurality of apertures configured to receive an equal number of fasteners 440. An outboard surface of compression plate 432 may be configured to interface with an inboard surface of battery mount assembly 434. An inboard surface of compression plate 432 may be configured to interface with an outboard surface of the web of first side member 128. The one or more fasteners 440 may couple together compression plate 432, battery mount assembly 434, and first side member 128. In various embodiments, battery mount assembly 434 may be welded or fastened to the outboard surface of compression plate 432. However, in various embodiments, battery mount assembly 434 may be formed integrally with compression plate 432.

Battery mount assembly 434 comprises a block 436, a fastener 442, and one or more lower stiffening ribs 438. Fastener 442 extends through an aperture formed in block 436 and into the battery pack 114 to secure the battery pack 114 to battery frame assembly 106. Lower stiffening ribs 438 are coupled to and extend from a bottom surface of block 436 and couple to an outboard surface of compression plate 432. In various embodiments, battery mount assembly 434 further comprises one or more upper stiffening ribs (not illustrated) instead of or in addition to lower stiffening ribs 438. The stiffening ribs may be configured to resist tensile and compression stresses in vertical and transverse directions. Further, lower stiffening ribs 438 may help guide the battery pack 114 into its mounted position by interfacing with one or ribs present on the battery pack housing. A lower mount assembly 444 may be coupled to a lower, outboard corner of bracket plate 420 and be configured to couple another portion of the battery pack 114 to battery frame assembly 106. As such, lower mount assembly 444 comprises an aperture configured to receive a fastener 446.

Front outboard bracket subassembly 408 may be configured to assist in securing a battery pack 114 in battery pack receptacle A1. For example, a rear end of a battery pack 114 in battery pack receptacle A1 may be coupled to front outboard bracket subassembly 408 via lower mount assembly 444 and battery mount assembly 434 and a front end of the battery pack 114 may be coupled to outboard battery mount assembly 218 and lower mount assembly 230 of first front bracket assembly 200A. Together, front outboard bracket subassembly 408 and first front bracket assembly 200A may limit movement of the battery pack 114 relative to chassis 104 to prevent damage to the battery pack 114 as chassis 104 and battery frame assembly 106 experience minor deformation resulting from normal vehicle 100 operation.

Figure 10:
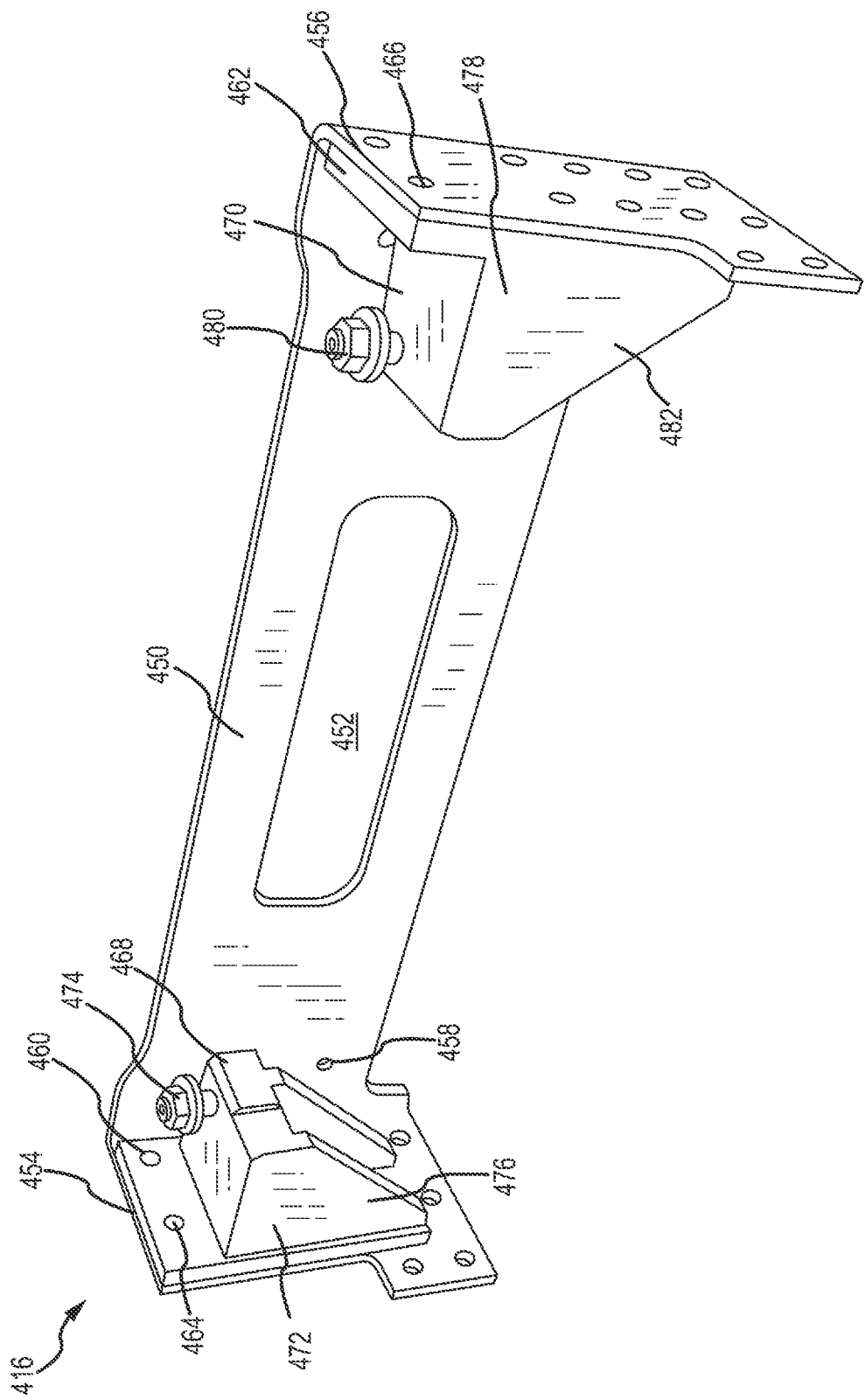
FIG. 10 illustrates a front interior bracket subassembly of a battery frame assembly, in accordance with various embodiments.

Referring now to FIG. 10, front interior bracket subassembly 416 is illustrated from a front perspective view, in accordance with various embodiments. Front interior bracket subassembly 416 comprises a bracket plate 450 which may comprise substantially flat front and rear surfaces and one or more flanges configured to couple front interior bracket subassembly 416 to the vehicle chassis 104. Bracket plate 450 further comprises one or more cutouts 452 which may reduce weight of bracket plate 450. The front surface of bracket plate 450 may be generally oriented toward the front of electric vehicle 100 while the rear surface of bracket plate 450 may be generally oriented toward the rear of electric vehicle 100. Front interior bracket subassembly 416 (and the remaining interior bracket subassemblies) may be configured to: assist in securing at least one battery pack 114 to the vehicle chassis 104, separate at least one battery pack 114 from at least one other battery pack 114, and resist tensile and compression stresses on battery frame assembly 106 in the vertical and transverse directions.

Front interior bracket subassembly 416 comprises a first flange 454 and a second flange 456 opposite first flange 454. First flange 454 and second flange 456 may be formed integrally with bracket plate 450 or formed separately and coupled to bracket plate 450 thereafter. In various embodiments, first flange 454 and second flange 456 may extend forward from bracket plate 420. First flange 454 and second flange 456 may extend substantially along an entire height (along Z-axis) of bracket plate 450. First flange 454 and second flange 456 may extend a substantially equal distance from the front surface of bracket plate 450. First flange 454 and second flange 456 may each form an angle with bracket plate 450 of between approximately 70 to 110 degrees, between approximately 80 to 100 degrees, or more preferably approximately 90 degrees. Bracket plate 450 may further comprise one or more apertures 458 configured to receive an equal number of fasteners to couple bracket plate 450 to a bracket plate associated with rear interior bracket subassembly 418 (with momentary reference to FIG. 8).

With reference now to FIGS. 3, 4, and 10, front interior bracket subassembly 416 further comprises a first compression plate 460 and a second compression plate 462. First compression plate 460 and second compression plate 462 may be configured to assist in securing front interior bracket subassembly 416 to first side member 128 and second side member 130. More specifically, first flange 454 and first compression plate 460 may each include a plurality of apertures 464 configured to receive an equal number of fasteners. An outboard surface of first compression plate 460 may be configured to interface with an inboard surface of first flange 454. An outboard surface of first flange 454 may be configured to interface with an inboard surface of the web of second side member 130. First flange 454, first compression plate 460, and second side member 130 may be coupled via the one or more fasteners extending through apertures 464. Similarly, second flange 456 and second compression plate 462 may each include a plurality of apertures 466 configured to receive an equal number of fasteners. An outboard surface of second compression plate 462 may be configured to interface with an inboard surface of second flange 456. An outboard surface of second flange 456 may be configured to interface with an inboard surface of the web of first side member 128. Second flange 456, second compression plate 462, and second side member 130 may be coupled via the one or more fasteners extending through apertures 466.

Front interior bracket subassembly 416 further comprises a first battery mount assembly 468 and a second battery mount assembly 470. First battery mount assembly 468 comprises a block 472, a fastener 474, and one or more lower stiffening ribs 476. Fastener 474 extends through an aperture formed in block 472 and into the battery pack 114 to secure the battery pack 114 to battery frame assembly 106. Lower stiffening ribs 476 are coupled to and extend from a bottom surface of block 472 and couple to an inboard surface of first compression plate 460. In various embodiments, first battery mount assembly 468 further comprises one or more upper stiffening ribs (not illustrated) instead of or in addition to lower stiffening ribs 476. The stiffening ribs may be configured to resist tensile and compression stresses in vertical and transverse directions. Further, lower stiffening ribs 476 may help guide the battery pack 114 into its mounted position by interfacing with one or ribs present on the battery pack housing. Similarly, second battery mount assembly 470 comprises a block 478, a fastener 480, and one or more lower stiffening ribs 482. Fastener 480 extends through an aperture formed in block 478 and into the battery pack 114 to secure the battery pack 114 to battery frame assembly 106. Lower stiffening ribs 482 are coupled to and extend from a bottom surface of block 478 and couple to an inboard surface of second compression plate 462. In various embodiments, second battery mount assembly 470 further comprises one or more upper stiffening ribs (not illustrated) instead of or in addition to lower stiffening ribs 482. The stiffening ribs may be configured to resist tensile and compression stresses in vertical and transverse directions. Further, lower stiffening ribs 482 may help guide the battery pack 114 into its mounted position by interfacing with one or more ribs present on the battery pack housing.

Front interior bracket subassembly 416 may be configured to assist in securing a battery pack 114 in battery pack receptacle B1. For example, a rear end of the battery pack 114 in battery pack receptacle B1 may be coupled to front interior bracket subassembly 416 via first battery mount assembly 468 and second battery mount assembly 470 and a front end of the battery pack 114 in battery pack receptacle B1 may be coupled to inboard battery mount assembly 220 of first front bracket assembly 200A and an inboard battery mount assembly of second front bracket assembly 200B. Together, first front bracket assembly 200A, second front bracket assembly 200B, and front interior bracket subassembly 416 may limit movement of the battery pack relative to chassis 104 to prevent damage to the battery pack 114 as chassis 104 and battery frame assembly 106 experience minor deformation resulting from normal electric vehicle 100 operation.

Figure 11:
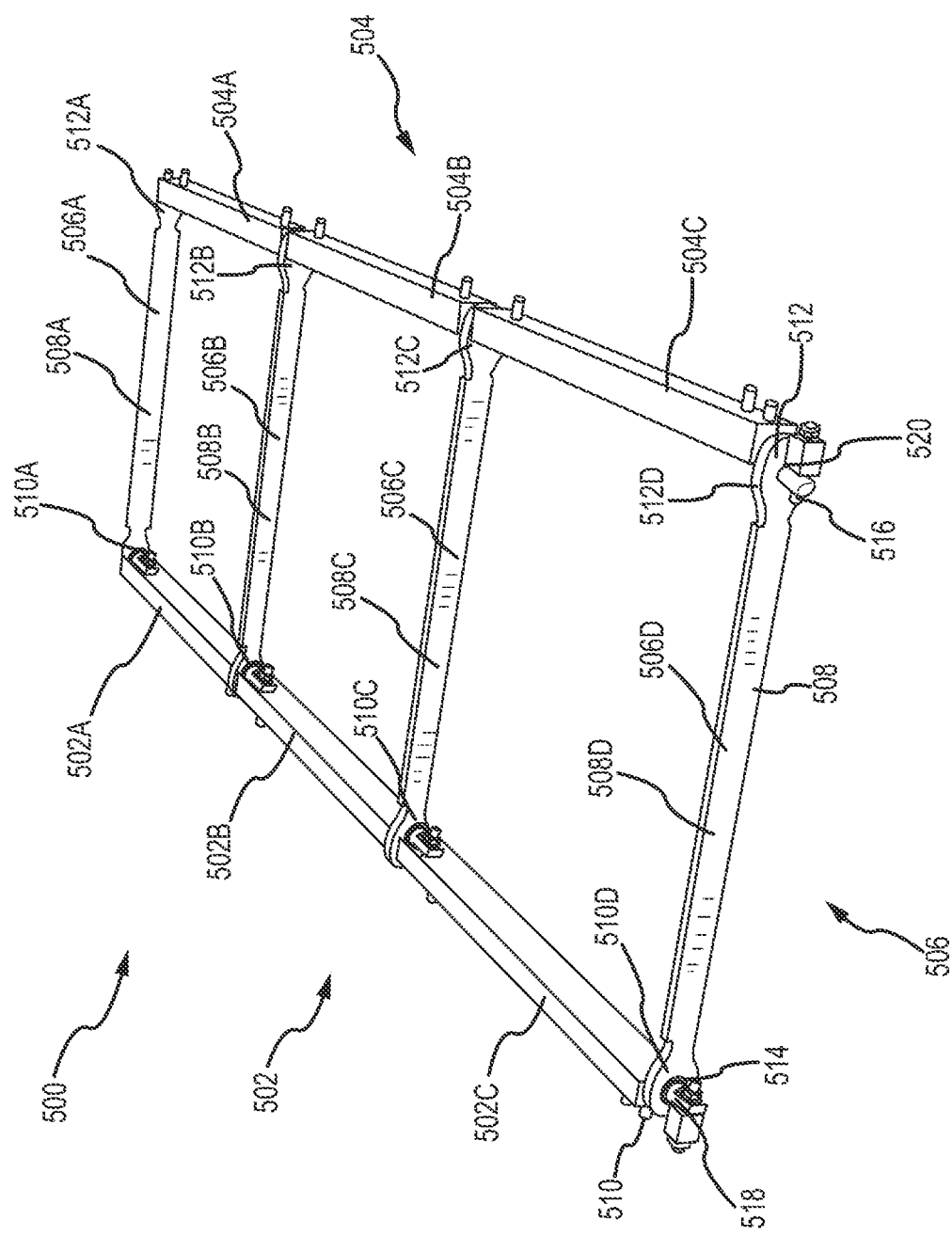
FIG. 11 illustrates an underframe assembly of a battery frame assembly, in accordance with various embodiments.

Referring now to FIGS. 4 and 11, an underframe assembly 500 is illustrated coupled to the remaining portions of battery frame assembly 106 as well as separated from the remaining portions of battery frame assembly 106, respectively, in accordance with various embodiments. Underframe assembly 500 comprises a ladder-like structure extending along the longitudinal length of battery frame assembly 106. Underframe assembly 500 may be centrally located relative to the vehicle chassis 104 and electric vehicle 100 in the transverse direction. For example, underframe assembly 500 may comprise one or more first longitudinally extending transition members 502, one or more second longitudinally extending transition members 504, and one or more transversely extending push bar assemblies 506. The first transition members 502 may be oriented in a parallel configuration with the second transition members 504. With momentary reference to FIG. 3, first transition members 502 may be oriented in a parallel configuration and offset vertically below first side member 128 of chassis 104 while second transition members 504 may be oriented in a parallel configuration and offset vertically below second side member 130 of chassis 104.

Returning to FIGS. 4 and 11, underframe assembly 500 comprises a first front transition member 502A, a first intermediate transition member 502B, and a first rear transition member 502C. Underframe assembly 500 further comprises a second front transition member 504A, a second intermediate transition member 504B, and a second rear transition member 504C. First front transition member 502A, first intermediate transition member 502B, and first rear transition member 502C are proximate the driver side of the electric vehicle 100 while second front transition member 504A, second intermediate transition member 504B, and second rear transition member 504C are proximate the passenger side of the electric vehicle 100. First front transition member 502A is spaced apart from second front transition member 504A in the transverse direction, first intermediate transition member 502B is spaced apart from second intermediate transition member 504B in the transverse direction, and first rear transition member 502C is spaced apart from second rear transition member 504C in the transverse direction.

In various embodiments, first front transition member 502A, first intermediate transition member 502B, first rear transition member 502C, second front transition member 504A, second intermediate transition member 504B, and second rear transition member 504C comprise C-channels. For example, each of the above-stated transition members may comprise a top flange, a bottom flange, and a web separating the top flange and the bottom flange in the vertical direction. As illustrated in FIG. 11, the top flanges and bottom flanges of the various transition members may extend away from the webs of the respective transition members in a direction toward the transverse center of electric vehicle 100. While illustrated herein as comprising members having a C-channel cross-section geometry, the various transition members are not limited in this regard and may comprise members having any suitable cross-sectional geometry including S-beams, W-beams, H-beams, I-beams, L-beams, or the like.

First front transition member 502A and second front transition member 504A are coupled to a first skid plate 158. For example, the bottom flange of first front transition member 502A and the bottom flange of second front transition member 504A may be coupled to a skid plate 158 in battery pack receptacle B1. In various embodiments, the skid plate 158 may be coupled to top or bottom surfaces of the bottom flanges using one or more fasteners, welded joints, rivets, or the like. However, in various embodiments, the skid plate 158 may be formed integrally with first front transition member 502A and second front transition member 504A. In various embodiments, the skid plate 158 may be coupled to top or bottom surfaces of the top flanges rather than the bottom flanges of first front transition member 502A and second front transition member 504A.

Similarly, first intermediate transition member 502B and second intermediate transition member 504B are coupled to a second skid plate 158. For example, the bottom flange of first intermediate transition member 502B and the bottom flange of second intermediate transition member 504B may be coupled to a skid plate 158 in battery pack receptacle B2. In various embodiments, the skid plate 158 may be coupled to top or bottom surfaces of the bottom flanges using one or more fasteners, welded joints, rivets, or the like. However, in various embodiments, the skid plate 158 may be formed integrally with first intermediate transition member 502B and second intermediate transition member 504B. In various embodiments, the skid plate 158 may be coupled to top or bottom surfaces of the top flanges rather than the bottom flanges of first intermediate transition member 502B and second intermediate transition member 504B.

Finally, first rear transition member 502C and second rear transition member 504C are coupled to a third skid plate 158. For example, the bottom flange of first rear transition member 502C and the bottom flange of second rear transition member 504C may be coupled to a skid plate 158 in battery pack receptacle C2. In various embodiments, the skid plate 158 may be coupled to top or bottom surfaces of the bottom flanges using one or more fasteners, welded joints, rivets, or the like. However, in various embodiments, the skid plate 158 may be formed integrally with first rear transition member 502C and second rear transition member 504C. In various embodiments, the skid plate 158 may be coupled to top or bottom surfaces of the top flanges rather than the bottom flanges of first rear transition member 502C and second rear transition member 504C.

Underframe assembly 500 further comprises a front push bar assembly 506A, a first intermediate push bar assembly 506B, a second intermediate push bar assembly 506C, and a rear push bar assembly 506D. First intermediate push bar assembly 506B may be parallel to and positioned rearward of front push bar assembly 506A. Second intermediate push bar assembly 506C may be parallel to and positioned rearward of first intermediate push bar assembly 506B. Rear push bar assembly 506D may be parallel to and positioned rearward of second intermediate push bar assembly 506C. In various embodiments, the longitudinal distance between the various push bar assemblies may be equal, however, underframe assembly 500 is not limited in this regard and the various push bar assemblies may be separated by unequal distances.

Front push bar assembly 506A, first intermediate push bar assembly 506B, second intermediate push bar assembly 506C, and rear push bar assembly 506D each comprise a push bar 508, a first bearing mount 510, and a second bearing mount 512 opposite first bearing mount 510. In various embodiments, all or a portion of the above-stated push bar assemblies comprise a first bearing mount 510 and a second bearing mount 512. For example, all or a portion of the push bar assemblies may comprise no bearing mounts, a single bearing mount, two bearing mounts, or more than two bearing mounts. Front push bar assembly 506A comprises a front push bar 508A, a first front bearing mount 510A, and a second front bearing mount 512A. First intermediate push bar assembly 506B comprises a first intermediate push bar 508B, a first intermediate first bearing mount 510B, and a first intermediate second bearing mount 512B. Second intermediate push bar assembly 506C comprises a second intermediate push bar 508C, a second intermediate first bearing mount 510C, and a second intermediate second bearing mount 512C. Rear push bar assembly 506D comprises a rear push bar 508D, a first rear bearing mount 510D, and a second rear bearing mount 512D.

The first bearing mounts 510 and the second bearing mounts 512 may be coupled to the respective push bars 508 in various manners. For example, in various embodiments, the first bearing mounts 510 and the second bearing mounts 512 may be inserted into apertures formed in the ends of the respective push bars 508 and coupled to the push bars 508 using one or more fasteners, welded joints, rivets, or the like. In various embodiments, push bars 508 may be inserted into apertures formed in the respective first bearing mounts 510 and second bearing mounts 512 and coupled using one or more fasteners, welded joints, rivets, or the like. In various embodiments, a flat surface (top, bottom, front, rear) on the push bars 508 may interface with a flat surface (top, bottom, front, rear) on the first bearing mounts 510 and second bearing mounts 512 and coupled together using one or more fasteners, welded joints, rivets, or the like. In various embodiments, the push bars 508, first bearing mounts 510, and second bearing mounts 512 may be formed as single, integral components.

First bearing mount 510 comprises a longitudinally extending aperture 514 and second bearing mount 512 comprises a longitudinally extending aperture 516. Aperture 514 in first bearing mount 510 may be configured to receive a first bearing shaft 518 and aperture 516 in second bearing mount 512 may be configured to receive a second bearing shaft 520. At least one bearing may be positioned between first bearing mount 510 and first bearing shaft 518 and at least one bearing may be positioned between second bearing mount 512 and second bearing shaft 520. The bearings positioned between first bearing mount 510 and first bearing shaft 518 and between second bearing mount 512 and second bearing shaft 520 may be configured to permit rotation of first bearing mount 510 relative to first bearing shaft 518 and permit rotation of second bearing mount 512 relative to second bearing shaft 520. For example, in various embodiments, the bearings may permit rotation of the first bearing mount 510 and the second bearing mount 512 about longitudinal axes extending through apertures 514 and 516, respectively. However, in various embodiments, the bearings may permit rotation about two axes (longitudinal and transverse or vertical) or permit rotation about three axes (longitudinal, transverse, and vertical).

Figure 12:
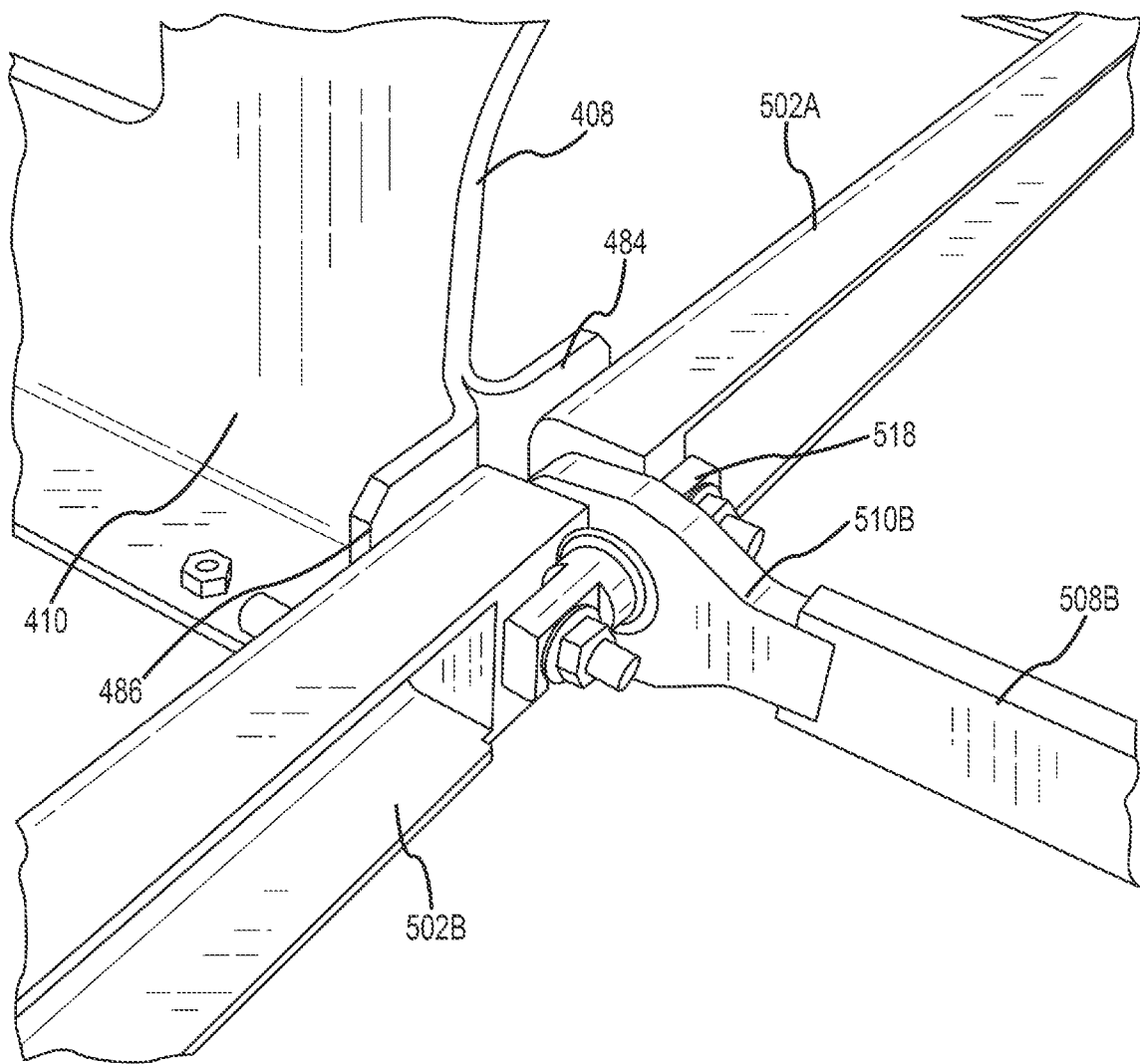
FIG. 12 illustrates a portion of a push bar assembly coupled to transition members and an intermediate bracket assembly, in accordance with various embodiments.

Referring now to FIG. 12, first intermediate push bar 508B is illustrated coupled to first front transition member 502A, first intermediate transition member 502B, front outboard bracket subassembly 408, and rear outboard bracket subassembly 410, in accordance with various embodiments. While discussed herein in relation to first intermediate push bar 508B, first front transition member 502A, first intermediate transition member 502B, front outboard bracket subassembly 408, and rear outboard bracket subassembly 410, it should be appreciated that the mounting components and methods discussed herein may apply similarly to the various other push bars, transition members, and bracket assemblies and bracket subassemblies. However, these various other connections will not be discussed in detail herein for sake of brevity.

In various embodiments, front outboard bracket subassembly 408 comprises an underframe mounting flange 484 and rear outboard bracket subassembly 410 comprises an underframe mounting flange 486. Underframe mounting flange 484 and first front transition member 502A each comprise an aperture extending transversely through the components and configured to receive a first fastener that may also extend through a front portion of first bearing shaft 518. Similarly, underframe mounting flange 486 and first intermediate transition member 502B each comprise an aperture extending transversely through the components and configured to receive a second fastener that may also extend through a rear portion of first bearing shaft 518. In various embodiments, the first fastener and the second fastener may extend through a front portion and a rear portion of first bearing shaft 518, respectively, such that a single fastener may be positioned on either end of first intermediate bearing mount 510B.

With reference to FIGS. 3, 4, and 11, battery frame assembly 106 may result in numerous mechanical benefits not necessarily achieved by existing battery frame assemblies on medium and heavy-duty electric vehicles. For example, the components, attachments, structures associated with battery frame assembly 106 may be configured to compliment the mechanics of chassis 104. First, battery frame assembly 106 may be positioned between second intermediate crossmember 142B and third intermediate crossmember 142C such that chassis 104 may comprise and/or be configured with a substantially uniform stiffness (vertical, lateral, torsion) along the entire longitudinal length of chassis 104. For example, end crossmember 140, first intermediate cross member 142A, second intermediate crossmember 142B, and third intermediate crossmember 142C may resist vertical and transverse compression and tension stresses as well as limit torsional deflection of first side member 128 and second side member 130. The interior bracket assemblies of first intermediate bracket assembly 400A and 400B may also resist vertical and transverse compression and tension stresses. As such, chassis 104 may experience a uniform stress distribution throughout its longitudinal length which may extend the useful lifespan of various components of chassis 104 and/or battery frame assembly 106 (including those components which mount battery frame assembly 106 to chassis 104). Other battery frame assemblies and pack configurations of the prior art that overly increase stiffness of the chassis side members may result in stress concentrations on the side members in areas where the frame assembly mounts to the side members and can lead to fatigue of those components over time.

Further, as stated above, it may be beneficial in some instances to allow a limited amount of torsional deflection of chassis 104 as the electric vehicle 100 travels over uneven ground, for example, as the front axle deflects relative to the second axle in response to torsion stresses. Push bar assemblies 506 in battery frame assembly 106 may compliment the natural torsional deformation in first side member 128 and second side member 130. More specifically, as first side member 128 and second side member 130 experience torsional deformation as the electric vehicle 100 travels over the uneven surface battery frame assembly 106 may also undergo controlled torsional deflection resulting from the rotation of the first bearing shafts 518 and second bearing shafts 520 relative to first bearing mounts 510 and second bearing mounts 512. As a result, the first transition members 502 may deflect vertically with respect to the second transition members 504 or vice versa to harmonize the torsional deformation of chassis 104 and torsional deflection of battery frame assembly 106. In various embodiments, the torsional deflection of battery frame assembly 106 may be increased or tuned by including bushings and/or isolators in the connections of battery packs with the chassis (for example, the various bearing mount assemblies).

In various embodiments, the modular nature of battery frame assembly 106 and its corresponding battery packs 114 achieves further mechanical advantages. For example, among other advantages, the loading caused by the nine battery packs 114 may be more evenly distributed across chassis 104 and battery frame assembly 106 when compared with electric vehicles containing fewer packs of larger dimensions in the transverse and/or longitudinal directions. Further, the discrete nature of the battery packs 114 and battery frame assembly 106 may permit a limited amount of vertical and transverse bending in addition to a limited amount of horizontal lozenging of battery frame assembly 106. As a result, stresses on various portions of battery frame assembly 106 may be spread more equally throughout battery frame assembly 106 and not directly transferred to the battery pack housings. In addition, because the various battery packs 114 are separated by various portions of battery frame assembly 106, in the event of a collision with the electric vehicle 100, kinetic energy resulting from the collision may be at least partially absorbed by battery frame assembly 106 (through deformation) rather than being transferred directly to the battery packs 114. As a result, unintended electrical discharge and/or battery fires may be reduced and/or avoided.

By suspending a substantial portion of battery frame assembly 106 and its corresponding battery packs 114 below chassis 104, the center of gravity of the electric vehicle 100 may be lowered. Moreover, by expanding portions of battery frame assembly 106 and its corresponding battery packs 114 outboard of first side member 128 and second side member 130, the moment of inertia about the longitudinal axis of the electric vehicle 100 may be increased. The lower center of gravity and increased moment of inertia about the longitudinal axis of the electric vehicle 100 may assist in preventing rollovers of the electric vehicle 100.

Battery Frame Assembly Modularity

In addition to the aforementioned mechanical advantages, battery frame assembly 106 may permit battery capacity and weight customization. More specifically, and with reference to FIGS. 13-16, battery frame assembly 106 is illustrated in exemplary three-pack, four-pack, six-pack, and nine-pack configurations. As stated above, in various embodiments, each battery pack 114 may be configured with a capacity of between approximately 80 and 130 Ah and a weight of between approximately 300 and 700 kg. As such, the battery frame assembly 106 illustrated in FIG. 13 may be configured with an overall battery assembly capacity of between approximately 300 and 390 Ah and overall battery assembly weight of between approximately 900 and 2,100 kg. The battery frame assembly 106 illustrated in FIG. 14 may be configured with an overall battery assembly capacity of between approximately 400 and 520 Ah and overall battery assembly weight of between approximately 1,200 and 2,800 kg. The battery frame 106 assembly illustrated in FIG. 15 may be configured with an overall battery assembly capacity of between approximately 600 and 780 Ah and overall battery assembly weight of between approximately 1,800 and 5,600 kg. Finally, the battery frame assembly 106 illustrated in FIG. 16 may comprise an overall battery assembly capacity of between approximately 900 and 1,170 Ah and overall battery assembly weight of between approximately 2,700 and 6,300 kg. In such a way, battery capacity and battery weight may easily be tailored to meet desired range and payload needs.

The structure of battery frame assembly 106 may allow for efficient installation and/or removal of battery packs 114 in order to achieve a desired battery pack configuration. For example, as discussed above in relation to FIG. 2, battery packs 114 may be lowered into and removed from various battery pack receptacles of battery frame assembly 106 and quickly coupled to/decoupled from battery frame assembly 106 by inserting/removing one or more fasteners coupling battery packs 114 to battery frame assembly 106. In various embodiments, battery frame assembly 106 may be covered by a cover plate but otherwise be substantially exposed to permit easy access to battery packs 114 and the mounting locations of battery packs 114. As such, downtime of the electric vehicle 100 may be minimized in the event one or more battery packs 114 need to be replaced and/or battery pack configuration adjusted.

Figure 13:
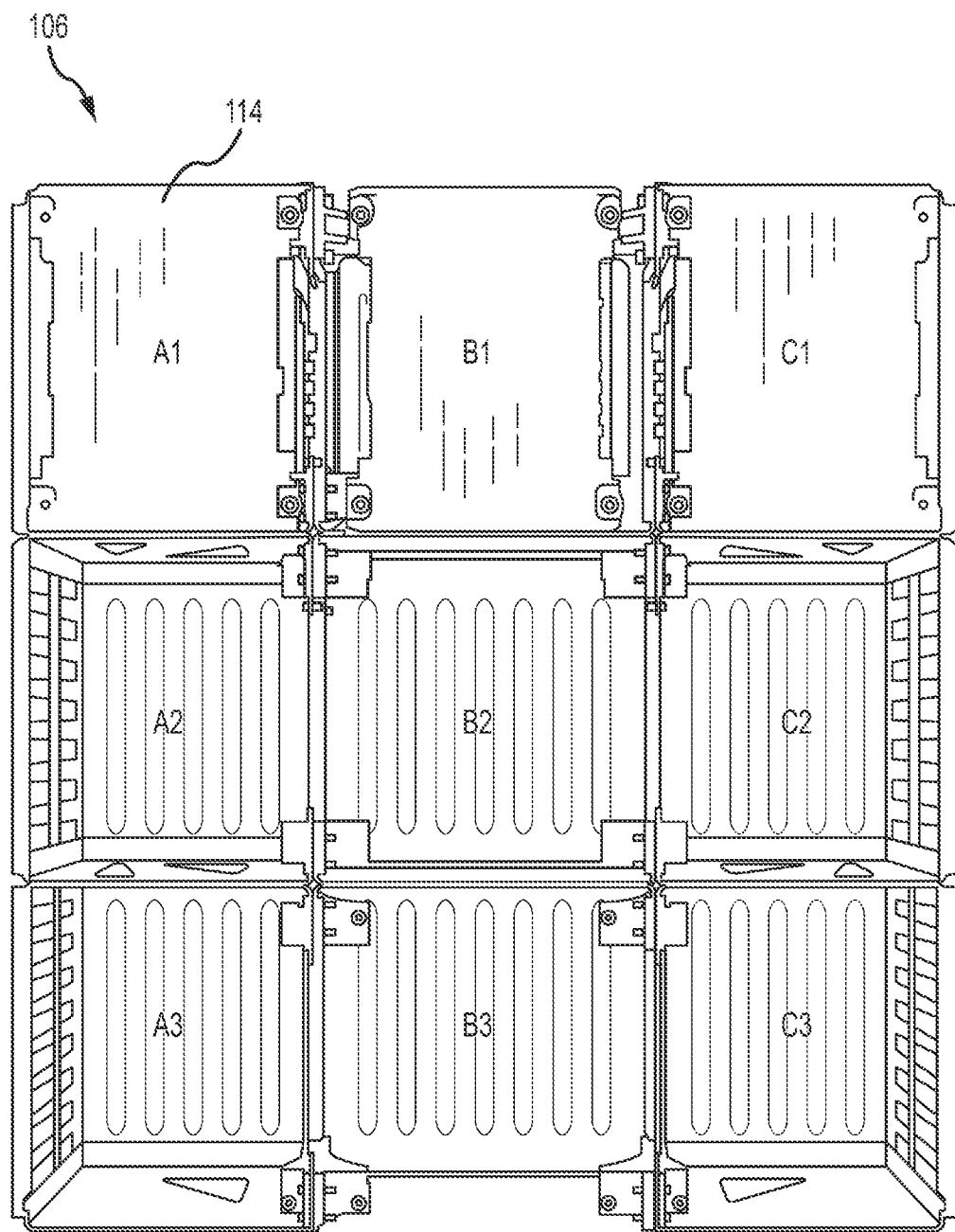
FIG. 13 illustrates a top view of a battery frame assembly having a three-pack configuration, in accordance with various embodiments.

With reference to FIG. 13, battery frame assembly 106 comprises three battery packs 114, in accordance with a first embodiment. Battery packs 114 are oriented in a horizontal row near the front portion of battery frame assembly 106 and rearward of a rear surface of the vehicle cab. Three-pack embodiments such as the one illustrated in FIG. 13 may be utilized for hauls requiring relatively short ranges and/or high payload capacities. A first battery pack 114 is positioned in battery pack receptacle A1, a second battery pack 114 is positioned in battery pack receptacle B1, and a third battery pack 114 is positioned in battery pack receptacle C1. The remaining battery pack receptacles A2, A3, B2, B3, C2 and C3 may be empty. The weight of the battery assembly may be distributed equally in the transverse direction so as to not adversely impact steering or increase rollover risk of the electric vehicle 100. The battery packs 114 in this configuration may also be shielded from impacts with the front of the electric vehicle 100 by the cab. Moreover, positioning the battery packs 114 proximate the front wheels may reduce the length of the moment arm extending between the front wheels and the battery packs 114, thereby minimizing vertical loading on the central portions of the vehicle chassis 104.

Figure 14:
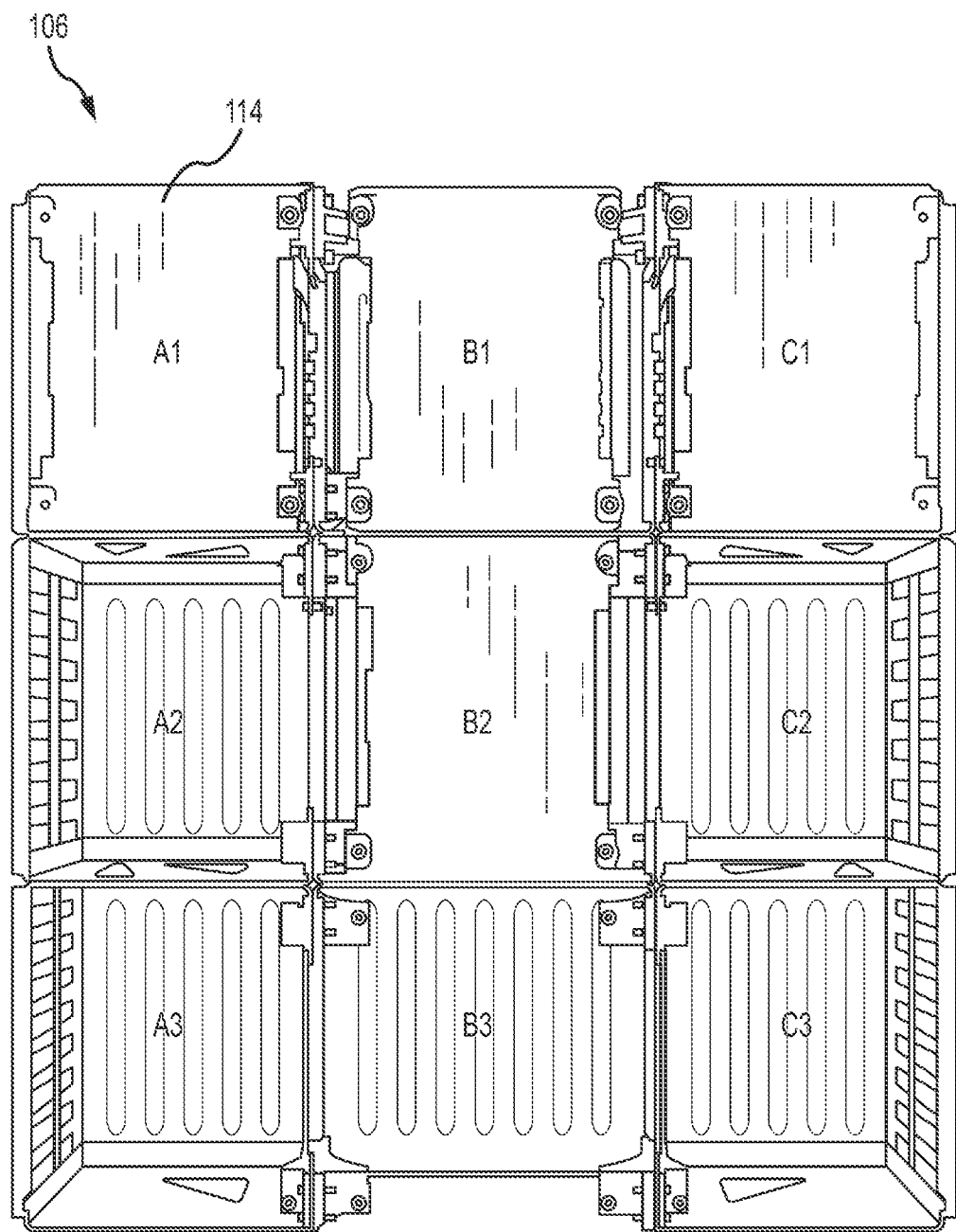
FIG. 14 illustrates a top view of a battery frame assembly having a four-pack configuration, in accordance with various embodiments.

With reference to FIG. 14, battery frame assembly 106 comprises four battery packs 114, in accordance with a second embodiment. Similar to the battery frame assembly 106 discussed in relation to FIG. 13, a portion of battery packs 114 are oriented in a horizontal row near the front portion of battery frame assembly 106 and rearward of the rear surface of the vehicle cab. Battery frame assembly 106 further comprises a battery pack 114 positioned at a longitudinal and transverse center of battery frame assembly 106. Four-pack embodiments such as the one illustrated in FIG. 14 may be utilized for hauls requiring relatively short to intermediate ranges and/or intermediate to high payload capacities. In various embodiments, a first battery pack 114 is positioned in battery pack receptacle A1, a second battery pack 114 is positioned in battery pack receptacle B1, a third battery pack 114 is positioned in battery pack receptacle C1, and a fourth battery pack 114 is positioned in battery pack receptacle B2. The remaining battery pack receptacles A2, A3, B3, C2 and C3 may be empty. The weight of the battery assembly may be distributed equally in the transverse direction so as to not adversely impact steering or increase rollover risk of the electric vehicle 100. The battery packs 114 in this configuration may also be shielded from impacts with the front of the electric vehicle 100 by the cab and from side impact by the two side members of the chassis. Moreover, positioning the majority of the battery packs 114 proximate the front wheels may reduce the length of the moment arm extending between the front wheels and the battery packs 114, thereby minimizing vertical loading on the central portions of the vehicle chassis 104.

Figure 15:
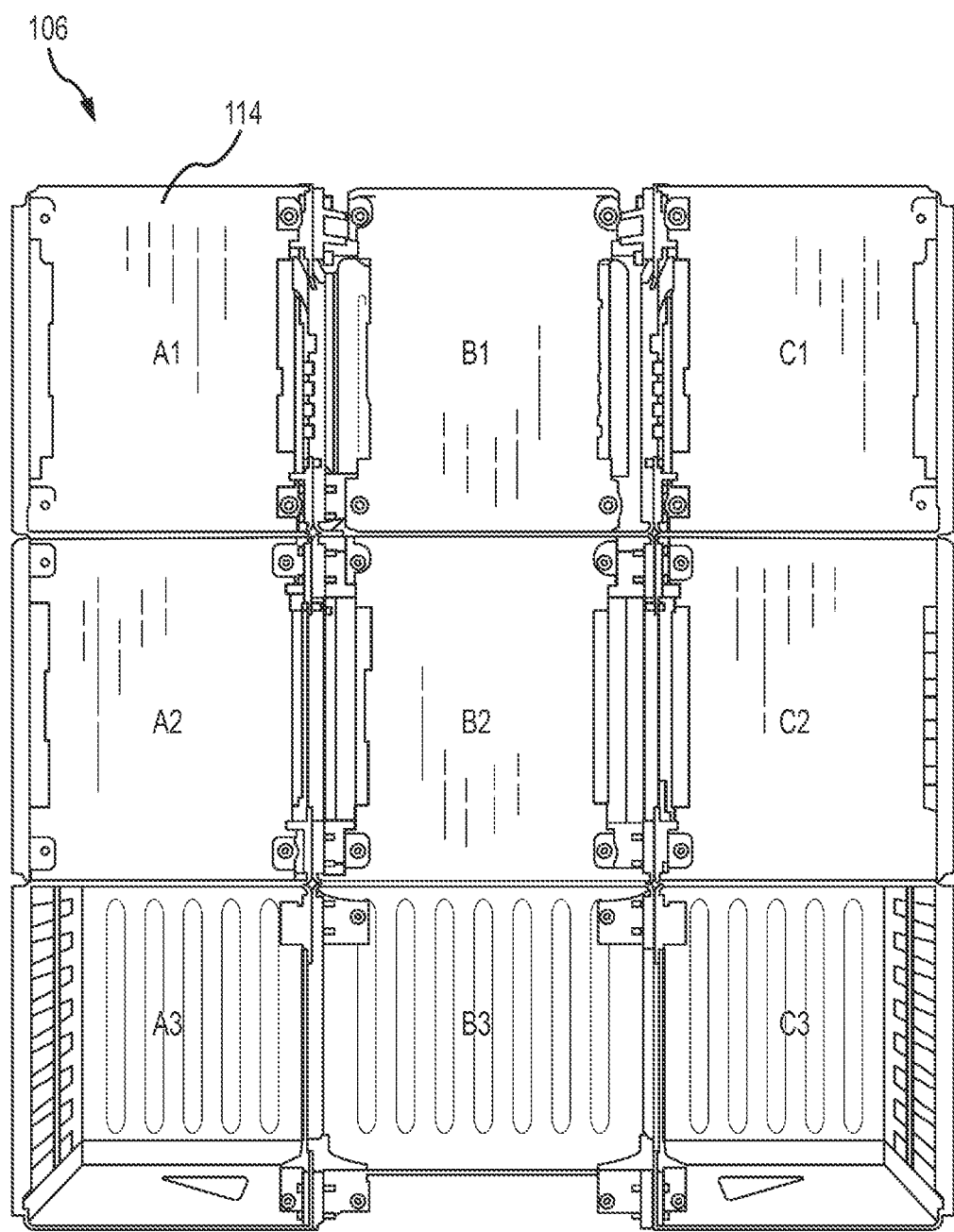
FIG. 15 illustrates a top view of a battery frame assembly having a six-pack configuration, in accordance with various embodiments.

With reference to FIG. 15, battery frame assembly 106 comprises six battery packs 114, in accordance with a third embodiment. Battery frame assembly 106 comprises a first row of battery packs 114 rearward of the rear surface of the cab and a second row of battery packs 114 positioned at the longitudinal center of battery frame assembly 106. Six-pack embodiments such as the one illustrated in FIG. 15 may be utilized for hauls requiring relatively intermediate to long ranges and/or low to intermediate payload capacities. In various embodiments, a first battery pack 114 is positioned in battery pack receptacle A1, a second battery pack 114 is positioned in battery pack receptacle B1, a third battery pack 114 is positioned in battery pack receptacle C1, a fourth battery pack 114 is positioned in battery pack receptacle A2, a fifth battery pack 114 is positioned in battery pack receptacle B2, and a sixth battery pack 114 is positioned in battery pack receptacle C2. The remaining battery pack receptacles A3, B3, and C3 may be empty. The weight of the battery assembly may be distributed equally in the transverse direction so as to not adversely impact steering or increase rollover risk of the electric vehicle 100.

Figure 16:
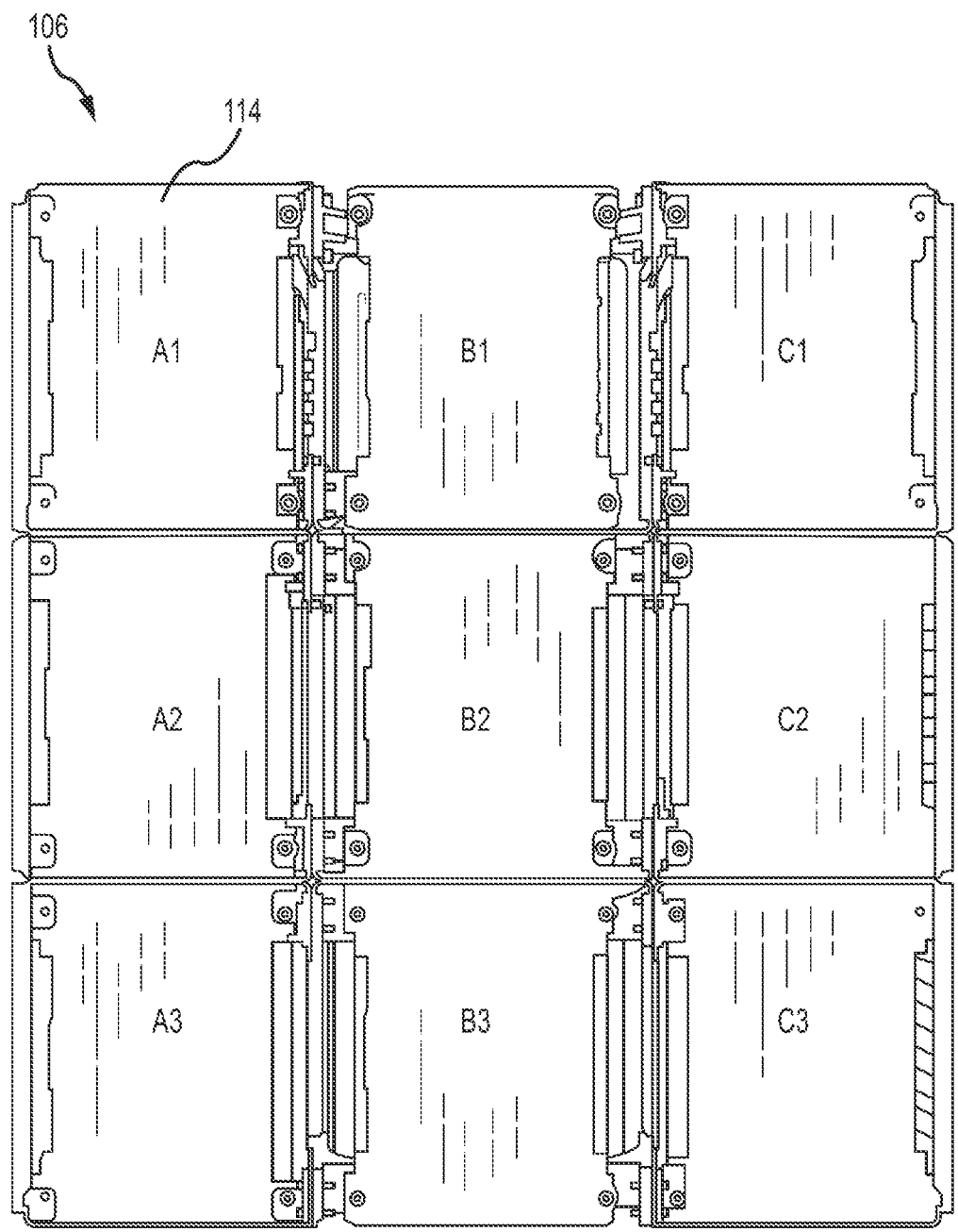
FIG. 16 illustrates a top view of a battery frame assembly having a nine-pack configuration, in accordance with various embodiments.

With reference to FIG. 16, battery frame assembly 106 comprises nine battery packs 114, in accordance with a fourth embodiment. Battery frame assembly 106 comprises a first row of battery packs 114 rearward of the rear surface of the cab, a second row of battery packs 114 positioned at the longitudinal center of battery frame assembly 106, and a third row of battery packs 114 positioned at the rearmost portion of battery frame assembly 106. Nine-pack embodiments such as the one illustrated in FIG. 16 may be utilized for hauls requiring relatively long ranges and/or low payload capacities. In various embodiments, a first battery pack 114 is positioned in battery pack receptacle A1, a second battery pack 114 is positioned in battery pack receptacle B1, a third battery pack 114 is positioned in battery pack receptacle C1, a fourth battery pack 114 is positioned in battery pack receptacle A2, a fifth battery pack 114 is positioned in battery pack receptacle B2, a sixth battery pack 114 is positioned in battery pack receptacle C2, a seventh battery pack 114 is positioned in battery pack receptacle A3, an eighth battery pack 114 is positioned in battery pack receptacle B3, and a ninth battery pack 114 is positioned in battery pack receptacle C3. No battery pack receptacles are empty. The weight of the battery assembly may be distributed equally in the transverse direction so as to not adversely impact steering or increase rollover risk of the electric vehicle 100. Moreover, the weight of the battery assembly may also be distributed equally in the longitudinal direction so as to reduce and/or prevent localized stress concentrations.

Figure 17A:
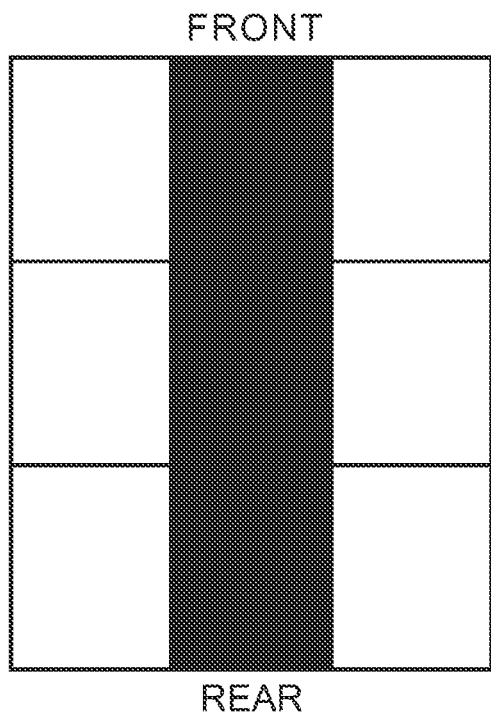
FIGS. 17A-17AP illustrate various battery frame assemblies comprising three-pack, four-pack, five-pack, six-pack, seven-pack, eight-pack, and nine-pack configurations, in accordance with various embodiments.
Figure 17B:
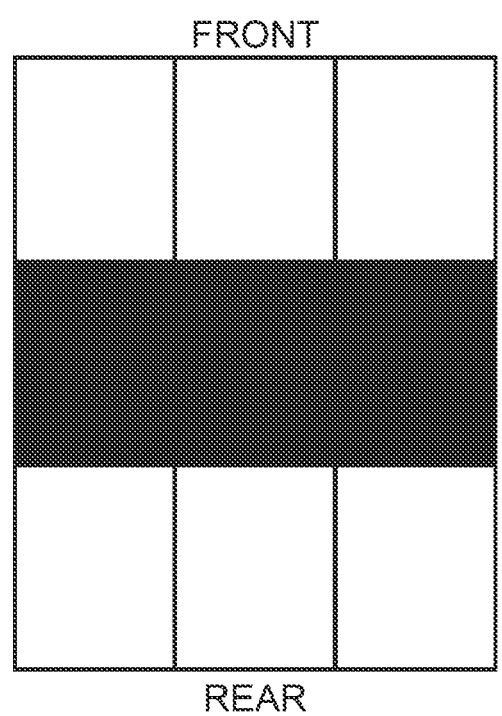
Figure 17C:
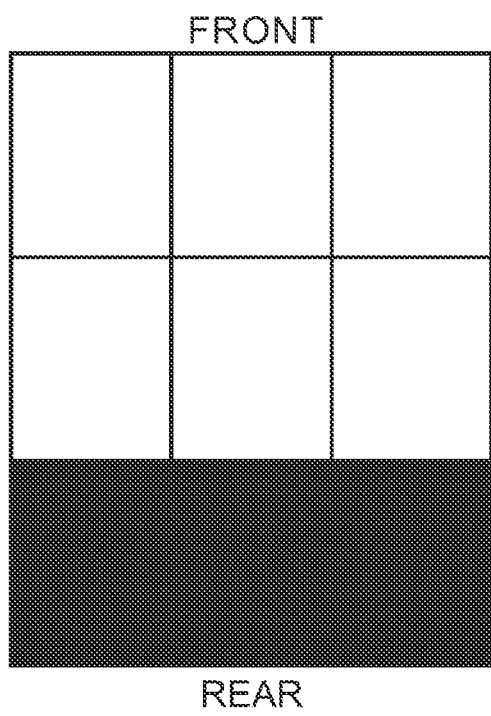
Figure 17D:
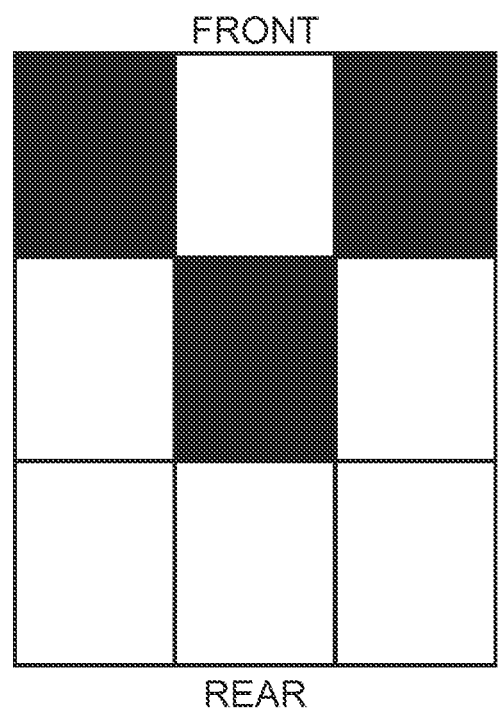
Figure 17E:
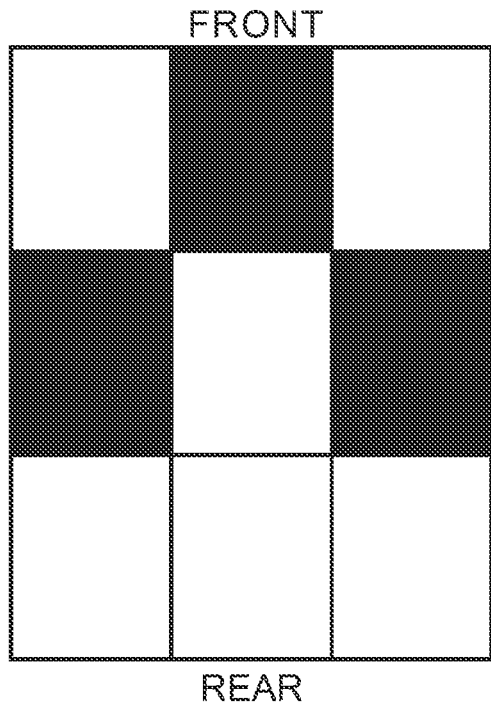
Figure 17F:
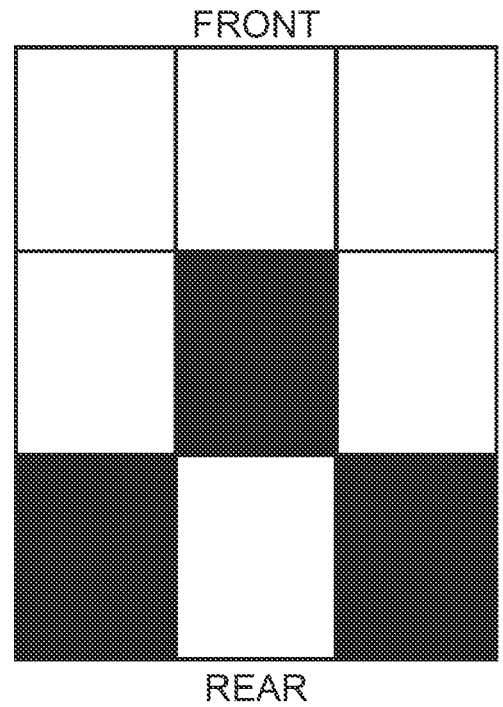
Figure 17G:
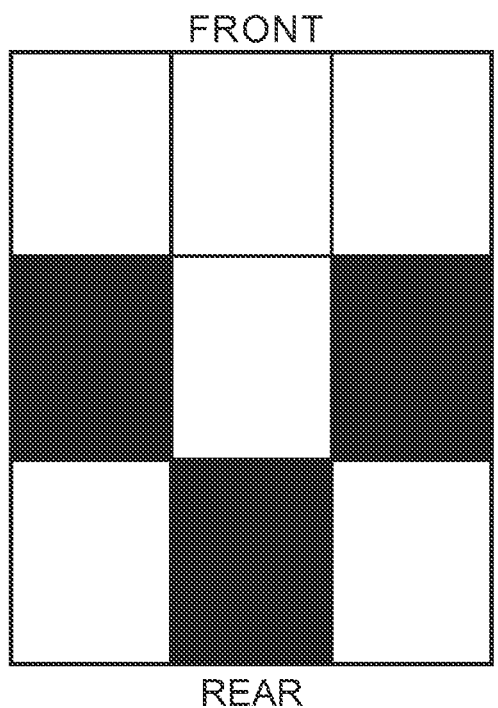
Figure 17H:
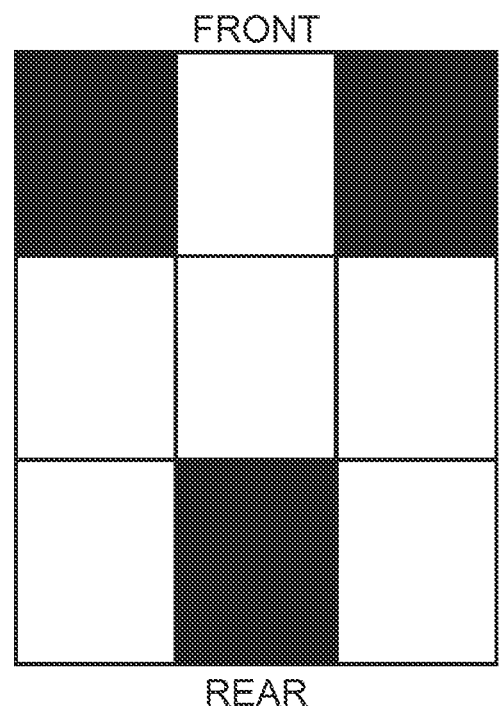
Figure 17I:
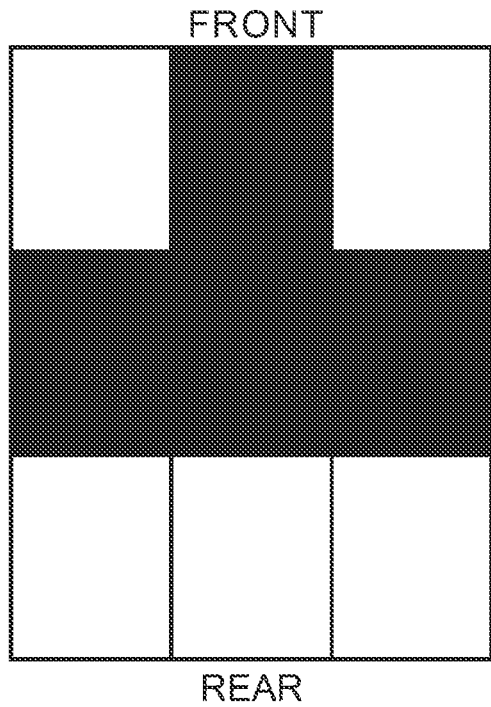
Figure 17J:
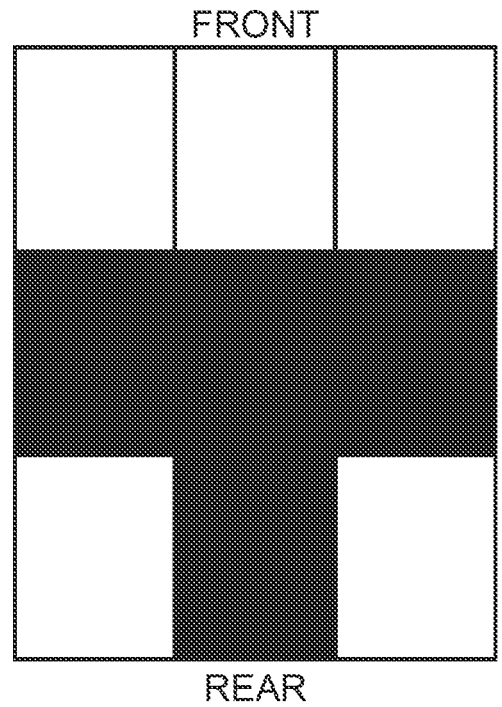
Figure 17K:
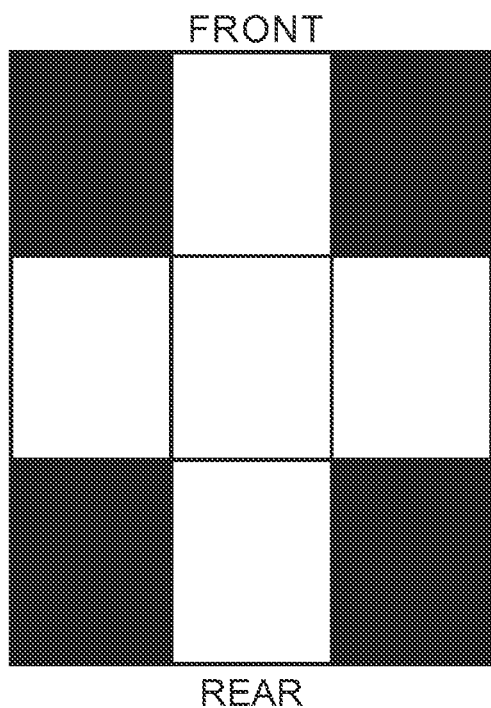
Figure 17L:
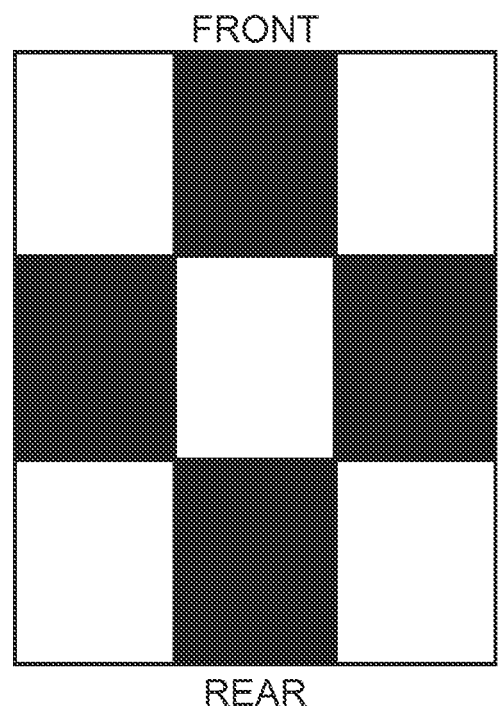
Figure 17M:
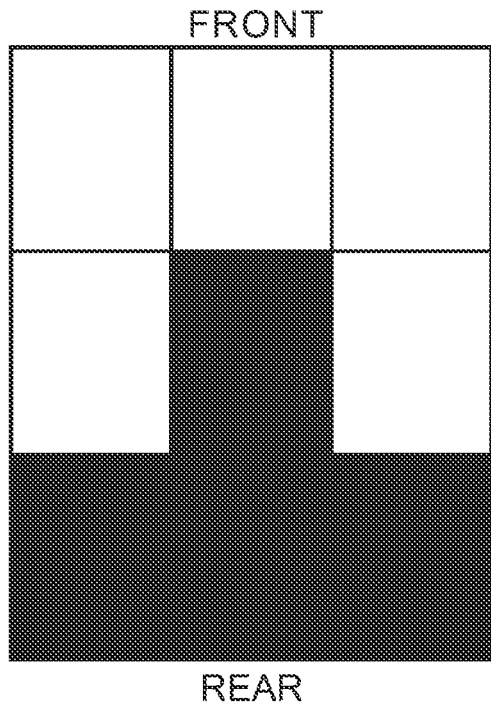
Figure 17N:
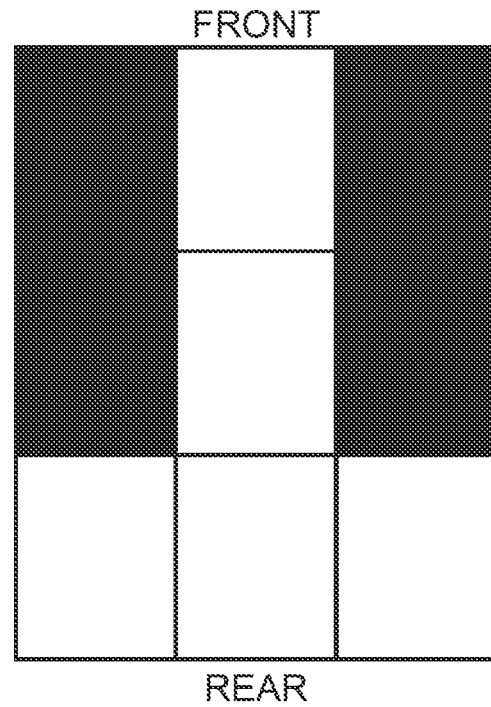
Figure 17O:
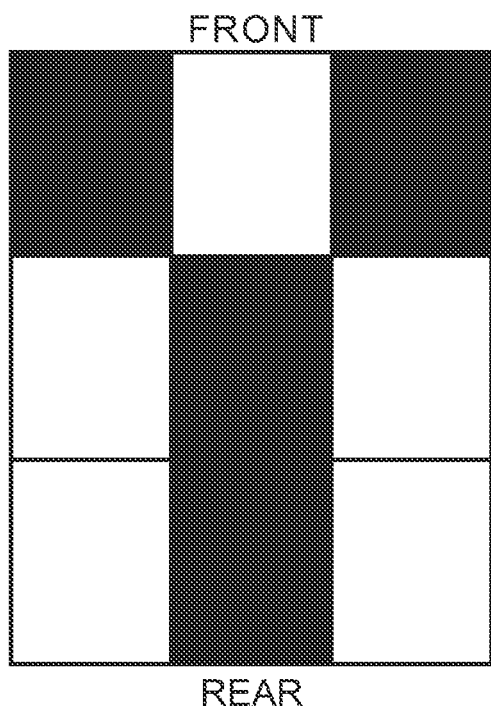
Figure 17P:
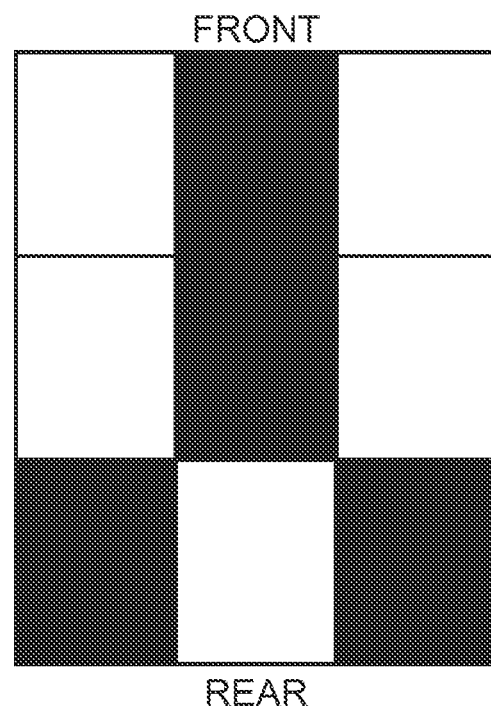
Figure 17Q:
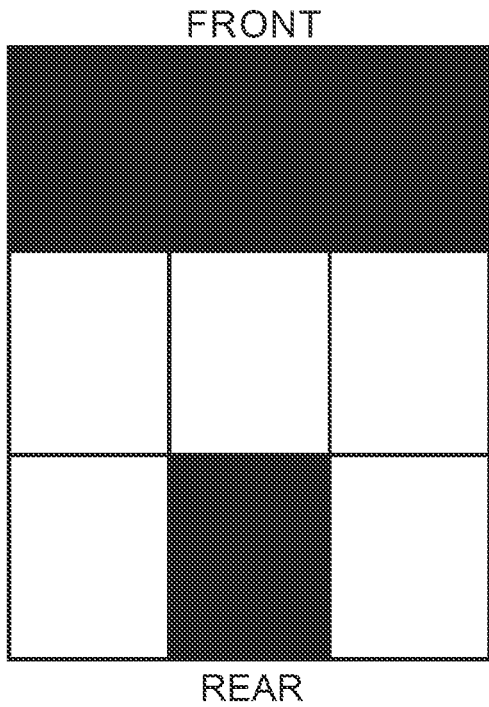
Figure 17R:
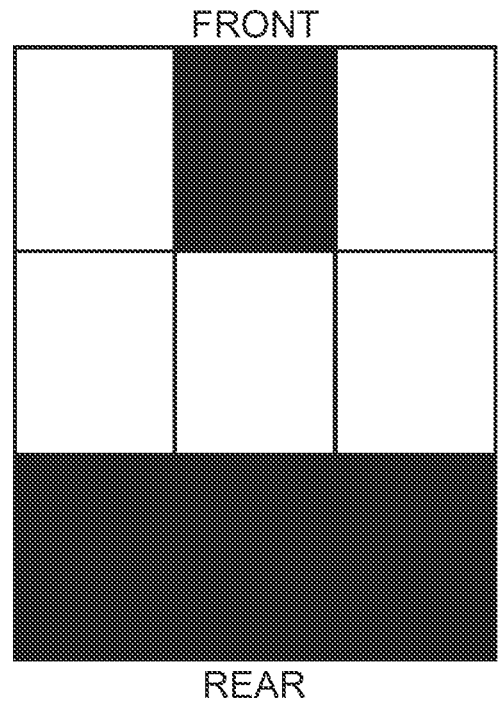
Figure 17S:
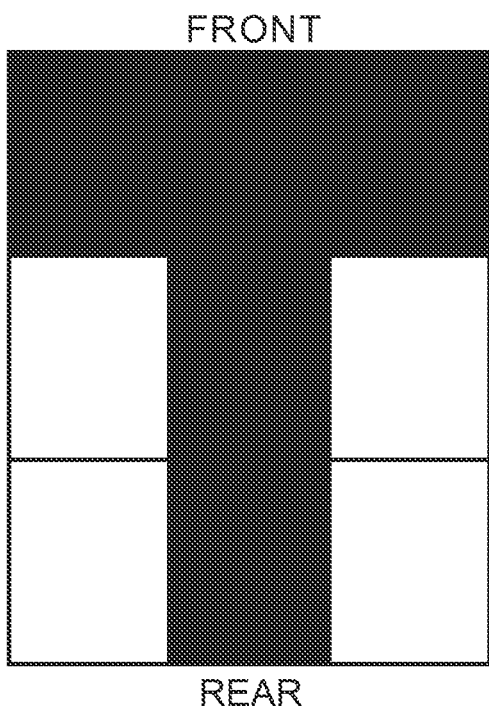
Figure 17T:
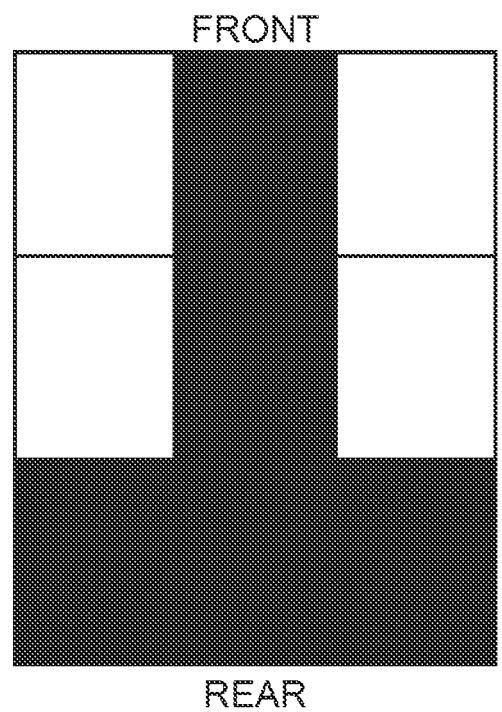
Figure 17U:
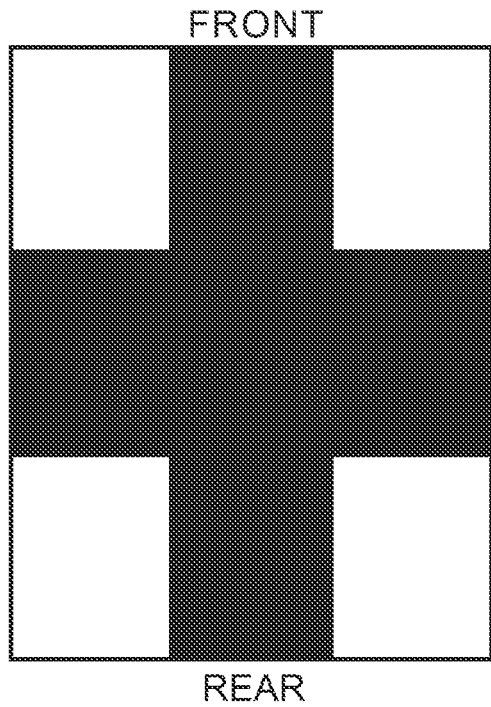
Figure 17V:
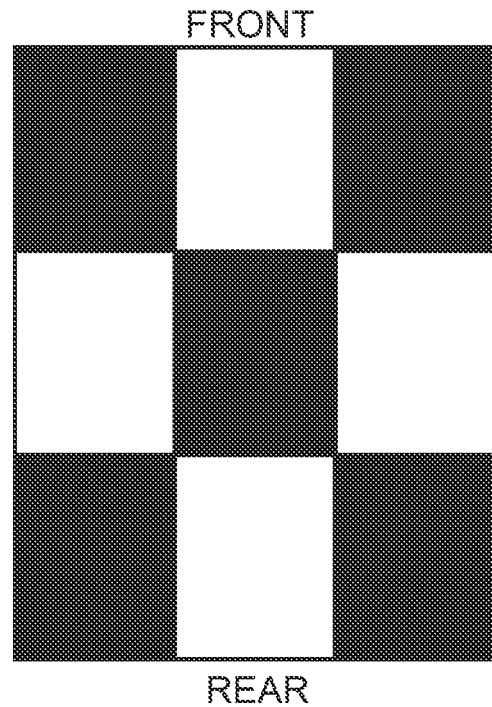
Figure 17W:
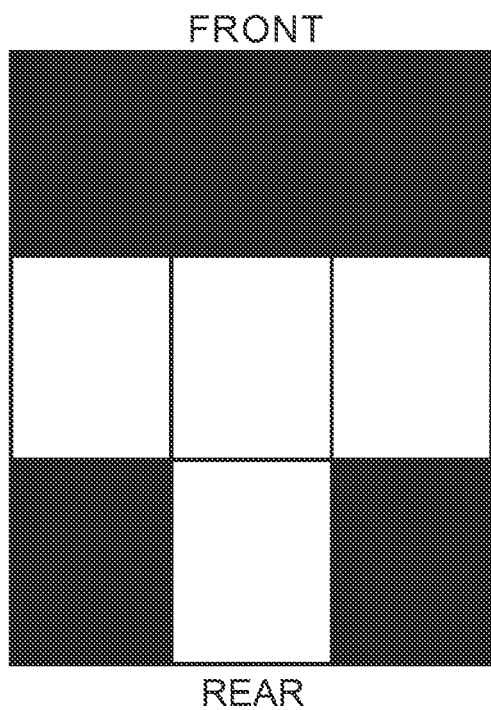
Figure 17X:
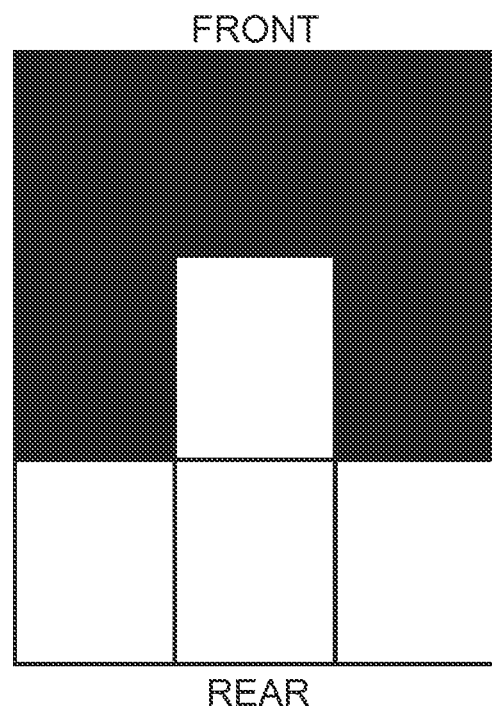
Figure 17Y:
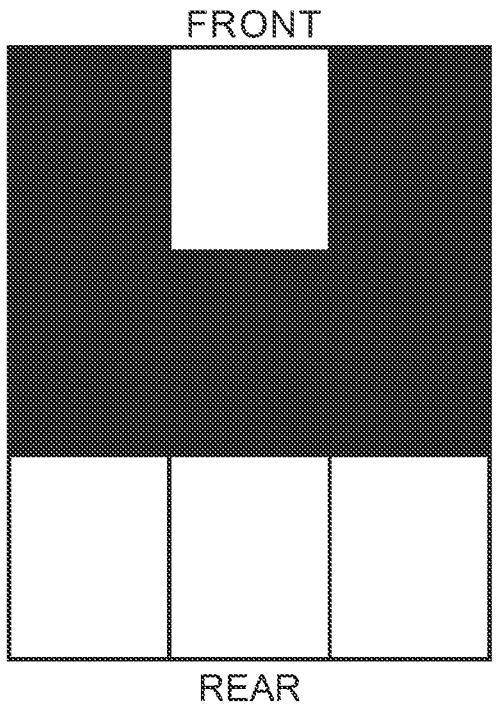
Figure 17Z:
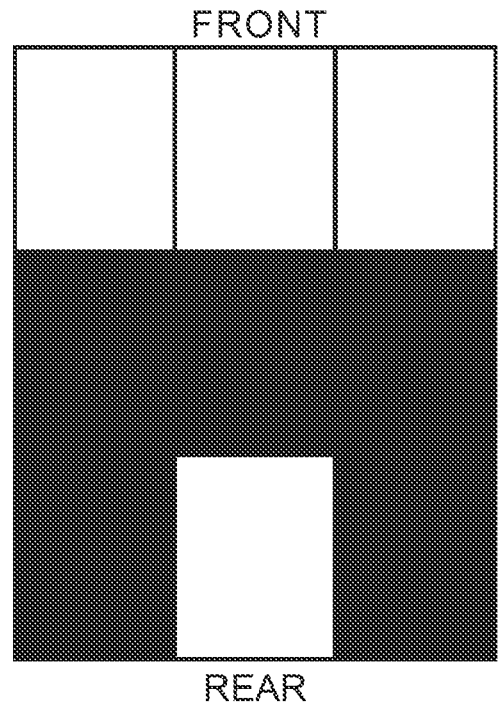
Figure 17A:
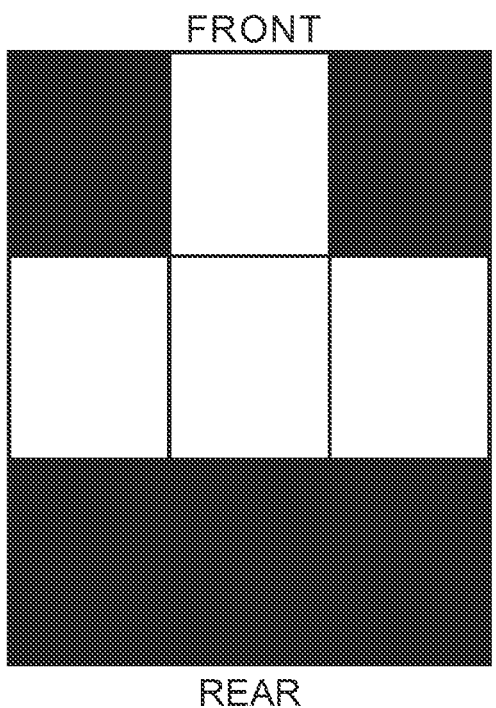
Figure 17A:
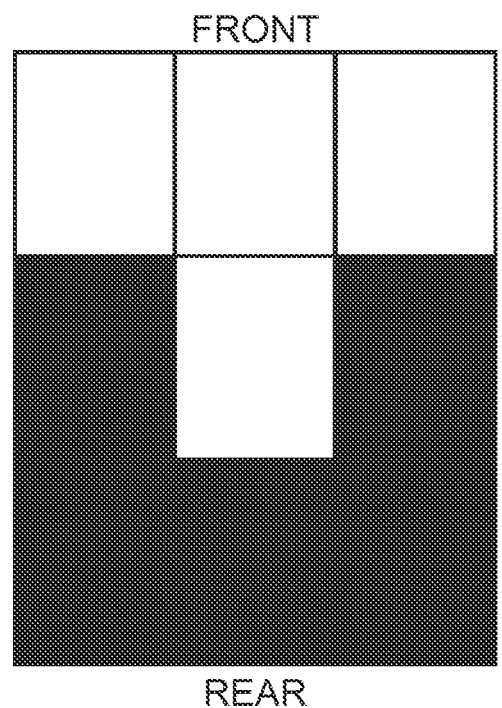
Figure 17A:
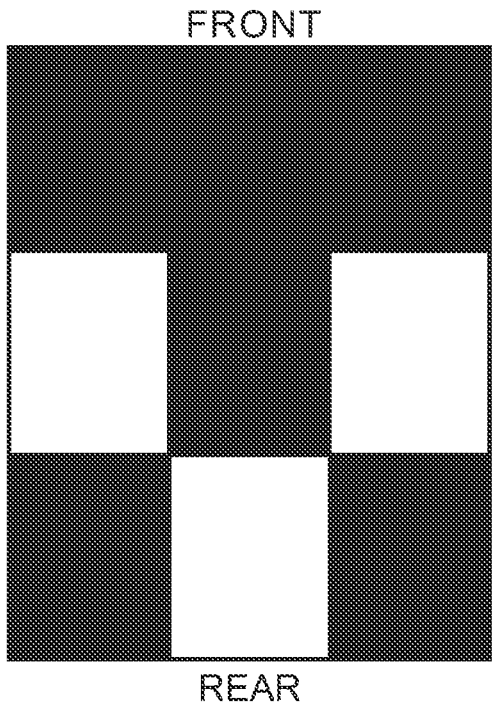
Figure 17A:
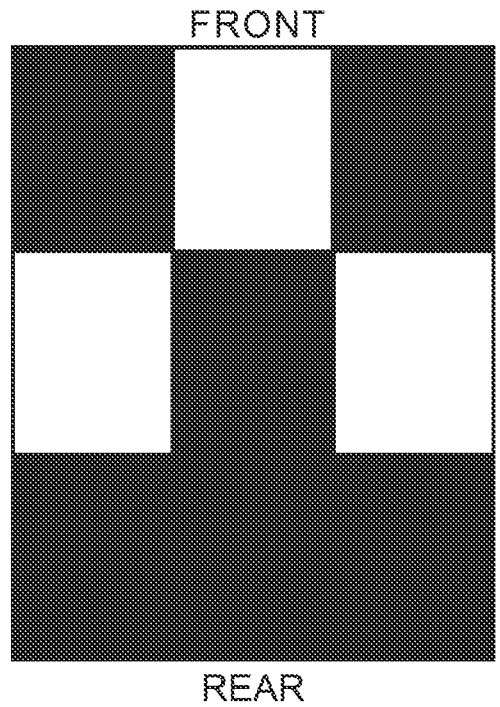
Figure 17A:
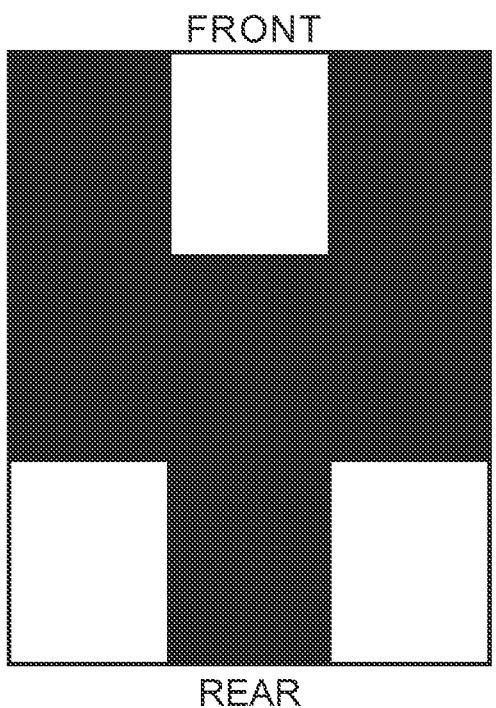
Figure 17A:
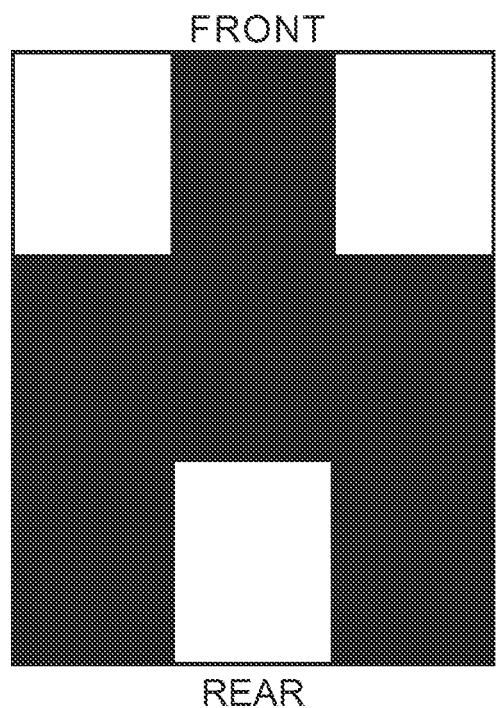
Figure 17A:
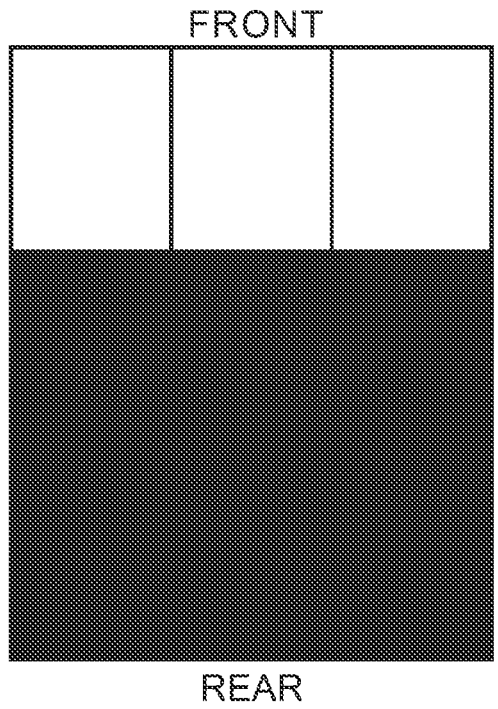
Figure 17A:
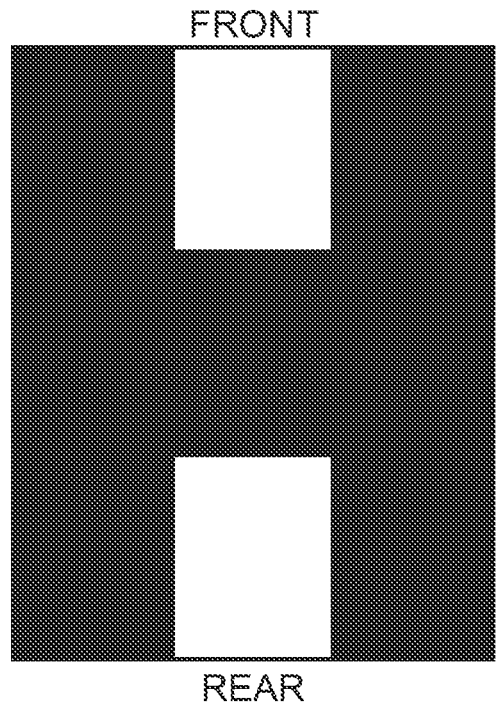
Figure 17A:
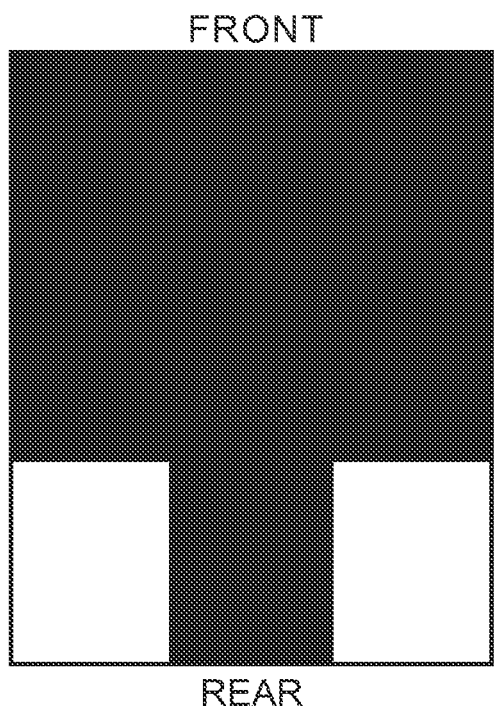
Figure 17A:
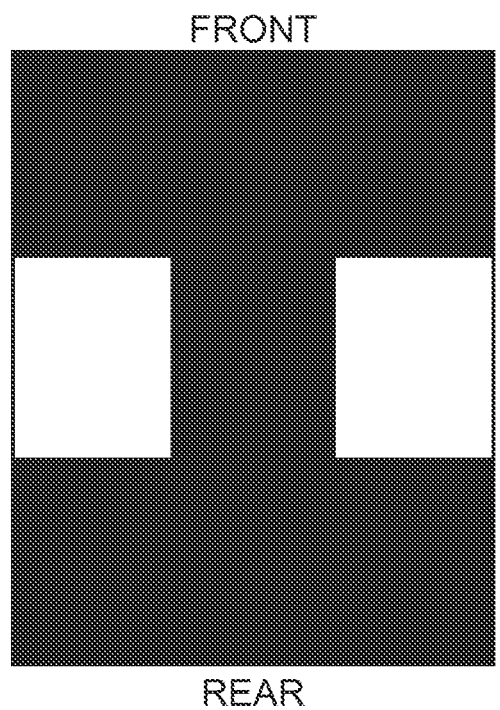
Figure 17A:
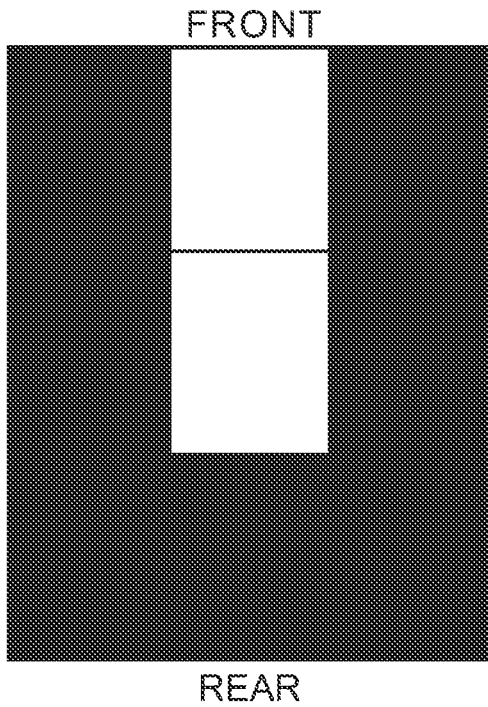
Figure 17A:
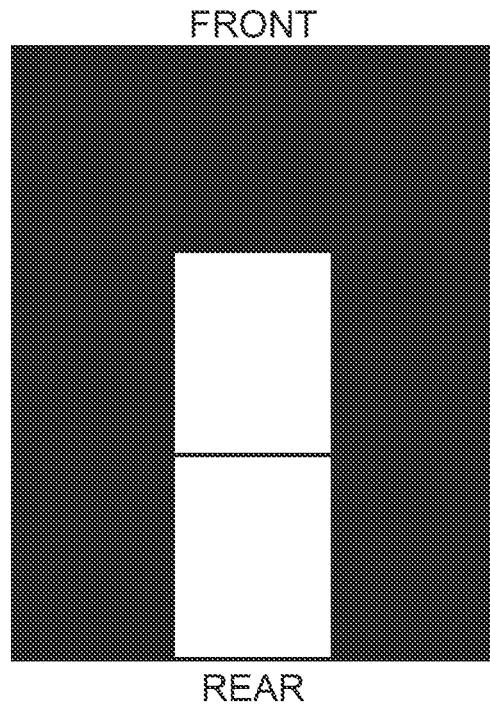
Figure 17A:
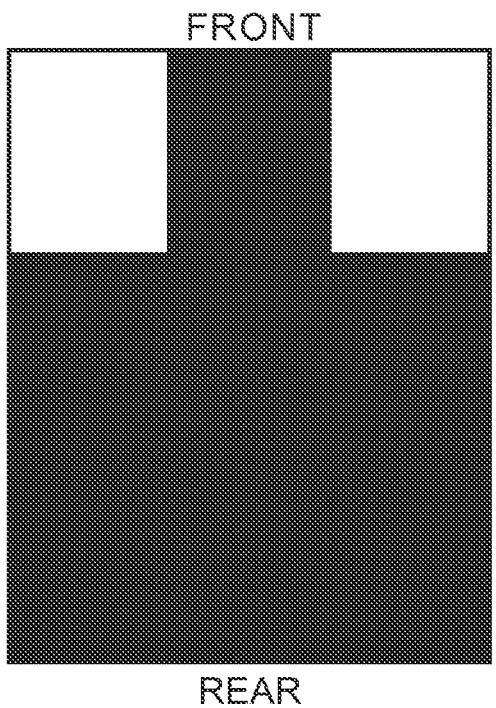
Figure 17A:
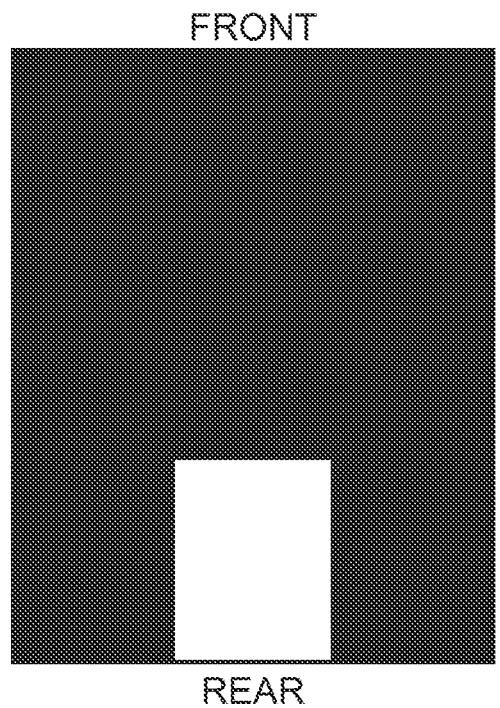
Figure 17A:
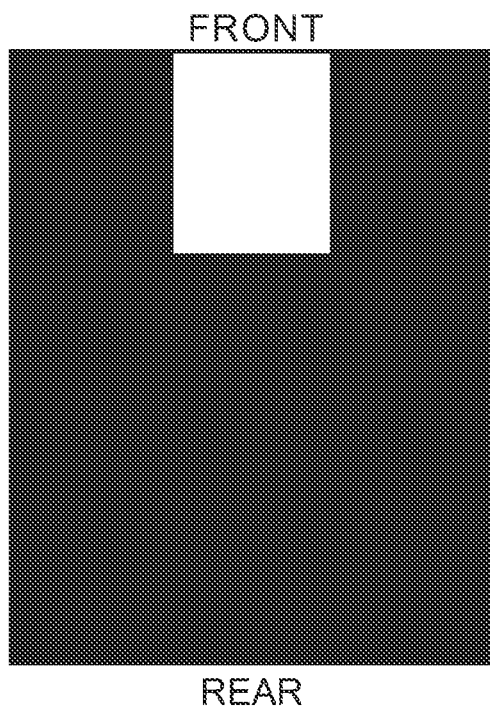
Figure 17A:
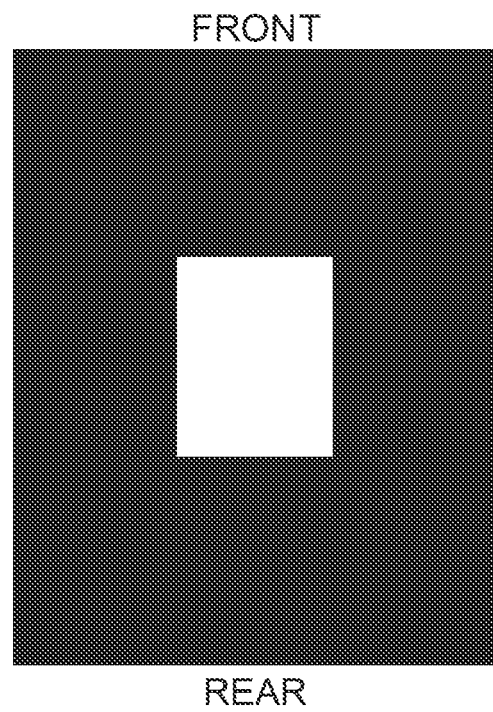

While discussed in relation to FIGS. 13-16 as comprising three-pack, four-pack, six-pack, and nine-pack configurations, it should be appreciated the battery frame assembly 106 may comprise any number of battery pack 114 configurations between one and nine in any suitable orientation. For example, in various embodiments battery frame assembly 106 may have the battery packs 114 oriented in columns (for example, A1-A3, B1-B3, C1-C3) rather than rows (for example, A1-C1, A2-C2, A3-C3). Moreover, it should be appreciated that battery frame assembly 106 may comprise more or fewer than nine battery pack receptacles consistent with the scope of this disclosure. Various embodiments of three, four, five, six, seven, and eight-pack configurations, in addition to those illustrated with respect to FIGS. 13-15, are shown as simple schematics in FIGS. 17A-17AP, where black rectangles identify battery pack receptacles 146 containing battery packs 114 and white rectangles identify battery pack receptacles 146 devoid of battery packs 114.

Moreover, it should be appreciated that the structure of chassis 104 and/or battery frame assembly 106 may change depending on the number and placement of battery packs. For example, in certain embodiments (such as embodiments including six or fewer battery packs), one or more of first intermediate bracket assembly 400A and second intermediate bracket assembly 400B may be removed and chassis 104 and/or battery frame assembly 106 shortened to form a 2×3 matrix of battery pack receptacles, for example. In such a way, the wheelbase and weight of electric vehicle 100 may be reduced, which may result in a tighter turning radius and increased range and/or increased payload capacity.

Battery Frame Assembly Crash Sensor Systems

Figure 18:
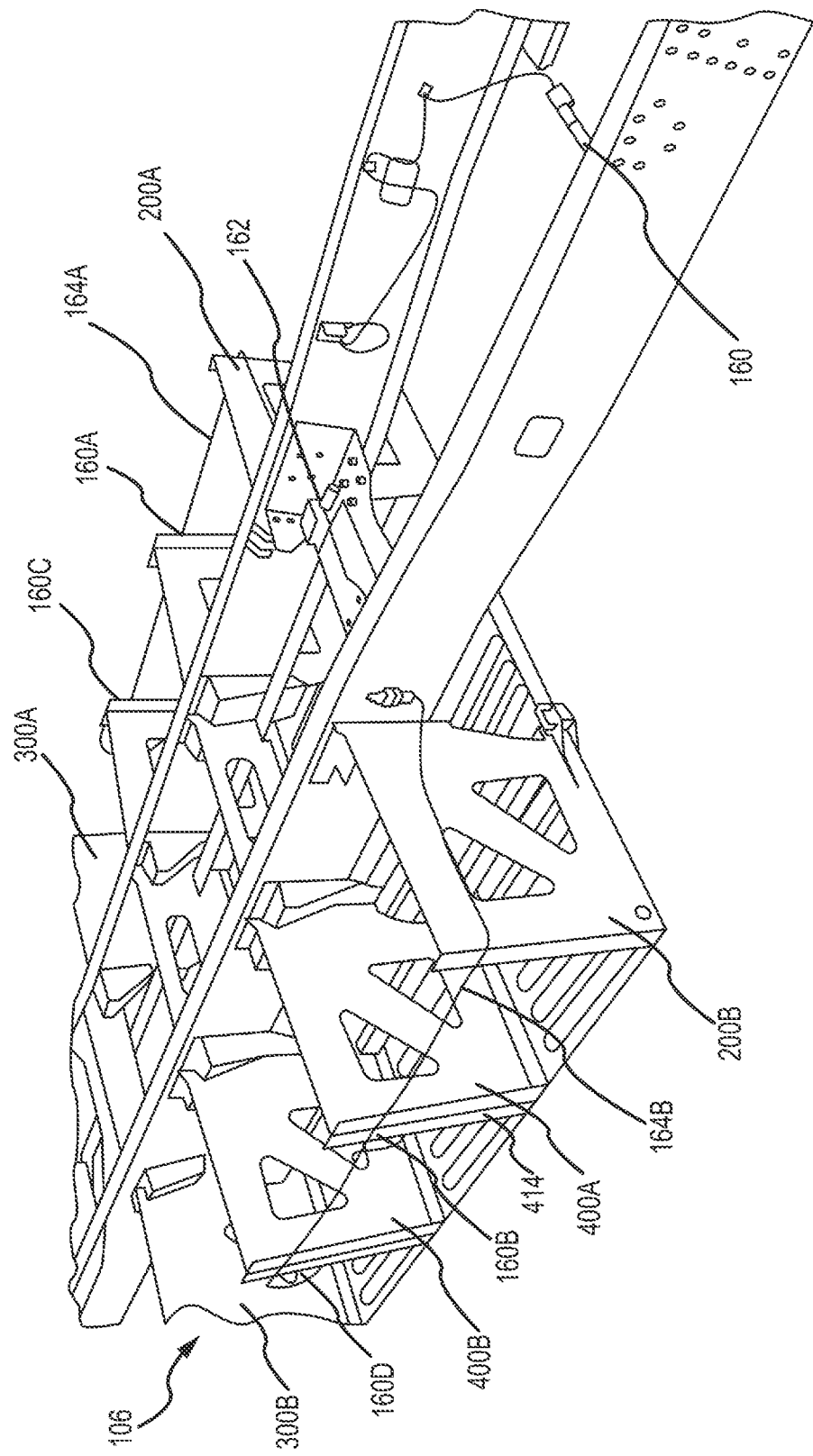
FIG. 18 illustrates a battery frame assembly including one or more crash sensors, in accordance with various embodiments.
Figure 19:
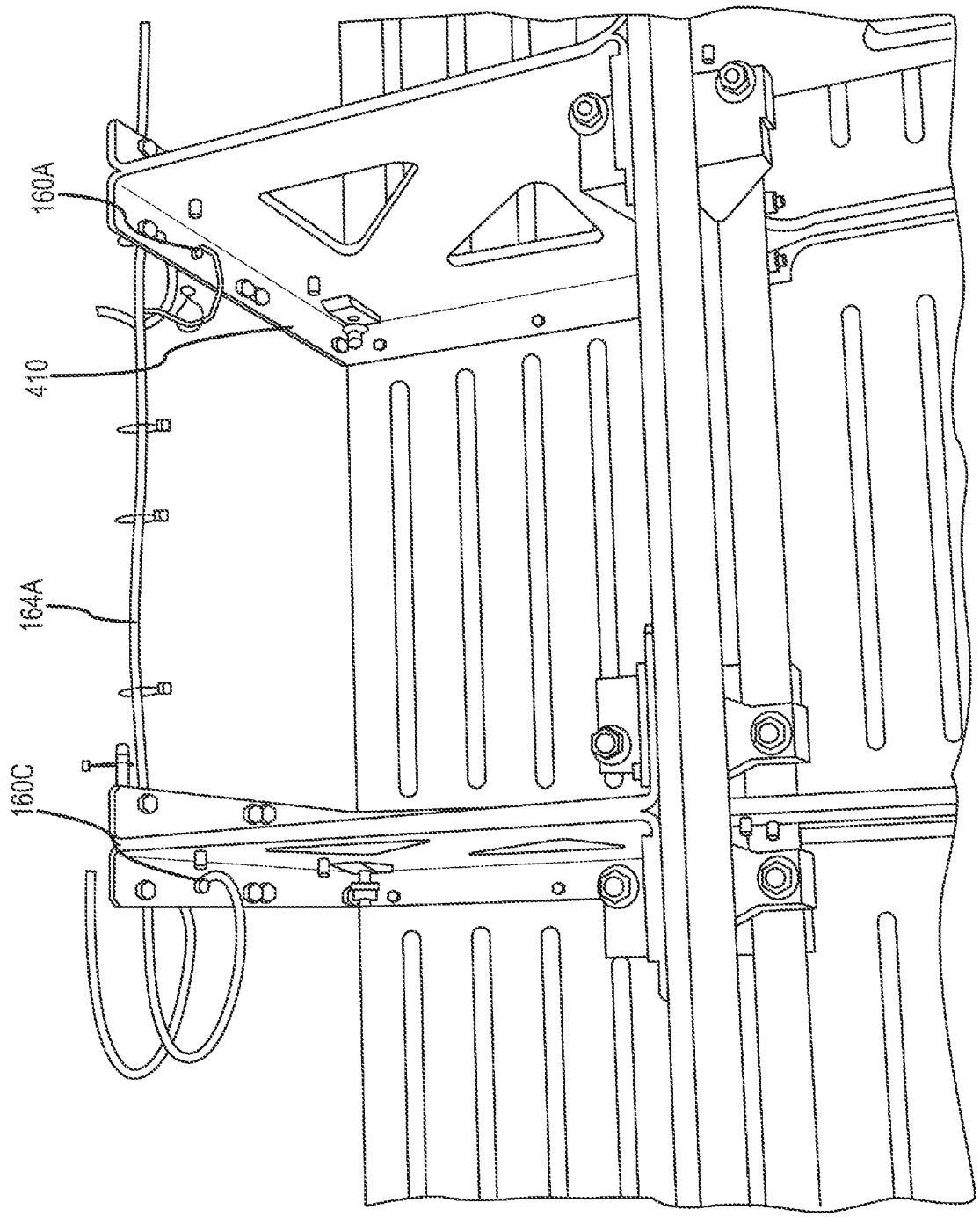
FIG. 19 illustrates a top perspective view of a battery frame assembly including one or more side crash sensors, in accordance with various embodiments.

Referring now to FIGS. 18 and 19, battery frame assembly 106 is illustrated comprising one or more crash sensors 160 coupled to lateral portions of battery frame assembly 106. In various embodiments, crash sensors 160 may be configured to measure one or more variables to determine the existence and/or likelihood of a battery fire and/or high voltage discharge in response to an impact or impending impact with the electric vehicle 100 and shut off high voltage systems, deploy airbags, notify the vehicle operator, notify emergency services, and/or accomplish some other task. In various embodiments, crash sensors 160 comprise acceleration sensors, structure-borne sound (SBS) sensors, pressure sensors such as pressure hoses, or combinations thereof. In various embodiments, crash sensors 160 comprise predictive crash detection sensors such as radar, lidar, cameras, or combinations thereof.

In various embodiments, battery frame assembly 106 comprises a first crash sensor 160A coupled to first intermediate bracket assembly 400A, a second crash sensor 160B coupled to first intermediate bracket assembly 400A, a third crash sensor 160C coupled to second intermediate bracket assembly 400B, and a fourth crash sensor 160D coupled to second intermediate bracket assembly 400B. As illustrated in FIGS. 18 and 19, first crash sensor 160A is coupled to the inboard surface of the outboard flange of rear outboard bracket subassembly 410 and second crash sensor 160B is coupled to the inboard surface of the outboard flange of rear outboard bracket subassembly 414. Similarly, third crash sensor 160C is coupled to the inboard surface of the outboard flange of the first rear outboard bracket subassembly of second intermediate bracket assembly 400B and fourth crash sensor 160D is coupled to the inboard surface of the outboard flange of the second rear outboard bracket assembly of intermediate bracket assembly 400B. In various embodiments, battery frame assembly 106 further comprises a fifth crash sensor 160E which may be coupled to an internal surface of the cab of the electric vehicle 100.

It should be appreciated that the electric vehicle 100 is not limited to five crash sensors and the crash sensors are not limited to those locations described above in relation to FIGS. 18 and 19. For example, in various embodiments, battery frame assembly 106 comprises crash sensors 160 instead of or in addition to those described above on first front bracket assembly 200A, second front bracket assembly 200B, first rear bracket assembly 300A, and/or second rear bracket assembly 300B. The crash sensors 160 may be coupled to any inboard or outboard flange or surface of any inboard, outboard, bottom, or top flanges of these components. With additional reference to FIGS. 2 and 4, crash sensors 160 may be coupled to inboard or outboard surfaces of impact plates 148, top or bottom surfaces of skid plates 158, top, bottom, inboard, outboard, front, or rear surfaces of battery packs 114, upper, lower, inboard, or outboard, surfaces of fenders 124, or any other location in proximity to the battery packs 114. Moreover, the electric vehicle 100 may comprise one, two, three, four, six, seven, eight, nine, ten, or more crash sensors 160.

In various embodiments, crash sensors 160 may be electrically coupled together and electrically coupled to a crash sensor electronic control unit (ECU) 162 via one or more crash sensor cables 164. For example, first crash sensor 160A and third crash sensor 160C may be electrically coupled together via a first crash sensor cable 164A and second crash sensor 160B and fourth crash sensor 160D may be electrically coupled together via a second crash sensor cable 164B. First crash sensor cable 164A and second crash sensor cable 164B may each be electrically coupled to crash sensor ECU 162. In various embodiments, fifth crash sensor 160E may be electrically coupled only to crash sensor ECU 162 or electrically coupled to other crash sensors 160 and crash sensor ECU 162. While discussed herein as having hardwire connections, the various crash sensors 160 and crash sensor ECU 162 are not limited in this regard and may communicate wirelessly in various embodiments.

As stated above, crash sensors 160 may be configured to measure one or more variables associated with an impact or pending impact and transmit signals to crash sensor ECU 162. In various embodiments, crash sensor ECU 162 comprises a microcontroller, memory, one or more inputs, one or more outputs, and one or more communication links situated within a moisture and dust-resistant housing. In response to an impact or anticipated, predicted, or impending impact with the electric vehicle 100, crash sensors 160 may transmit signals related to measured acceleration data, speed data, directional data, position data, sound data, pressure data, or other data signaling the electric vehicle 100 has been impacted or is likely to be impacted. In response, crash sensor ECU 162 may compare the measured data to stored data to determine if one or more emergency cases have been triggered.

In various embodiments, crash sensors 160 may measure data associated with a given impact and compare that data with stored data indicating the likelihood of an emergency event such as a thermal event (battery fire) or electric discharge event. For example, a front wall impact at a net speed (between an unladen electric vehicle 100 and impact object) of approximately 12 km/hr (approximately 7.5 mph) may correlate to a "clear" event indicating that high voltage systems of the electric vehicle 100 do not need to be shut off. A front wall impact at a net speed (between laden electric vehicle 100 and impact object) of approximately 20 km/hr (approximately 12.4 mph) may correlate to a "not clear" event indicating that the high voltage systems of the electric vehicle 100 need to be shut off. Similar event data may be stored for side, rear, corner, trailer, or other impact locations in addition to other laden/unladen and speed scenarios. In various embodiments, crash sensor ECU 162 may communicate directly with a battery control unit via a wired or wireless signal to shut off the high voltage systems in cases in which "not clear" events have been detected. Alternatively, crash sensor ECU 162 may communicate with a vehicle control unit which, in turn, may communicate with the battery control unit to shut off high voltage systems. Additionally or alternatively, in response to an impact, crash sensor ECU 162, the battery control unit, or the vehicle control unit may send a signal to deploy one or more airbags, notify a vehicle operator of an emergency case, notify an operator that maintenance is required, notify a fleet manager of the status of the electric vehicle 100, alert emergency services, and/or other interested parties of the vehicle's status.

In various embodiments, crash sensors 160 are electrically coupled to one or more pyroswitches or pyrofuses which are coupled to one or more battery packs. In response to a "not clear" event, crash sensor ECU 162 may send a discrete signal to the pyroswitches or pyrofuses to activate the same. Upon activation, pyroswitch or pyrofuse, which may include an explosive charge and blade, may cut through a busbar, and mechanically disconnect the battery pack from the electric vehicle. In various embodiments, crash sensor ECU 162 may determine which battery packs are most likely to be affected by a "not clear" event and disconnect only those particular battery packs via the pyroswitch or pyrofuse. For example, an impact on the passenger side of the electric vehicle may lead to disconnection of only those battery packs proximate the passenger side of the electric vehicle. As such, the electric vehicle may continue to operate using the unaffected battery packs after impact in certain situations.

EXAMPLES

Examples 1-6—Electric Vehicle Battery Frame Assembly

In Example 1, a battery frame for an electric vehicle comprises: a first front bracket assembly and a second front bracket assembly opposite the first front bracket assembly, a first intermediate bracket assembly spaced apart and rearward of the first front bracket assembly and the second front bracket assembly, a first rear bracket assembly and a second rear bracket assembly opposite the first rear bracket assembly, wherein the first rear bracket assembly and the second rear bracket assembly are spaced apart and rearward of the first intermediate bracket assembly, wherein the first front bracket assembly, the second front bracket assembly, the first intermediate bracket assembly, the first rear bracket assembly, and the second rear bracket assembly are coupled together to form a matrix of battery pack receptacles configured to receive at least one battery pack.

In Example 2, the battery frame assembly of Example 1, further comprising a second intermediate bracket assembly spaced apart and rearward of the first intermediate bracket assembly and spaced apart and forward of the first rear bracket assembly.

In Example 3, the battery frame assembly of any one of Examples 1-2, wherein the first front bracket assembly comprises a bracket plate comprising an inboard flange, an outboard flange, and a bottom flange extending rearward from the bracket plate.

In Example 4, the battery frame assembly of any one of Examples 1-3, wherein the inboard flange is configured to be coupled to a side member of a chassis.

In Example 5, the battery frame assembly of any one of Examples 1-4, wherein the bottom flange is coupled to a skid plate coupled to the first intermediate bracket assembly.

In Example 6, the battery frame assembly of any one of Examples 1-5, wherein the outboard flange is coupled to an impact plate coupled to the first intermediate bracket assembly.

Examples 7-12—Electric Vehicle Battery Frame Assembly

In Example 7, a battery frame assembly for an electric vehicle comprises: a first front bracket assembly, a first intermediate bracket assembly spaced apart from and rearward of the front bracket assembly, the front bracket assembly and first intermediate bracket assembly defining a first battery pack receptacle configured to receive a first battery pack, a first rear bracket assembly spaced apart from and rearward of the first intermediate bracket assembly, the first intermediate bracket assembly and rear bracket assembly defining a second battery pack receptacle configured to receive a second battery pack, and a crash sensor coupled to one of the first front bracket assembly, the first intermediate bracket assembly, or the first rear bracket assembly.

In Example 8, the battery frame assembly of Example 7, wherein the crash sensor is coupled to an outboard flange of a bracket plate of one of the first front bracket assembly, the first intermediate bracket assembly, or the first rear bracket assembly.

In Example 9, the battery frame assembly of any one of Examples 7-8, wherein the crash sensor comprises one of an acceleration sensor, a structure-borne sound (SBS) sensor, a pressure sensor, a lidar sensor, or a radar sensor.

In Example 10, the battery frame assembly of any one of Examples 7-9, wherein the electric vehicle further comprises a crash sensor electronic control unit (ECU) configured to receive measured data from the crash sensor and compare the measured data with stored data to determine an emergency event.

In Example 11, the battery frame assembly of any one of Examples 7-10, wherein the emergency event signals the presence or likelihood of a battery fire and in response to a detected battery fire, the crash sensor ECU shuts off high voltage systems of the electric vehicle.

In Example 12, the battery frame assembly of any one of Examples 7-11, wherein the stored data comprises impact location and net speed data.

Examples 13-18—Underframe Assembly

In Example 13, an underframe assembly of a battery frame assembly comprises: a first push bar assembly comprising a first push bar, a first bearing mount, a first bearing shaft, a second bearing mount, and a second bearing shaft, a second push bar assembly comprising a second push bar, a third bearing mount, a third bearing shaft, a fourth bearing mount, and a fourth bearing shaft, a first transition member perpendicular to the first push bar and the second push bar and coupled to the first bearing shaft and the third bearing shaft, and a second transition member perpendicular to the first push bar and the second push bar and coupled to the second bearing shaft and the fourth bearing shaft, wherein the first bearing mount is configured to rotate about the first bearing shaft, the second bearing mount is configured to rotate about the second bearing shaft, the third bearing mount is configured to rotate about the third bearing shaft, and the fourth bearing mount is configured to rotate about the fourth bearing shaft to allow torsional deflection of the first transition member relative to the second transition member.

In Example 14, the underframe assembly of Example 13, wherein the first bearing shaft is configured to be inserted through a longitudinally extending aperture formed in the first bearing mount.

In Example 15, the underframe assembly of any one of Examples 13-14, wherein the first push bar assembly further comprises at least one bearing between the first bearing mount and the first bearing shaft.

In Example 16, the underframe assembly of any one of Examples 13-15, wherein the first transition member and the second transition member are configured to be coupled to a skid plate.

In Example 17, the underframe assembly of any one of Examples 13-16, further comprising a third transition member positioned rearward of the first transition member and a fourth transition member positioned rearward of the second transition member.

In Example 18, the underframe assembly of any one of Examples 13-17, wherein the first push bar assembly, the second push bar assembly, the first transition member, and the second transition member help to define a battery receptacle configured to receive a battery pack.

Examples 19-24—Electric Vehicle

In Example 19, an electric vehicle comprises: a chassis comprising a first side member and a second side member opposite the first side member, the first side member and the second side member extending longitudinally along a length of the electric vehicle, and a battery frame assembly comprising an underframe assembly, the underframe assembly comprising: a first plurality of transition members extending longitudinally and positioned beneath the first side member, a second plurality of transition members extending longitudinally and positioned beneath the second side member, and a plurality of push bar assemblies extending transversely and rotatably coupled to the first plurality of transition members and the second plurality of transition members, wherein, in response to torsional deformation of the first side member and the second side member, the underframe assembly deflects torsionally based on the rotation of the plurality of push bar assemblies with respect to the first plurality of transition members and the second plurality of transition members.

In Example 20, the electric vehicle of Example 19, wherein the first plurality of transition members comprises a first front transition member, a first intermediate transition member rearward of the first front transition member, and a first rear transition member rearward of the first intermediate transition member.

In Example 21, the electric vehicle of any one of Examples 19-20, wherein the second plurality of transition members comprises a second front transition member, a second intermediate transition member rearward of the second front transition member, and a second rear transition member rearward of the second intermediate transition member.

In Example 22, the electric vehicle of any one of Examples 19-21, wherein the plurality of push bar assemblies comprises a front push bar assembly, a first intermediate push bar assembly rearward of the front push bar assembly, a second intermediate push bar assembly rearward of the first intermediate push bar assembly, and a rear push bar assembly rearward of the second intermediate push bar assembly.

In Example 23, the electric vehicle of any one of Examples 19-22, wherein the front push bar assembly is rotatably coupled to the first front transition member and the second front transition member and wherein the first intermediate push bar assembly is rotatably coupled to the first front transition member, the second front transition member, the first intermediate transition member, and the second intermediate transition member.

In Example 24, the electric vehicle of any one of Examples 19-23, wherein the second intermediate push bar assembly is rotatably coupled to the first intermediate transition member, the second intermediate transition member, the first rear transition member, and the second rear transition member and wherein the rear push bar assembly is rotatably coupled to the first rear transition member and the second rear transition member.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric vehicle, comprising:
a chassis comprising a first side member and a second side member;

a front axle and a rear axle spaced apart and coupled to the chassis;

a battery frame assembly coupled to the chassis between the front axle and the rear axle, the battery frame assembly comprising a plurality of transversely extending members and a plurality of longitudinally extending members, wherein the plurality of transversely extending members and the plurality of longitudinally extending members define a matrix of battery pack receptacles configured to receive at least one battery pack; and a battery pack positioned in a battery pack receptacle of the matrix of battery pack receptacles, wherein the battery frame assembly is configured to deflect torsionally in response to torsional deflection of the front axle relative to the rear axle.

2. The electric vehicle of claim 1, wherein the battery frame assembly comprises a 3×3 matrix comprising a first column of three battery pack receptacles outboard of the first side member, a second column of three battery pack receptacles between the first side member and the second side member, and a third column of three battery pack receptacles outboard of the second side member.

3. The electric vehicle of claim 1, wherein the battery frame assembly comprises a first front bracket assembly coupled to the first side member and a second front bracket assembly coupled to the second side member.

4. The electric vehicle of claim 3, wherein the battery frame assembly further comprises a first intermediate bracket assembly positioned rearward of the first front bracket assembly and the second front bracket assembly and a second intermediate bracket assembly positioned rearward of the first intermediate bracket assembly.

5. The electric vehicle of claim 4, wherein the first intermediate bracket assembly and the second intermediate bracket assembly are each coupled to the first side member and the second side member.

6. The electric vehicle of claim 5, wherein the battery frame assembly further comprises a first rear bracket assembly positioned rearward of the second intermediate bracket assembly and coupled to the first side member and a second rear bracket assembly positioned rearward of the second intermediate bracket assembly and coupled to the second side member.

7. An electric vehicle, comprising:
a chassis comprising a first side member and a second side member,
a battery frame assembly coupled to the chassis, the battery frame assembly comprising:
a first intermediate bracket assembly coupled to the first side member and the second side member;
a second intermediate bracket assembly coupled to the first side member and the second side member,
wherein the first side member, the second side member, the first intermediate bracket assembly, and the second intermediate bracket assembly define a first column of battery pack receptacles configured to receive at least one battery pack; and
a battery pack positioned in a battery pack receptacle of the first column of battery pack receptacles.

8. The electric vehicle of claim 7, wherein the first column of battery pack receptacles is positioned between the first side member and the second side member.

9. The electric vehicle of claim 7, wherein a majority of the battery pack is positioned below the first side member and the second side member when the battery pack is coupled to the battery frame assembly.

10. The electric vehicle of claim 7, wherein the battery frame assembly further comprises a second column of battery pack receptacles outboard of the first side member.

11. The electric vehicle of claim 10, wherein the battery frame assembly further comprises a third row of battery pack receptacles outboard of the second side member.

12. The electric vehicle of claim 11, wherein the first column of battery pack receptacles, the second column of battery pack receptacles, and the third column of battery pack receptacles each contain at least three battery pack receptacles.

13. An electric vehicle, comprising:
a chassis comprising a first side member and a second side member;
a battery frame assembly coupled to the chassis, the battery frame assembly comprising:
a first front bracket assembly;
a second front bracket assembly opposite the first front bracket assembly; and
a first intermediate bracket assembly spaced apart and rearward of the first front bracket assembly and the second front bracket assembly,
wherein the first front bracket assembly, the second front bracket assembly, and the first intermediate bracket assembly define a row of battery pack receptacles configured to receive at least one battery pack; and
a battery pack positioned in a battery pack receptacle of the row of battery pack receptacles.

14. The electric vehicle of claim 13, wherein the row of battery pack receptacles is further defined by the first side member and the second side member.

15. The electric vehicle of claim 13, wherein the row of battery pack receptacles comprises three battery pack receptacles.

16. The electric vehicle of claim 13, wherein a first battery pack receptacle of the row of battery pack receptacles is outboard of the second side member.

17. The electric vehicle of claim 16, wherein a second battery pack receptacle of the row of battery pack receptacles is outboard of the second side member.

18. The electric vehicle of claim 17, wherein a third battery pack receptacle of the row of battery pack receptacles is between the first side member and the second side member.

19. The electric vehicle of claim 13, wherein the battery frame assembly is coupled to the chassis such that a majority of the battery frame assembly is positioned below the first side member and the second side member.

20. The electric vehicle of claim 13, wherein the first front bracket assembly is coupled to the first side member, the second front bracket assembly is coupled to the second side member, and the first intermediate bracket assembly is coupled to the first side member and the second side member.

* * * * *